(12) United States Patent
Ohta

(10) Patent No.: US 9,019,261 B2
(45) Date of Patent: Apr. 28, 2015

(54) STORAGE MEDIUM STORING DISPLAY CONTROL PROGRAM, STORAGE MEDIUM STORING LIBRARY PROGRAM, INFORMATION PROCESSING SYSTEM, AND DISPLAY CONTROL METHOD

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 512 days.

(21) Appl. No.: 12/907,248

(22) Filed: Oct. 19, 2010

(65) Prior Publication Data

US 2011/0090215 A1   Apr. 21, 2011

(30) Foreign Application Priority Data

Oct. 20, 2009   (JP) ................... 2009-241314

(51) Int. Cl.
 *G06T 19/00* (2011.01)
 *G06T 15/00* (2011.01)
 *H04N 13/00* (2006.01)
 *H04N 13/02* (2006.01)

(52) U.S. Cl.
 CPC ....... *H04N 13/0022* (2013.01); *H04N 13/0275* (2013.01)

(58) Field of Classification Search
 CPC .......... G06T 19/00; G06T 17/00; G06T 15/00
 USPC ............ 345/7, 9, 419; 348/E13.037; 359/630
 See application file for complete search history.

(56) References Cited

U.S. PATENT DOCUMENTS

| | | |
|---|---|---|
| 5,065,236 A | 11/1991 | Diner |
| 5,119,189 A | 6/1992 | Iwamoto et al. |
| 5,309,522 A | 5/1994 | Dye |
| 5,510,832 A | 4/1996 | Garcia |
| 5,682,171 A | 10/1997 | Yokoi |
| 5,690,551 A | 11/1997 | Taki et al. |
| 5,726,704 A | 3/1998 | Uomori |
| 5,734,416 A | 3/1998 | Ito et al. |
| 5,808,591 A | 9/1998 | Mantani |
| 6,005,607 A | 12/1999 | Uomori et al. |
| 6,034,740 A * | 3/2000 | Mitsui et al. .................. 348/587 |
| 6,088,006 A | 7/2000 | Tabata |
| 6,118,475 A | 9/2000 | Iijima et al. |

(Continued)

FOREIGN PATENT DOCUMENTS

| | | |
|---|---|---|
| EP | 0 563 737 | 10/1993 |
| EP | 0 712 110 | 5/1996 |

(Continued)

OTHER PUBLICATIONS

European Search Report for EPO application EP10 18 8033, dated May 4, 2011.

(Continued)

*Primary Examiner* — Kimbinh T Nguyen

(74) *Attorney, Agent, or Firm* — Nixon & Vanderhye, P.C.

(57) ABSTRACT

A right virtual camera and a left virtual camera are set on a straight line passing through a reference virtual camera and extending perpendicular to a camera direction of the reference virtual camera, in accordance with the reference virtual camera set within a virtual space. A right background image and a left background image are generated such that the right background image and the left background image have relative relation in accordance with positional relation between the right virtual camera and the left virtual camera.

22 Claims, 25 Drawing Sheets

(56) References Cited

U.S. PATENT DOCUMENTS

| | | | |
|---|---|---|---|
| 6,163,337 | A | 12/2000 | Azuma et al. |
| 6,175,379 | B1 | 1/2001 | Uomori et al. |
| 6,198,484 | B1 | 3/2001 | Kameyama |
| 6,236,748 | B1 | 5/2001 | Iijima et al. |
| 6,243,054 | B1 | 6/2001 | DeLuca |
| 6,268,880 | B1 | 7/2001 | Uomori et al. |
| 6,324,001 | B2 | 11/2001 | Tabata |
| 6,384,859 | B1 | 5/2002 | Matsumoto et al. |
| 6,389,179 | B1 | 5/2002 | Katayama et al. |
| 6,559,813 | B1 | 5/2003 | DeLuca et al. |
| 6,614,927 | B1 | 9/2003 | Tabata |
| 6,760,020 | B1 | 7/2004 | Uchiyama et al. |
| 6,762,794 | B1 | 7/2004 | Ogino |
| 7,027,664 | B2 | 4/2006 | Lee et al. |
| 7,046,270 | B2 | 5/2006 | Murata et al. |
| 7,295,697 | B1 | 11/2007 | Satoh |
| 7,417,664 | B2 | 8/2008 | Tomita |
| 7,557,824 | B2 | 7/2009 | Holliman |
| 7,786,997 | B2 | 8/2010 | Yoshino et al. |
| 2001/0030715 | A1 | 10/2001 | Tabata |
| 2001/0033327 | A1 | 10/2001 | Uomori et al. |
| 2001/0045979 | A1 | 11/2001 | Matsumoto et al. |
| 2002/0030675 | A1 | 3/2002 | Kawai |
| 2002/0126202 | A1 | 9/2002 | Wood et al. |
| 2003/0107643 | A1 | 6/2003 | Yoon |
| 2004/0058715 | A1 | 3/2004 | Taniguchi et al. |
| 2004/0066555 | A1 | 4/2004 | Nomura |
| 2005/0089212 | A1 | 4/2005 | Mashitani et al. |
| 2005/0190180 | A1 | 9/2005 | Jin et al. |
| 2005/0253924 | A1 | 11/2005 | Mashitani |
| 2006/0126176 | A1 | 6/2006 | Nogami et al. |
| 2006/0126919 | A1 | 6/2006 | Kitaura et al. |
| 2006/0203085 | A1 | 9/2006 | Tomita |
| 2007/0109296 | A1 | 5/2007 | Sakagawa et al. |
| 2007/0223090 | A1* | 9/2007 | Dolgoff ............... 359/478 |
| 2007/0242068 | A1 | 10/2007 | Han |
| 2008/0246757 | A1* | 10/2008 | Ito ..................... 345/419 |
| 2009/0103833 | A1 | 4/2009 | Mitsuhashi et al. |
| 2010/0289882 | A1 | 11/2010 | Ohta |
| 2011/0032252 | A1 | 2/2011 | Ohta |
| 2011/0090215 | A1 | 4/2011 | Ohta |
| 2011/0102425 | A1 | 5/2011 | Ohta |
| 2012/0044249 | A1* | 2/2012 | Mashitani et al. ........ 345/419 |

FOREIGN PATENT DOCUMENTS

| | | |
|---|---|---|
| EP | 0 751 689 | 1/1997 |
| EP | 0 817 125 | 1/1998 |
| EP | 0 888 017 | 12/1998 |
| EP | 1 085 769 | 3/2001 |
| EP | 1 089 573 | 4/2001 |
| EP | 1 168 852 | 1/2002 |
| EP | 1 408 703 | 4/2004 |
| EP | 1 501 317 | 1/2005 |
| EP | 1 571 854 | 9/2005 |
| EP | 2 323 414 | 5/2011 |
| JP | 07-059119 | 3/1995 |
| JP | 07-095621 | 4/1995 |
| JP | 07-143524 | 5/1995 |
| JP | 08-009421 | 1/1996 |
| JP | 08-205201 | 8/1996 |
| JP | 08-331607 | 12/1996 |
| JP | 09-074573 | 3/1997 |
| JP | 09-121370 | 5/1997 |
| JP | 10-074269 | 3/1998 |
| JP | 10-136379 | 5/1998 |
| JP | 11-027703 | 1/1999 |
| JP | 2000-020757 | 1/2000 |
| JP | 2000-078615 | 3/2000 |
| JP | 2001-022344 | 1/2001 |
| JP | 2001-195582 | 7/2001 |
| JP | 2001-326948 | 11/2001 |
| JP | 2003-107603 | 4/2003 |
| JP | 2004-007395 | 1/2004 |
| JP | 2004-007707 | 1/2004 |
| JP | 2004-054590 | 2/2004 |
| JP | 2004-126902 | 4/2004 |
| JP | 2004-519932 | 7/2004 |
| JP | 2004-283303 | 10/2004 |
| JP | 2004-294861 | 10/2004 |
| JP | 2005-058374 | 3/2005 |
| JP | 2005-165614 | 6/2005 |
| JP | 2005-353047 | 12/2005 |
| JP | 2007-044244 | 2/2007 |
| JP | 2007-286623 | 11/2007 |
| JP | 2008-287588 | 11/2008 |
| JP | 2009-064356 | 3/2009 |
| WO | 01/84852 | 11/2001 |
| WO | 02/073981 | 9/2002 |
| WO | 2007/148434 | 12/2007 |

OTHER PUBLICATIONS

European Search Report for EPO application EP 10 18 9834, dated Jun. 7, 2011.
English-language machine translation of JP 2004-283303.
U.S. Appl. No. 12/845,970 to Ohta, filed Jul. 29, 2010.
U.S. Appl. No. 12/779,421 to Ohta, filed May 13, 2010.
U.S. Appl. No. 12/938,089 to Ohta, filed Nov. 2, 2010.
Notice of Grounds of Rejection for Japanese Application No. 238665/2010, mailed Feb. 1, 2011.
Japanese Accelerated Examination Support Document, dated Dec. 22, 2010.
U.S. Appl. No. 12/779,421 to Ohta et al., filed May 13, 2010.
U.S. Appl. No. 12/845,970 to Ohta et al., filed Jul. 29, 2010.
U.S. Appl. No. 12/938,089 to Ohta et al., filed Nov. 2, 2010.
Oct. 1, 2012 Office Action from U.S. Appl. No. 12/779,421, 27, pages.
English-language machine translation of JP 2007-044244.
English-language machine translation of JP 08-331607.
English-language machine translation of JP 09-074573.
English-language machine translation of JP 2005-165614.
Office Action mailed Sep. 17, 2014 in U.S. Appl. No. 12/938,089.
Ohta, U.S. Appl. No. 12/779,421, filed May 13, 2010, response to non-final office action filed Jul. 16, 2014.
Ohta, U.S. Appl. No. 12/938,089, filed Nov. 2, 2010, RCE filed Nov. 12, 2013.
Ohta, U.S. Appl. No. 12/845,970, filed Jul. 29, 2010, RCE filed Mar. 13, 2014.
English-language machine translation of JP 10-136379.
English-language machine translation of JP 11-027703.
English-language machine translation of JP 2001-195582.
Office Action mailed Dec. 31, 2014 in U.S. Appl. No. 12/779,421.

* cited by examiner

FIG.8

(1) REFERENCE VIRTUAL CAMERA INFORMATION
 — PROJECTION MATRIX
 — VIEW MATRIX
(2) REFERENCE VIRTUAL PLANE INFORMATION
(3) PARALLAX ASSESSMENT PLANE INFORMATION /
(3') REFERENCE DEGREE OF STEREOSCOPIC EFFECT
(4) MODE INFORMATION

↓

LIBRARY FOR STEREOSCOPIC DISPLAY — 218

↓

(5) RIGHT VIRTUAL CAMERA INFORMATION
 — PROJECTION MATRIX
 — VIEW MATRIX
(6) LEFT VIRTUAL CAMERA INFORMATION
 — PROJECTION MATRIX
 — VIEW MATRIX
(7) DISTANCE BETWEEN VIRTUAL CAMERAS (RATIO)

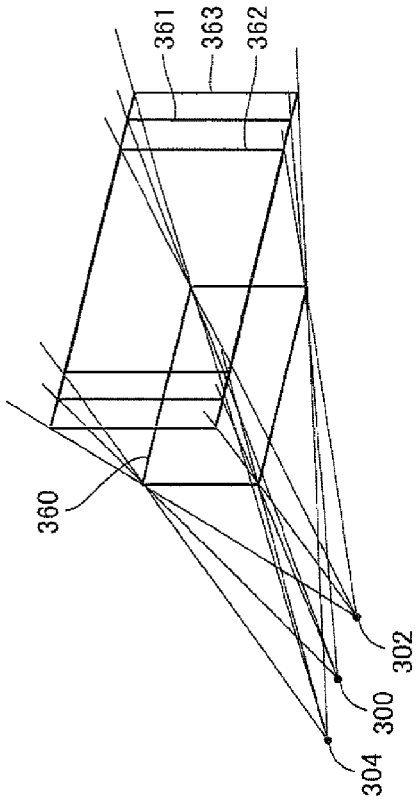
FIG.14A
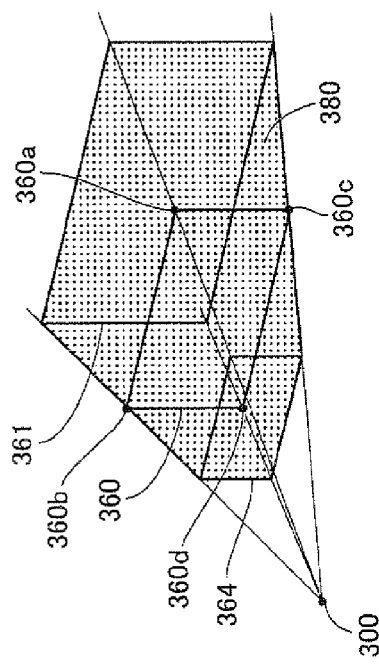
FIG.14B
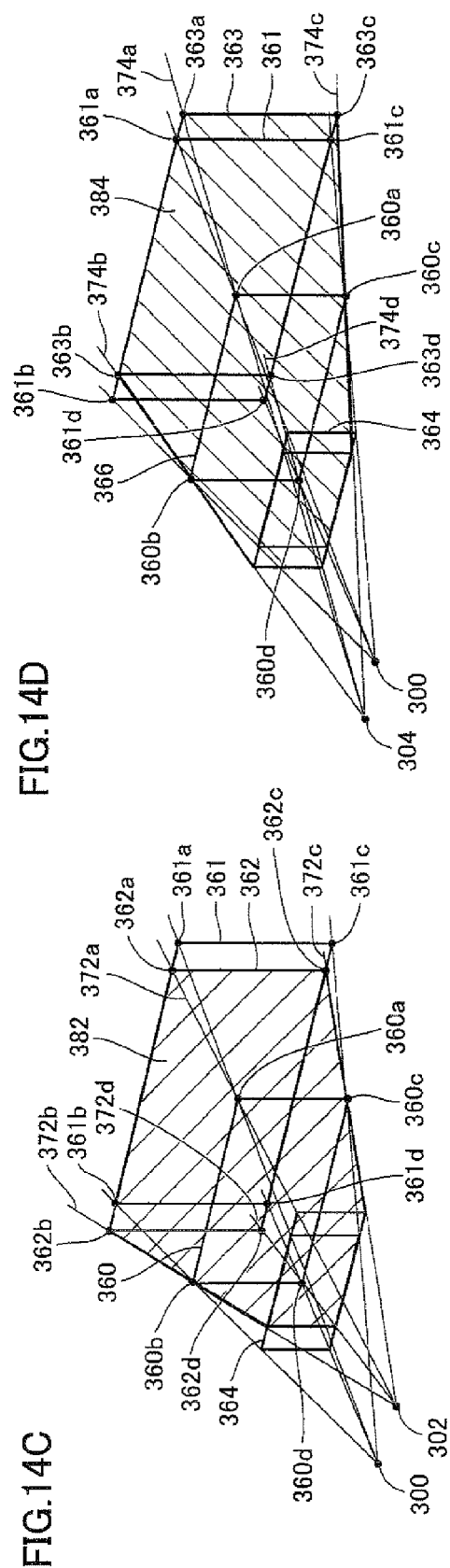
FIG.14C
FIG.14D $$\text{RETURN VALUE } RV = \frac{Df}{W}$$

FIG.25

(1) REFERENCE VIRTUAL CAMERA INFORMATION
 —PROJECTION MATRIX
 —VIEW MATRIX
(1') REFERENCE VIRTUAL CAMERA (BACKGROUND) INFORMATION
 —PROJECTION MATRIX
 —VIEW MATRIX
(2) REFERENCE VIRTUAL PLANE INFORMATION
(3) PARALLAX ASSESSMENT PLANE INFORMATION /
(3') REFERENCE DEGREE OF STEREOSCOPIC EFFECT
(4) MODE INFORMATION

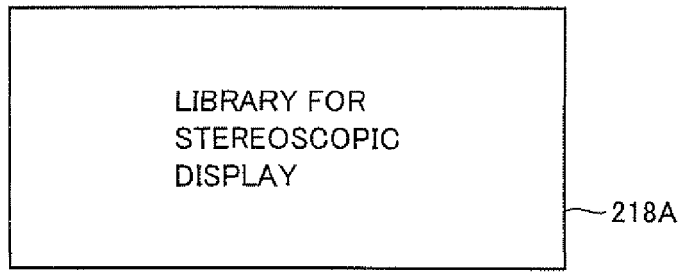

LIBRARY FOR STEREOSCOPIC DISPLAY — 218A

(5) RIGHT VIRTUAL CAMERA INFORMATION
 —PROJECTION MATRIX
 —VIEW MATRIX
(6) LEFT VIRTUAL CAMERA INFORMATION
 —PROJECTION MATRIX
 —VIEW MATRIX
(8) RIGHT VIRTUAL CAMERA (BACKGROUND) INFORMATION
 —PROJECTION MATRIX
 —VIEW MATRIX
(9) LEFT VIRTUAL CAMERA (BACKGROUND) INFORMATION
 —PROJECTION MATRIX
 —VIEW MATRIX

FIG.26

(1) REFERENCE VIRTUAL CAMERA INFORMATION
   — PROJECTION MATRIX
   — VIEW MATRIX
(1') REFERENCE VIRTUAL CAMERA (BACKGROUND) INFORMATION
   — PROJECTION MATRIX
   — VIEW MATRIX
(2) REFERENCE VIRTUAL PLANE INFORMATION
(null) / (3') REFERENCE DEGREE OF STEREOSCOPIC EFFECT
(4) MODE INFORMATION

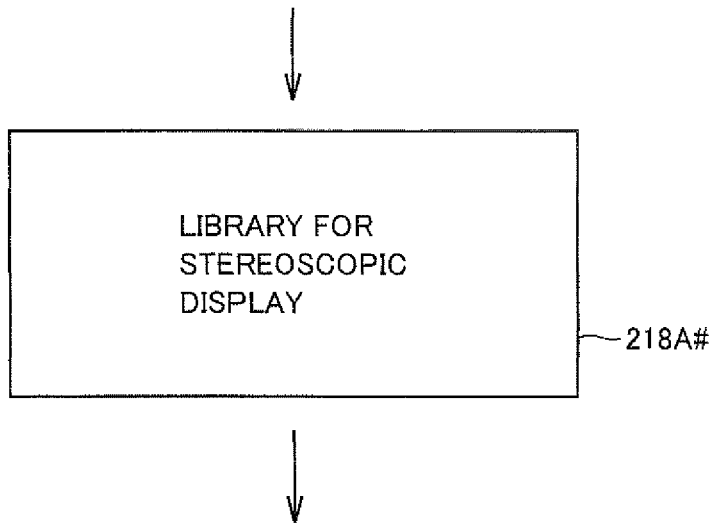

LIBRARY FOR STEREOSCOPIC DISPLAY — 218A#

(5) RIGHT VIRTUAL CAMERA INFORMATION
   — PROJECTION MATRIX
   — VIEW MATRIX
(6) LEFT VIRTUAL CAMERA INFORMATION
   — PROJECTION MATRIX
   — VIEW MATRIX
(8) RIGHT VIRTUAL CAMERA (BACKGROUND) INFORMATION
   — PROJECTION MATRIX
   — VIEW MATRIX
(9) LEFT VIRTUAL CAMERA (BACKGROUND) INFORMATION
   — PROJECTION MATRIX
   — VIEW MATRIX

STORAGE MEDIUM STORING DISPLAY CONTROL PROGRAM, STORAGE MEDIUM STORING LIBRARY PROGRAM, INFORMATION PROCESSING SYSTEM, AND DISPLAY CONTROL METHOD

This nonprovisional application is based on Japanese Patent Application No. 2009-241314 filed with the Japan Patent Office on Oct. 20, 2009, the entire contents of which are hereby incorporated by reference.

BACKGROUND OF THE INVENTION

1. Field of the Invention

The present invention relates to a storage medium storing a display control program used in providing stereoscopic display using two images on a display capable of providing stereoscopic display, a storage medium storing a library program, an information processing system, and a display control method.

2. Description of the Background Art

A method for providing stereoscopic display using two images having prescribed parallax has conventionally been known. Such stereoscopic display has increasing fields of applications. For example, applications for displaying a three-dimensional virtual space, such as a game and CG animation, have been developed.

In such an application, stereoscopic display is carried out by setting two virtual cameras within a three-dimensional virtual space and using images including a subject such as an object obtained by virtually photographing the subject with respective virtual cameras. For stereoscopic display easily viewable by a user, the two virtual cameras should appropriately be set. For example, Japanese Patent Laying-Open No. 2003-107603 discloses a method of generating images for stereoscopic display such that a portion to which attention is desirably paid is focused.

In generating an image expressing a three-dimensional virtual space including an object on a related display, in some cases, a technique for rendering various objects (a player character, a non-player character, a geographic feature object, and the like) and generating and processing an image displayed as a background of the object (an image expressing a perspective such as sky or clouds) independently of that rendering has been adopted. By adopting such a technique, advantageously, the number of man-hours required for development of a program can be decreased and processing for generating an image expressing a three-dimensional image space can be performed faster.

If the technique as above is adopted in carrying out stereoscopic display on the display as described above, however, problems as follows may arise. Namely, the first problem is that, for stereoscopic display of various objects, two virtual cameras should be set at respective appropriate positions within the three-dimensional virtual space and two images of an image for right eye and an image for left eye should be generated for an image to be displayed as a background. In designing processing for generating an image for stereoscopic display, a developer of application software should design the processing in consideration of more viewpoints than in the case of two-dimensional display. In addition, the second problem is that an image to be displayed as a background should visually be recognized as a picture located on the rearmost side when viewed from the user and hence the image to be displayed as the background should appropriately be generated/updated each time a degree of stereoscopic effect in stereoscopic display of the object is changed.

As described above, if the technique that has been used in two-dimensional display as described above is applied to stereoscopic display as it is, disadvantageously, an amount of processing required for display is excessively great.

SUMMARY OF THE INVENTION

The present invention was made to solve such problems, and an object of the present invention is to provide a storage medium storing a display control program capable of achieving lower load in design of processing for generating an image for stereoscopic display by an application software developer, a storage medium storing a library program, an information processing system, and a display control method.

According to a first aspect of the present invention, a storage medium storing a display control program for controlling a display capable of providing stereoscopic display is provided. The present display control program includes: object image generation instructions for generating a right object image and a left object image used for providing stereoscopic display of an object within a first virtual space on the display by virtually photographing the object with a first right virtual camera and a first left virtual camera; background image generation instructions for generating a right background image and a left background image used for background display on the display; and display data generation instructions for generating data used for image display on the display by using the right object image and the left object image as well as the right background image and the left background image. The object image generation instructions are adapted to set the first right virtual camera and the first left virtual camera on a straight line passing through a first reference virtual camera and extending perpendicular to a camera direction of the first reference virtual camera, in accordance with the first reference virtual camera set within the first virtual space. The background image generation instructions are adapted to control display of the right background image and the left background image such that these background images have relative relation in accordance with positional relation between the first right virtual camera and the first left virtual camera.

According to the first aspect, by designating a first reference virtual camera for rendering a prescribed object within a first virtual space, a pair of virtual cameras (a first right virtual camera and a first left virtual camera) for generating a pair of object images (a right object image and a left object image) necessary for stereoscopic display of the object on the display can be set. Even when an object within the first virtual space is stereoscopically displayed in each scene of an application or the like, it is only necessary to designate a single reference virtual camera as in an application including only two-dimensional display. Therefore, even when an application including stereoscopic display is created, workload can be suppressed to the same level as that of an application including only two-dimensional display.

In addition, when the pair of virtual cameras (the first right virtual camera and the first left virtual camera) is set as described above, a right background image and a left background image are generated in accordance with positional relation between these virtual cameras. Depending on a degree of stereoscopic effect expressed on the display, an appropriate background image is generated. Therefore, in a typical embodiment, even when a degree of stereoscopic effect on the display is changed, the background image can always be displayed on the rear side of the object.

Namely, by designating a single reference virtual camera as in the application for two-dimensional display, a pair of virtual cameras (the first right virtual camera and the first left virtual camera) for providing stereoscopic display of an object is automatically set, and additionally relative relation between a pair of background images is automatically set.

According to a preferred second aspect, the background image generation instructions are adapted to control display of the right background image and the left background image based on a distance between the first right virtual camera and the first left virtual camera in the virtual space.

According to the second aspect, a distance between the first right virtual camera and the first left virtual camera in the virtual space directly relates to magnitude of parallax generated between the right object image and the left object image. Since a distance between these virtual cameras is associated with a degree of stereoscopic effect expressed on the display, relative relation between the right background image and the left background image can appropriately be adjusted by using this distance between the virtual cameras.

According to a preferred third aspect, the right background image and the left background image are images generated by using a common image. The display control program further includes instructions for displaying the right background image and the left background image such that corresponding portions in these images are displayed with parallax in accordance with a distance between a pair of virtual cameras. According to a typical embodiment, the right background image and the left background image may exactly be identical to each other.

According to a further preferred fourth aspect, the background image generation instructions are adapted to generate the right background image and the left background image in accordance with a ratio (a first ratio) of the distance between the first right virtual camera and the first left virtual camera, with a width of a reference virtual plane region which is included in a view volume of the first reference virtual camera and is a virtual plane perpendicular to the camera direction of the first reference virtual camera serving as a reference.

Here, the reference virtual plane region is a region rendered on a display surface of a display 10 in a "plane of which presence a user viewing stereoscopic display feels at a position of the display surface of display 10 in a three-dimensional virtual space."

According to a typical embodiment, the right background image and the left background image are generated such that a ratio between "a size of a background image in a left/right direction displayed on the display surface of display 10" and "an amount of displacement at the time of display of the right background image and the left background image" is set to the first ratio described above.

According to the third and fourth aspects, since a distance between the first right virtual camera and the first left virtual camera in the virtual space has a value different in dimension from a width or the like of an actual display surface of the display, the value as it is lacks versatility. In contrast, by standardizing a distance between the first right virtual camera and the first left virtual camera in the virtual space with a width of the reference virtual plane region serving as the reference, use thereof can be expanded as a more versatile value.

According to a further preferred fifth aspect, the background image generation instructions are adapted to set a right rendering range to be output as the right background image with respect to an original background image having a size larger than a size of display on the display and to set a left rendering range to be output as the left background image at a position set by displacing the right rendering range by a distance obtained by multiplying a width of the right rendering range by the ratio of the distance between the first right virtual camera and the first left virtual camera.

According to the fifth aspect, by using a ratio of a distance between the first right virtual camera and the first left virtual camera with a width of the reference virtual plane region serving as the reference (a standardized value), the right background image and the left background image to visually be recognized by the user as a subject image located on the rearmost side of all expressed objects can appropriately be generated in accordance with a size of a display surface of the display, a size of an image displayed on the display surface, or the like.

According to a preferred sixth aspect, the background image generation instructions are adapted to set a second right virtual camera and a second left virtual camera for generating a right background image and a left background image, respectively, by virtually photographing a background object, with a second reference virtual camera set within a second virtual space including the background object serving as a reference, based on the distance between the first right virtual camera and the first left virtual camera.

According to the sixth aspect, even when a user causes a part of a background object to be displayed as a background in each scene of an application or the like, it is only necessary to designate a single reference virtual camera for rendering a background as in an application including only two-dimensional display. Therefore, even when an application including stereoscopic display is created, workload can be suppressed to the same level as that of an application including only two-dimensional display.

According to a further preferred seventh aspect, each of the second reference virtual camera, the second right virtual camera and the second left virtual camera is defined as a projection matrix and a view matrix.

According to a preferred eighth aspect, each of the first reference virtual camera, the first right virtual camera and the first left virtual camera is defined as a projection matrix and a view matrix.

According to these seventh and eighth aspects, by using a camera matrix (a projection matrix and a view matrix) generally utilized in a rendering technique for a three-dimensional virtual space, consistency with processing involved with these rendering techniques can be maintained.

According to a preferred ninth aspect, the object image generation instructions are adapted to determine positional relation between the first right virtual camera and the first left virtual camera in response to an indication indicating a degree of stereoscopic effect provided in the display.

According to this ninth aspect, in some cases, expression of stereoscopic effect calculated under a predetermined condition as it is may not be desired. In such a case, typically, stereoscopic effect involved with stereoscopic display on the display can be adjusted in accordance with intention of a creator of an application, a user's operation, or the like.

According to a further preferred tenth aspect, the present display control program further includes input instructions for accepting a request indicating the degree of stereoscopic effect provided in the display. The object image generation instructions are adapted to change positional relation between the first right virtual camera and the first left virtual camera in response to the indication when change in the degree of stereoscopic effect is accepted as a result of execution of the input instructions.

According to this tenth aspect, the user can adjust stereoscopic effect displayed on the display as necessary by operating input means.

According to an eleventh aspect of the present invention, a storage medium storing a library program cooperating with an application program on a computer having a display capable of providing stereoscopic display is provided. The present library program includes: setting value output instructions for outputting a "setting value for a first right virtual camera for generating a right object image" and a "setting value for a first left virtual camera for generating a left object image" used for providing stereoscopic display of an object within a first virtual space on the display by virtually photographing the object within the first virtual space in response to an input of a setting value for a first reference virtual camera within the first virtual space; and positional relation output instructions for outputting a "value indicating positional relation between the first right virtual camera and the first left virtual camera." The setting output instructions are adapted to set the first right virtual camera and the first left virtual camera on a straight line passing through the first reference virtual camera and extending perpendicular to a camera direction of the first reference virtual camera, and adapted to generate a right background image and a left background image used for background display on the display based on positional relation between the first right virtual camera and the first left virtual camera.

An information processing system according to a twelfth aspect of the present invention includes: a display capable of providing stereoscopic display; an object image generation module for generating a right object image and a left object image used for providing stereoscopic display of an object within a first virtual space on the display by virtually photographing the object with a first right virtual camera and a first left virtual camera; a background image generation module for generating a right background image and a left background image used for background display on the display; and a display data generation module for generating data used for image display on the display by using the right object image and the left object image as well as the right background image and the left background image. The object image generation module sets the first right virtual camera and the first left virtual camera on a straight line passing through a first reference virtual camera and extending perpendicular to a camera direction of the first reference virtual camera, in accordance with the first reference virtual camera set within the first virtual space, and the background image generation module controls display of the right background image and the left background image such that these background images have relative relation in accordance with positional relation between the first right virtual camera and the first left virtual camera.

According to a thirteenth aspect of the present invention, a display control method for controlling a display capable of providing stereoscopic display is provided. The present display control method includes: an object image generation step of generating a right object image and a left object image used for providing stereoscopic display of an object within a first virtual space on the display by virtually photographing the object with a first right virtual camera and a first left virtual camera; a background image generation step of generating a right background image and a left background image used for background display on the display; and a display data generation step of generating data used for image display on the display by using the right object image and the left object image as well as the right background image and the left background image. The object image generation step includes the step of setting the first right virtual camera and the first left virtual camera on a straight line passing through a first reference virtual camera and extending perpendicular to a camera direction of the first reference virtual camera, in accordance with the first reference virtual camera set within the first virtual space, and the background image generation step includes the step of controlling display of the right background image and the left background image such that these background images have relative relation in accordance with positional relation between the first right virtual camera and the first left virtual camera.

According to the eleventh to thirteenth aspects, a function and effect the same as in the first aspect described above can be obtained.

In the description above, for better understanding of the present invention, supplemental explanation and the like showing correspondence with embodiments which will be described later are provided, however, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows a data item input and output to/from a library for stereoscopic display shown in FIGS. 7A and 7B.

FIGS. 14A to 14D show a view volume set in accordance with a result of processing in the processing for setting the right virtual camera and the left virtual camera shown in FIGS. 13A to 13C.

FIGS. 25 and 26 are diagrams for illustrating a data item input and output to/from a library for stereoscopic display corresponding to FIG. 24.

DESCRIPTION OF THE PREFERRED EMBODIMENTS

Figure 1:
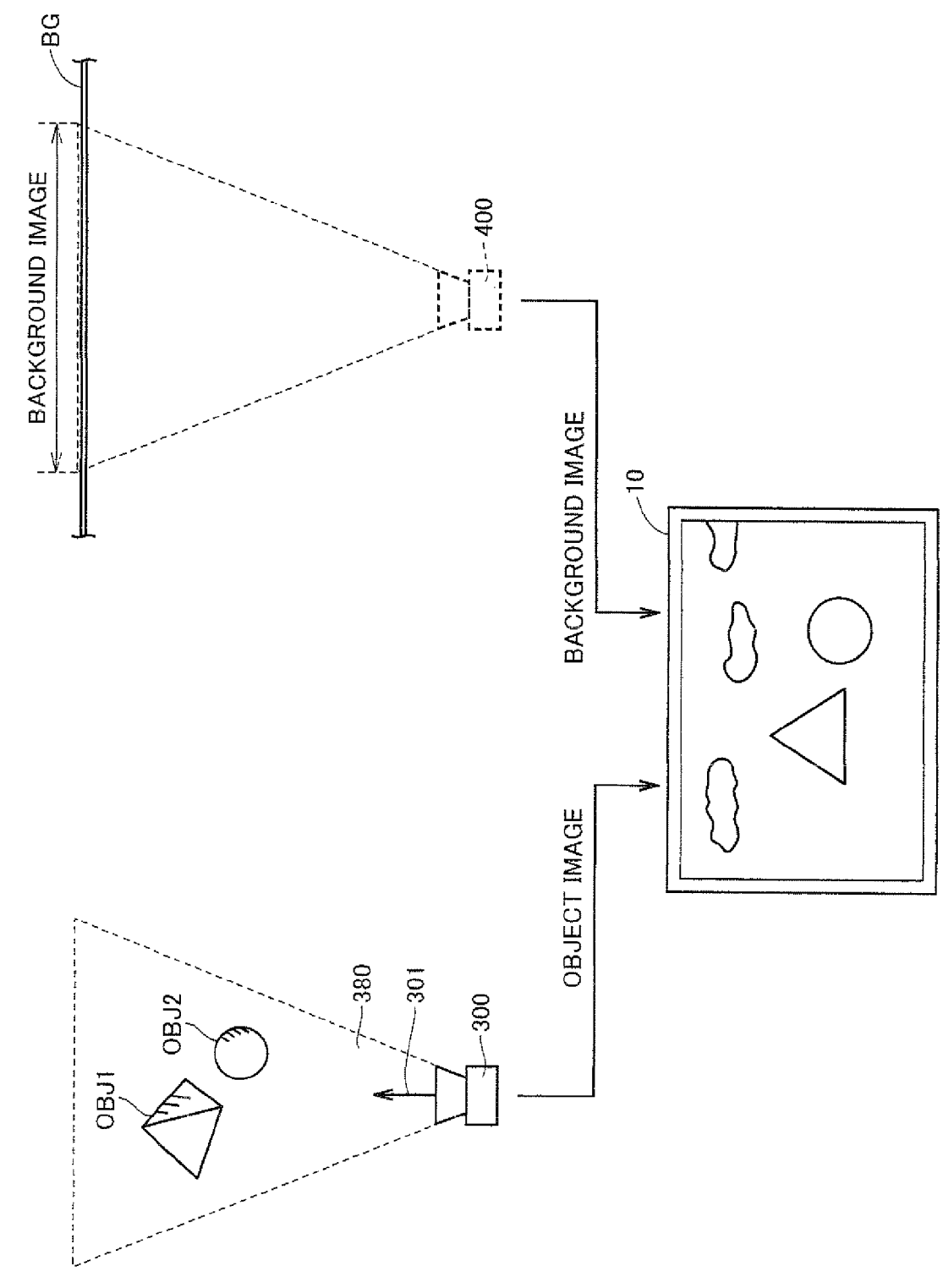
FIG. 1 shows two-dimensional display processing according to the related art.

An embodiment of the present invention will be described in detail with reference to the drawings. The same or corresponding elements in the drawings have the same reference characters allotted, and description thereof will not be repeated.

<A. Overview and Concept>

According to one aspect of the present invention, typically, it is an object to provide such an environment that, even when an application or the like including stereoscopic display is created, workload the same as in the case of an application including only two-dimensional display is only required. Initially, overview and a concept according to the present invention will now be described with reference to FIGS. 1 to 4.

[a1. Two-Dimensional Display According to the Related Art]

FIG. 1 is a diagram for illustrating two-dimensional display processing (referred to as "two-dimensional display" in the sense that it is not stereoscopic display) according to the related art. Referring to FIG. 1, a case where a three-dimensional virtual space including objects OBJ1 and OBJ2 is displayed on display 10 is considered. In this case, a virtual camera 300 is set at any position within the three-dimensional virtual space where objects OBJ1 and OBJ2 are arranged. Then, an image is generated by virtually photographing objects OBJ1 and OBJ2 or the like within the three-dimensional virtual space with virtual camera 300. In the description below, an image generated for (two-dimensionally or stereoscopically) displaying various objects included within the three-dimensional virtual space is also referred to as an "object image", from a point of view of comparison with an image generated for displaying a background which will be described later.

At the same time, an image to be used for background display is generated. In the description below, an image generated for (two-dimensionally or stereoscopically) displaying this background is also referred to a "background image" in comparison with the "object image" described above. In the example shown in FIG. 1, "sky in which clouds are drawn" is exemplified as a background image. Typically, the background image is extracted from any region in an original background image BG which is a planar, two-dimensional image having a size greater than a size of display on display 10. A region extracted from original background image BG as a background image may be set as appropriate to a range associated with an arrangement position of virtual camera 300 (or an object to which the user's attention is desirably paid), a range independent of an arrangement position of virtual camera 300, or a range in accordance with proceeding of an application, or the like.

Instead of a method of directly setting a range to serve as a background image in original background image BG as described above from a planar, two-dimensional image, original background image BG may be arranged in a three-dimensional virtual space (pasted as a texture) and a reference virtual camera 400 for background photographing may be set in the three-dimensional virtual space where this original background image BG is arranged. Typically, original background image BG is arranged in a three-dimensional virtual space different from the three-dimensional virtual space where objects OBJ1 and OBJ2 are arranged. In this case, a background image is generated as virtual camera 400 virtually photographs original background image BG.

Then, display data is generated based on these object image and background image, and two-dimensional display is provided on display 10 based on this display data.

[a2. Stereoscopic Display]

In stereoscopic display processing according to the embodiment of the present invention, by designating a parameter similar to a parameter required for controlling display of the object image and the background image shown in FIG. 1 above, a pair of object images (a right object image and a left object image) and a pair of background images (a right background image and a left background image) necessary for stereoscopic display on display 10 are generated.

Figure 2:
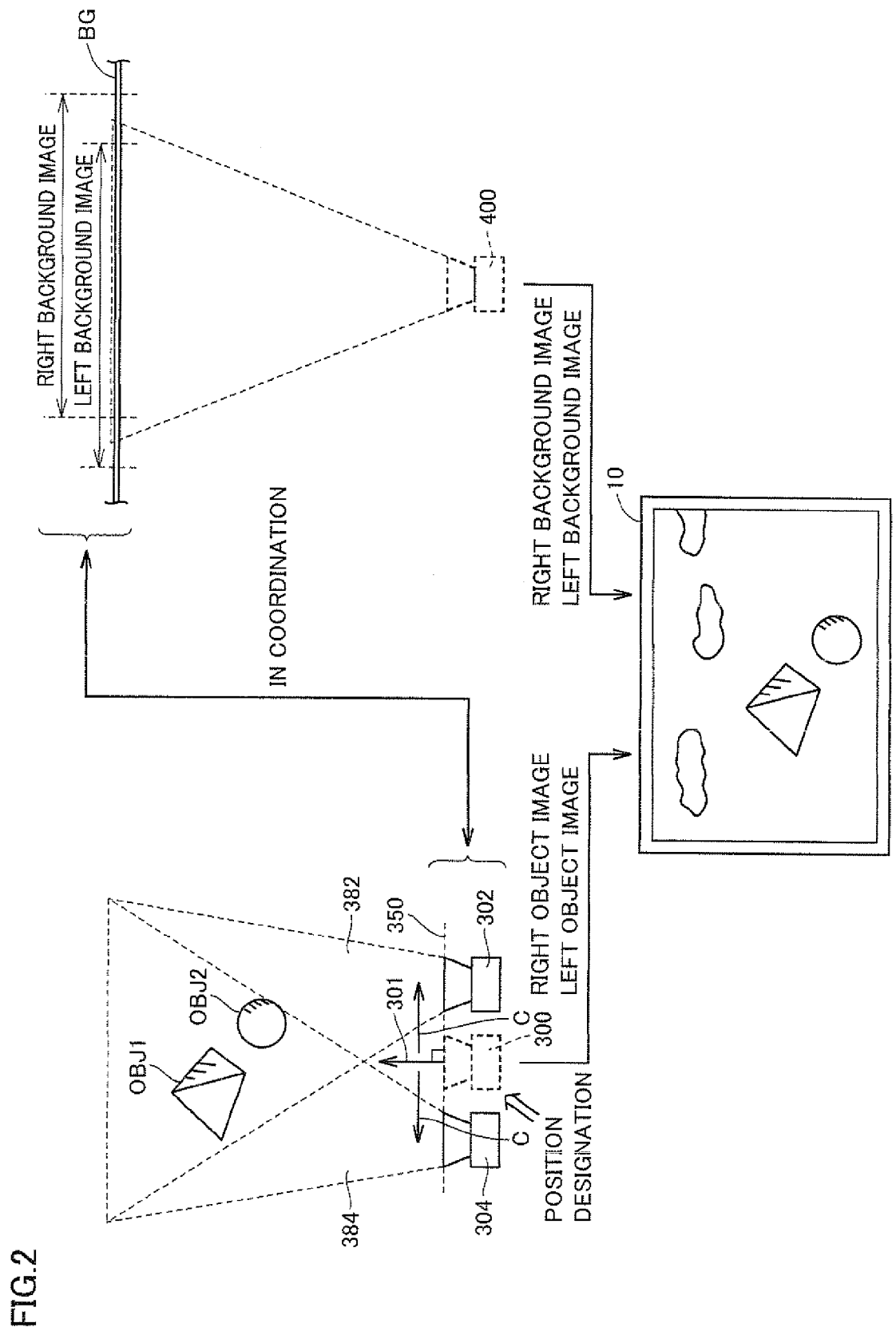
FIG. 2 shows stereoscopic display processing according to the present embodiment in comparison with the two-dimensional display processing shown in FIG. 1.

Referring to FIG. 2, by way of example, processing for stereoscopically displaying a range similar to a range rendered in two-dimensional display described above will be described.

In this case, initially, in a three-dimensional virtual space including objects OBJ1 and OBJ2, virtual camera 300 is designated as in two-dimensional display shown in FIG. 1 above (it is noted that the "virtual camera set as in two-dimensional display" is hereinafter referred to as a "reference virtual camera"). With an arrangement position of this reference virtual camera 300 serving as the reference, a right virtual camera 302 for generating a right object image and a left virtual camera 304 for generating a left object image are set. More specifically, with a camera position of reference virtual camera 300 serving as the reference, right virtual camera 302 is set such that it is distant therefrom by a distance C in a right direction with respect to a camera direction of reference virtual camera 300, and left virtual camera 304 is set such that it is distant therefrom by distance C in a left direction with respect to the camera direction of reference virtual camera 300. It is noted that respective camera directions and angles of view of the right virtual camera and the left virtual camera are set to values the same as those of the camera direction and the angle of view of reference virtual camera 300. By thus virtually photographing objects OBJ1 and OBJ2 or the like within the three-dimensional virtual space with arranged right virtual camera 302 and left virtual camera 304, the right object image and the left object image are generated, respectively.

At the same time, a right background image and a left background image are generated in coordination with positional relation between right virtual camera 302 and left virtual camera 304 set within the three-dimensional virtual space. Namely, the right background image and the left background image are generated such that relative relation between these background images satisfies relative relation in accordance with the positional relation between right virtual camera 302 and left virtual camera 304.

Then, display data for right eye is generated based on the right object image and the right background image, and display data for left eye is generated based on the left object image and the left background image. Stereoscopic display on display 10 is provided based on such display data.

The right background image and the left background image are generated and displayed such that, when they are displayed on display 10, the user can visually recognize these background images as a picture located at infinity or at a prescribed position on the rear side of display 10. As will be described later, considering the purpose of a background image, the background image should visually be recognized by a user as an image located on the rearmost side, behind all expressed objects. At which position in a direction of depth an object stereoscopically displayed on a display screen is visually recognized when the user views the object varies, depending on parallax on a display screen. In the present embodiment, by controlling display of the right background image and the left background image such that these background images have parallax in accordance with positional relation between right virtual camera 302 and left virtual camera 304, the user is caused to visually recognize the background image such that the background image is located on the rearmost side relative to other display targets other than the background. In the present embodiment, these background images are generated to have parallax in accordance with positional relation between right virtual camera 302 and left virtual camera 304.

"Relative relation between the right background image and the left background image" herein refers to relation between a display position of the right background image and a display position of the left background image on a stereoscopic display. More specifically, it refers to positional relation between a display position of a certain subject image in a right background image and a display position thereof in a left background image. Setting of this relative relation determines a depth at which a viewer feels as if the background were located. In the present embodiment, relative relation between the right background image and the left background image is set to such relation as producing parallax allowing the user to visually recognize the displayed background as a picture on the rearmost side when these background images are displayed on display 10. More specifically, as will be described later, by setting two rendering ranges to be extracted as a right background image and a left background image respectively in original background image BG having a size greater than a size of display on display 10 to have positional relation causing parallax as described above, display position relation at a stereoscopic display position between a "subject image in the right background image" and a "subject image in the left background image" is set and thus "relative relation" is formed.

When a degree of stereoscopic effect on display 10 is changed, positional relation between right virtual camera 302 and left virtual camera 304 varies as shown in FIG. 2. Even in this case, relative relation between the right background image and the left background image varies in accordance with change in the positional relation and hence the background image can always be displayed on the rear side of the object. Namely, such a situation that the background image is seen on the front side of various objects can be avoided. Details of such coordination processing will be described later.

[a3. Definition]

(i) "Stereoscopic display" herein means that an image is expressed in such a manner as enabling a user to stereoscopically visually recognize at least some objects included in the image. Typically, by having a user visually recognize a pair of planar, two-dimensional images (stereo images) having parallax and utilizing physiological functions of human eyes and brain, the user is caused to feel stereoscopic effect.

"Parallax" herein refers to a difference in how a point of interest is viewed, between a subject image visually recognized by the user's right eye and a subject image visually recognized by the user's left eye. Typically, when a certain object is observed from different points of observation and images are generated respectively based on respective observations at the points of observation, the resultant images have parallax. Further, depending on the difference between the point of observation for generating display for the right eye and the point of observation for generating display for the left eye, a subject image in the displayed image for the right eye and a subject image in the displayed image for the left eye are different in position where they appear. Magnitude of such a difference in position between the subject images of the same object in two images is referred to as an "amount of parallax."

(ii) "Right" and "left" herein are used for distinction between the eyes with which the user visually recognizes an object. Namely, the "right object image" and the "right background image" described above indicate that they are images to visually be recognized by the user's right eye, and the "left object image" and the "left background image" described above indicate that they are images to visually be recognized by the user's left eye. In addition, regarding images displayed on display 10, an image to visually be recognized by the user's right eye is referred to as a "right display image," while an image to visually be recognized by the user's left eye is referred to as a "left display image."

In addition, a virtual camera for generating a "right object image" is also referred to as a "right virtual camera," while a virtual camera for generating a "left object image" is also referred to as a "left virtual camera."

Figure 3:
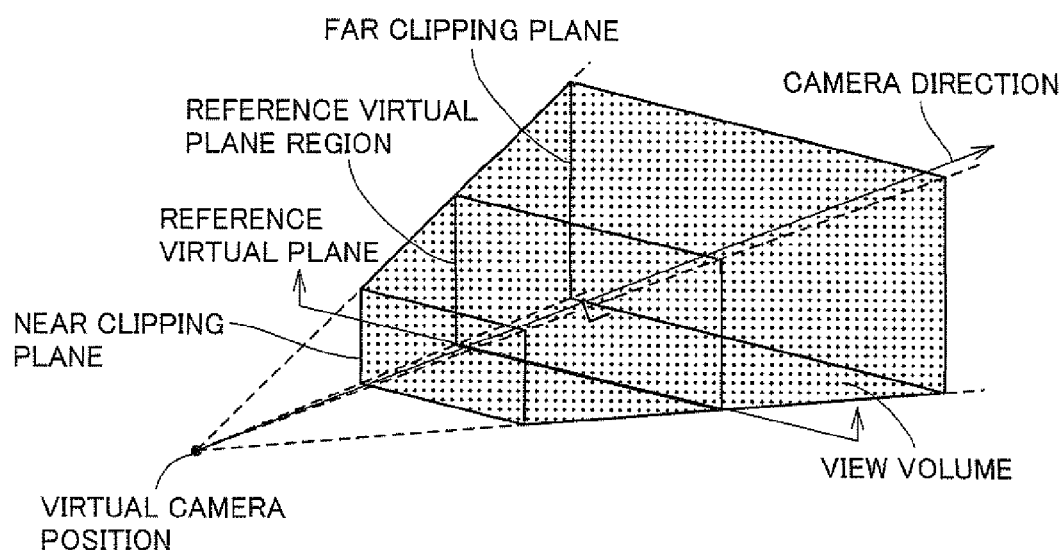
FIG. 3 shows one example of a field of view of a virtual camera according to the present embodiment.

(iii) A "view volume" herein refers to the following range. Referring to FIG. 3, the virtual camera according to the present embodiment renders only an object within a prescribed range in a camera direction (a hatched range in FIG. 3) in a three-dimensional virtual space. In other words, a range outside a viewing angle of the virtual camera (a range enclosed with a dashed line in FIG. 3) is not rendered. In addition, a "near clipping plane" is set on a side in the vicinity of the virtual camera, while a "far clipping plane" is set on a side farther therefrom. These near clipping plane and far clipping plane are set perpendicular to a line of the camera direction of the virtual camera. An object present between these near clipping plane and far clipping plane and included within the viewing angle of the virtual camera is to be rendered.

A range actually viewed by the user when an image is generated as a result of photographing by the virtual camera in this manner (that is, a rendered range) is also referred to as a "view volume". More specifically, a frustum of pyramid having the near clipping plane as one surface and the far clipping plane as the other surface in a whole quadrangular pyramid having a virtual camera position as a vertex and the far clipping plane of the virtual camera as a bottom surface is referred to as the "view volume". This "view volume" may also be referred to as a "view frustum" or a "viewing frustum". Therefore, in photographing a three-dimensional virtual space with a virtual camera having a certain view volume (field of view), the space contained in the view volume is rendered by the virtual camera.

Turning to the example described above, a view volume 380 is set in correspondence with virtual camera 300 shown in FIG. 1, a view volume 382 is set in correspondence with right virtual camera 302 shown in FIG. 2, and a view volume 384 is set in correspondence with left virtual camera 304 shown FIG. 2.

(iv) In providing stereoscopic display on display 10, a "reference virtual plane," which is a plane corresponding to a position of the display surface of display 10 (a plane of which presence the user viewing stereoscopic display feels at a position of the display surface of display 10 in the three-dimensional virtual space), is set within the three-dimensional virtual space (see FIG. 3). It is noted that the reference virtual plane may be a "plane of which presence the user viewing stereoscopic display feels at a position having prescribed offset from the display surface of display 10 in the three-dimensional virtual space."

This "reference virtual plane" is also set perpendicular to the camera direction. In addition, since an actual size of the display surface of display 10 is finite, a "reference virtual plane region" corresponding to a range rendered on the display surface of display 10 in the reference virtual plane can be defined. Namely, a rendered range in the reference virtual plane which is an infinite plane (a range included in the view volume) is the "reference virtual plane region."

The "reference virtual plane region" defines a position and a region within the three-dimensional virtual space of which presence the user feels around the display surface of display 10 in providing stereoscopic display on display 10 (as described previously, typically, exactly a position of the display surface, however, the position may be set, for example, as a position having prescribed offset from the display surface). Namely, though stereoscopic display includes a portion that looks like popping up toward the front from the display surface of display 10 or a portion that looks like recessed in the rear of the display surface, for a user, a space corresponding to a portion around the reference virtual plane region just looks like locating around the display surface of display 10. When right virtual camera 302 and left virtual camera 304 are set at respective positions as shown in FIG. 2, how an object located in the space corresponding to the portion around the reference virtual plane region is displayed is the same between a right object image and a left object image generated by the respective virtual cameras (that is, there is substantially no parallax).

Therefore, for a user who views the display surface of display 10, (an object located in) the portion corresponding to the reference virtual plane region looks like present at substantially the same position between the image visually recognized by the right eye (the right object image) and the image visually recognized by the left eye (the left object image), and consequently the portion looks like present on the display surface of display 10, which is a surface actually displaying these object images.

On the other hand, regarding (an object located in) a portion corresponding to a plane set at a position different from the reference virtual plane region, the right object image and the left object image are different in display position depending on positional relation between right virtual camera 302 and left virtual camera 304 (that is, display having some parallax is provided), and for a user, the portion looks like present at a position popping up from the display surface of display 10 or at a position recessed therefrom.

(v) As described above, in the present embodiment, a pair of planar, two-dimensional images having parallax is displayed on display 10, so as to have the user feel stereoscopic effect. As an amount of parallax of a certain object within this pair of planar, two-dimensional images is greater, the object is visually recognized by the user with greater stereoscopic effect. If the amount of parallax increases beyond a certain value, to the contrary, the user is less likely to feel stereoscopic effect. Therefore, in providing stereoscopic display on display 10, the amount of parallax should be maintained in an appropriate range. Hereinafter, a maximum amount of parallax between the right object image and the left object image on the display surface that allows the user to comfortably accept stereoscopic display on display 10 is referred to as a "parallax limit amount." A threshold value up to which stereoscopic effect can comfortably be felt, that is, a parallax limit amount, is determined by an actual screen width of the display surface of display 10, an actual interval between the user's eyes, an actual distance from the user to the display surface of display 10, or the like.

Therefore, in the present embodiment, an object is displayed on the display surface of display 10 such that an amount of parallax of the object desired to visually be recognized by the user is set to a value not higher than this parallax limit amount.

In order to control stereoscopic effect of an object displayed on such display 10, in the present embodiment, a plane for evaluating a generated amount of parallax is set within the three-dimensional virtual space. Such a plane for evaluating an amount of parallax is hereinafter referred to as a "parallax assessment plane" (see FIGS. 9 and 13A to 13C which will be described later). This parallax assessment plane is also set perpendicular to the camera direction of the virtual camera. Namely, a parallax assessment plane is set at a position on the rear side relative to the reference virtual plane (opposite to the virtual camera), in parallel to the reference virtual plane.

More specifically, between a right object image and a left object image obtained by virtual photographing of a display target located on the parallax assessment plane set within the three-dimensional virtual space with the right virtual camera and the left virtual camera respectively, parallax in accordance with positional relation between the right virtual camera and the left virtual camera is generated. Then, the right virtual camera and the left virtual camera are set such that an amount of position displacement of the object located on the parallax assessment plane does not exceed a prescribed threshold value. Thus, an amount of parallax of each object present in front of the parallax assessment plane (on the virtual camera side) can be equal to or smaller than the parallax limit amount. It is noted that a separate parallax assessment plane (a second parallax assessment plane) may be provided at a position on the front side of the reference virtual plane and the virtual camera may be set such that an amount of position displacement of a display target located on the parallax assessment plane does not exceed a prescribed threshold value. In the present embodiment described hereinafter, an example where a second parallax assessment plane is not provided such that the reference virtual plane can be set at a desired position is shown.

[a4. Function and Processing]

Figure 4:
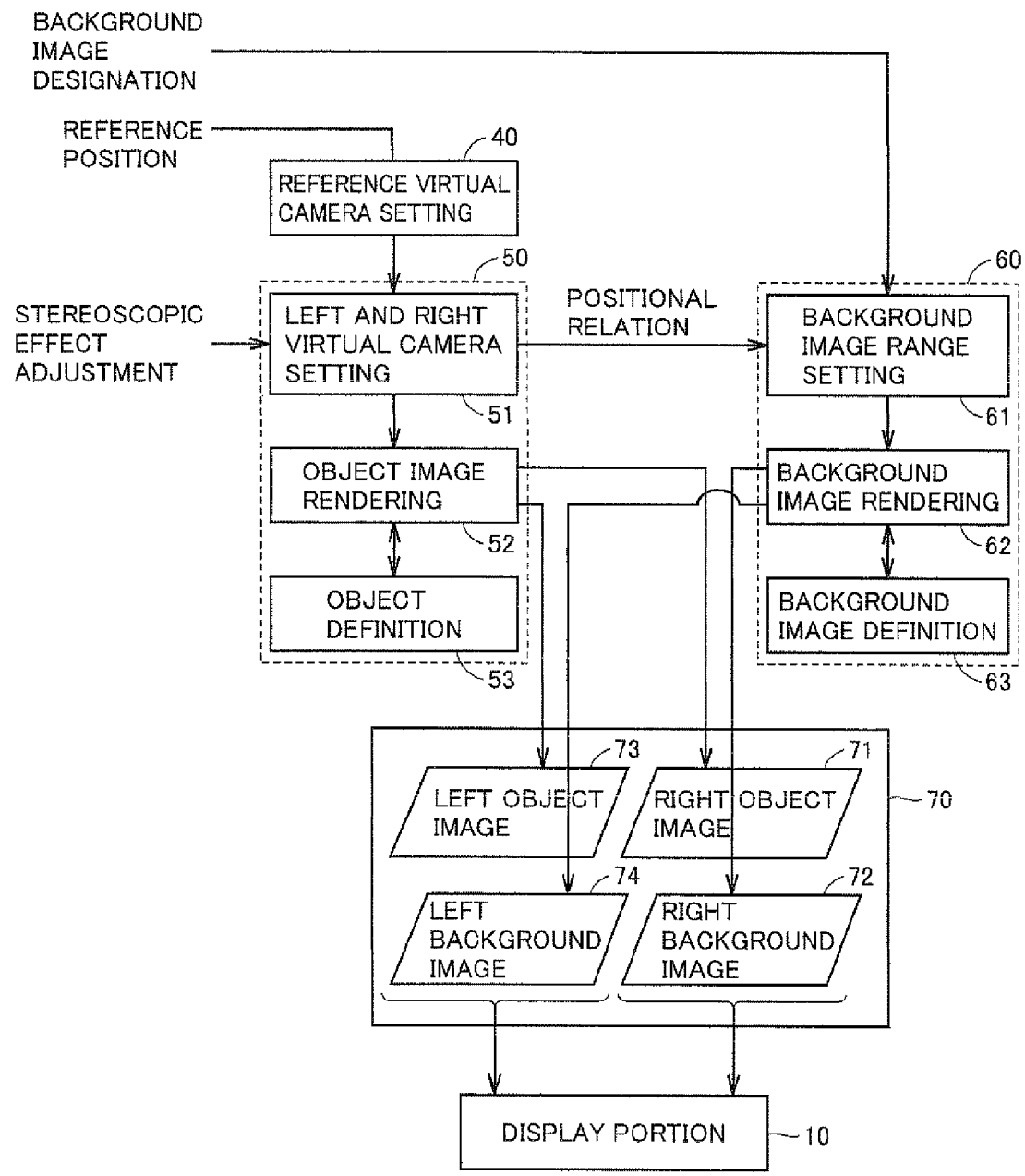
FIG. 4 schematically shows a function involved with stereoscopic display processing according to the present embodiment.

Referring to FIG. 4, stereoscopic display processing according to the present embodiment includes a reference virtual camera setting function 40, an object image generation function 50, a background image generation function 60, and a display data generation function 70.

Reference virtual camera setting function 40 sets camera information of the reference virtual camera (reference numeral 300 shown in FIG. 2) based on reference camera setting (such as a camera position, a camera direction, an angle of view, or the like) made with any method in accordance with contents of an application. For example, the reference virtual camera is set at a position for photographing a player character from a position behind the player character by a prescribed distance or at a position for photographing a direction in which a player character faces, from the position of the player character.

Object image generation function 50 generates a right object image 71 and a left object image 73 used for providing stereoscopic display of each object within the three-dimensional virtual space on display 10 by virtually photographing the object with the right virtual camera (reference numeral 302 shown in FIG. 2) and the left virtual camera (reference numeral 304 shown in FIG. 2).

Background image generation function 60 generates a right background image 72 and a left background image 74 used as a picture of a background of the object in stereoscopic display on display 10.

Display data generation function 70 uses right object image 71 and left object image 73 as well as right background image 72 and left background image 74 to generate data used for image display on display 10 (a right display image and a left display image).

Object image generation function 50 sets the right virtual camera and the left virtual camera (right virtual camera 302 and left virtual camera 304 shown in FIG. 2) on a straight line passing through the reference virtual camera and extending perpendicular to the camera direction of the reference virtual camera (a reference line 350 shown in FIG. 2), in accordance with the camera information of the reference virtual camera set by reference virtual camera setting function 40. Then, background image generation function 60 generates right background image 72 and left background image 74 such that these background images have relative relation in accordance with positional relation between the right virtual camera and the left virtual camera set by object image generation function 50.

By thus setting the right virtual camera and the left virtual camera on the straight line passing through the reference virtual camera and extending perpendicular to the camera direction of the reference virtual camera, an object within the three-dimensional virtual space viewed from a viewpoint corresponding to the reference virtual camera can readily stereoscopically be displayed. In addition, by causing generation of right background image 72 and left background image 74 to be in coordination with determination of setting values for the right virtual camera and the left virtual camera for generating right object image 71 and left object image 73 respectively, the background image can always be expressed on display 10 as a picture located on the rearmost side when viewed from the user.

More specifically, object image generation function 50 includes a left and right virtual camera setting function 51, an object image rendering function 52, and object definition 53. Left and right virtual camera setting function 51 sets the right virtual camera and the left virtual camera based on information on adjustment of stereoscopic effect in addition to the information on setting of the reference camera described above. This information on adjustment of stereoscopic effect is an indication indicating a degree of stereoscopic effect provided on display 10.

Left and right virtual camera setting function 51 determines positional relation between the right virtual camera and the left virtual camera also in accordance with this information on adjustment of stereoscopic effect. Moreover, when change in the degree of stereoscopic effect is indicated by some means, left and right virtual camera setting function 51 changes positional relation between the right virtual camera and the left virtual camera in accordance with that indication. Specific examples involved with such setting of the right virtual camera and the left virtual camera and adjustment of positional relation between the right virtual camera and the left virtual camera will be described in detail later with reference to FIGS. 13A to 13C, 14A to 14D, 15A to 15C, 19A to 19C, and the like.

Further, exemplary input means for accepting a request indicating a degree of stereoscopic effect provided on display 10 will be described later in detail with reference to FIGS. 16 to 18. Furthermore, in addition to such a manner as user's input, a manner restricting stereoscopic effect within a range intended in advance by a creator of an application or the like is also present as information on adjustment of stereoscopic effect.

Object image rendering function 52 generates right object image 71 and left object image 73 with reference to object definition 53, based on the setting values for the right virtual camera and the left virtual camera determined by left and right virtual camera setting function 51. This object definition 53 includes information on the three-dimensional virtual space, an object within the three-dimensional virtual space, and the like.

In addition, "positional relation" output from object image generation function 50 to background image generation function 60 is associated with an amount of parallax that could be generated between right object image 71 and left object image 73. More specifically, as a distance between the right virtual camera and the left virtual camera in the three-dimensional virtual space is greater (in other words, the two virtual cameras are more distant from each other), a greater amount of parallax can be generated between right object image 71 and left object image 73. Therefore, typically, background image generation function 60 generates right background image 72 and left background image 74 in accordance with a virtual space distance (in proportion to a generated amount of parallax) between the right virtual camera and the left virtual camera. It is noted that the positional relation between the right virtual camera and the left virtual camera is not limited to a virtual space distance which is a straight-line distance between these virtual cameras, and a difference in angle with regard to a specific reference point or the like may be employed.

If a virtual space distance between the right virtual camera and the left virtual camera is adopted as positional relation output from this object image generation function 50 to background image generation function 60, a standardized value with a rendering range displayed on display 10 serving as the reference may be employed. Namely, in a certain preferred form, object image generation function 50 outputs as "positional relation", a ratio of a "distance between the right virtual camera and the left virtual camera" to a "width in a left/right direction of the reference virtual plane region (see FIG. 3)," which is a virtual plane included in the view volume (reference numeral 380 in FIG. 1) of the reference virtual camera and extending perpendicular to the camera direction of the reference virtual camera. Then, background image generation function 60 generates right background image 72 and left background image 74 in accordance with this ratio of distance.

More specifically, background image generation function 60 includes a background image range setting function 61, a background image rendering function 62, and background image definition 63. Typically, background image definition 63 includes information on original background image BG (see FIGS. 1 and 2) having a size greater than a size of display on display 10. Background image range setting function 61 sets a right rendering range (a right rendering range 412 shown in FIG. 22B which will be described later) to be output as right background image 72 with respect to original background image BG included in background image definition 63, and sets a left rendering range (a left rendering range 414 shown in FIG. 22B which will be described later) to be output as left background image 74 at a position set by displacing the right rendering range by a distance obtained by multiplying a width of the right rendering range by a ratio of the "distance between right virtual camera 302 and left virtual camera 304" to the "width in the left/right direction of the reference virtual plane region."

As an alternative configuration, background image definition 63 may include information, for example, on another three-dimensional virtual space for generating a background image (a three-dimensional virtual space VS shown in FIG. 23 which will be described later), a background object within the three-dimensional virtual space (original background image BG shown in FIG. 23), and the like. In this case, background image range setting function 61 sets the right virtual camera (a right virtual camera (background) 402 shown in FIG. 24) for generating right background image 72 by virtually photographing a background object and the left virtual camera (a left virtual camera (background) 404 shown in FIG. 24) for generating the left background image by virtually photographing the background object, with the reference virtual camera (reference virtual camera 400 shown in FIG. 24 which will be described later) set within the three-dimensional virtual space for generating the background image serving as the reference. Then, as the respective, set virtual cameras virtually photograph the background object, the right background image and the left background image are generated. It is noted that a method of setting right virtual camera 402 and left virtual camera 404 in this case will be described in detail in [d3. Variation 1] which will be described later.

In addition, typically, display data generation function 70 generates display data for the right eye and the left eye displayed on display 10 by superimposing the images for the right eye and the left eye. More specifically, display data generation function 70 generates display data for the right eye by superimposing right object image 71 on right background image 72. Similarly, display data generation function 70 generates display data for the left eye by superimposing left object image 73 on left background image 74.

Though a position, a view volume and the like within the three-dimensional virtual space of each camera described above can be designated with any method, from a point of view of maintaining consistency with a rendering technique or the like for a related three-dimensional virtual space, they are preferably defined as a camera matrix (a projection matrix and a view matrix). Details of the camera matrix will be described later.

[a5. Typical Application]

As described above, processing for independently rendering an object (generating an object image) to which user's attention is desirably paid and rendering an image displayed as the background of the object (generating a background image) is appropriate, for example, for such an application that the user operates a specific character object and enjoys, such as a shooting game or an action game. For example, considering a shooting game in which scroll display toward the rear of the display surface of display 10 is provided as the game proceeds, a user's own character (such as a fighter plane), an enemy character or the like should be rendered with its display position or a display manner on the display surface of display 10 being varied in accordance with the user's operation. On the other hand, the background (such as sky, the horizon, the sun, the cosmic space, or the like) is preferably rendered with its contents being substantially fixed. This is because, in a real space as well, for example, sky, the horizon, the sun, the cosmic space, or the like is located substantially at a position at infinity, and therefore even when a viewpoint is varied, how it is viewed is not considerably varied. In order to be able to express such actual view in the real space on display 10, independently of movement of an object to which user's attention is desirably paid, the background image is rendered in a substantially fixed state (or in a state slower in scroll speed).

Naturally, the stereoscopic display processing according to the present embodiment is applicable also to such processing as successively updating contents displayed as the background image as an application proceeds. For example, considering processing in which a viewpoint at which a character object is rendered is successively changed in accordance with the user's operation, a distance to the character object is different from a distance to the background, and hence even when viewed from the same viewpoint, how they are viewed (a speed of change) is different. Therefore, in such a case, the background image is generated/updated independently of the object image such that scroll display of the background can be provided at a speed different from a moving speed of the character object.

<B. Typical Mounting>

[b1. Display]

A display device of any type capable of providing stereoscopic display to the user can be adopted as display 10. Namely, any device allowing a user to visually recognize two images having parallax with respective eyes may be adopted as display 10. Typically, for example, a front parallax barrier type liquid crystal display device, a lenticular type display device or the like can be adopted. Alternatively, a configuration in which two images different in contained main wavelength component are independently displayed and stereoscopic display is provided by having the user wear glasses incorporating two respective color filters different in transmitted wavelength range may be adopted. Similarly, a configuration may be such that two images are displayed with directions of polarization being differed and stereoscopic display is provided by having the user wear glasses incorporating two respective polarizing filters corresponding to the two directions of polarization.

A configuration of display 10 in a case where a front parallax barrier type configuration having a parallax barrier is adopted as a parallax optical system will be described hereinafter with reference to FIG. 5. In this display 10, by displaying a pair of a right display image and a left display image having certain parallax on the display surface thereof, the user can visually recognize stereoscopic effect in accordance with an amount of parallax between the left and right display images.

Figure 5:
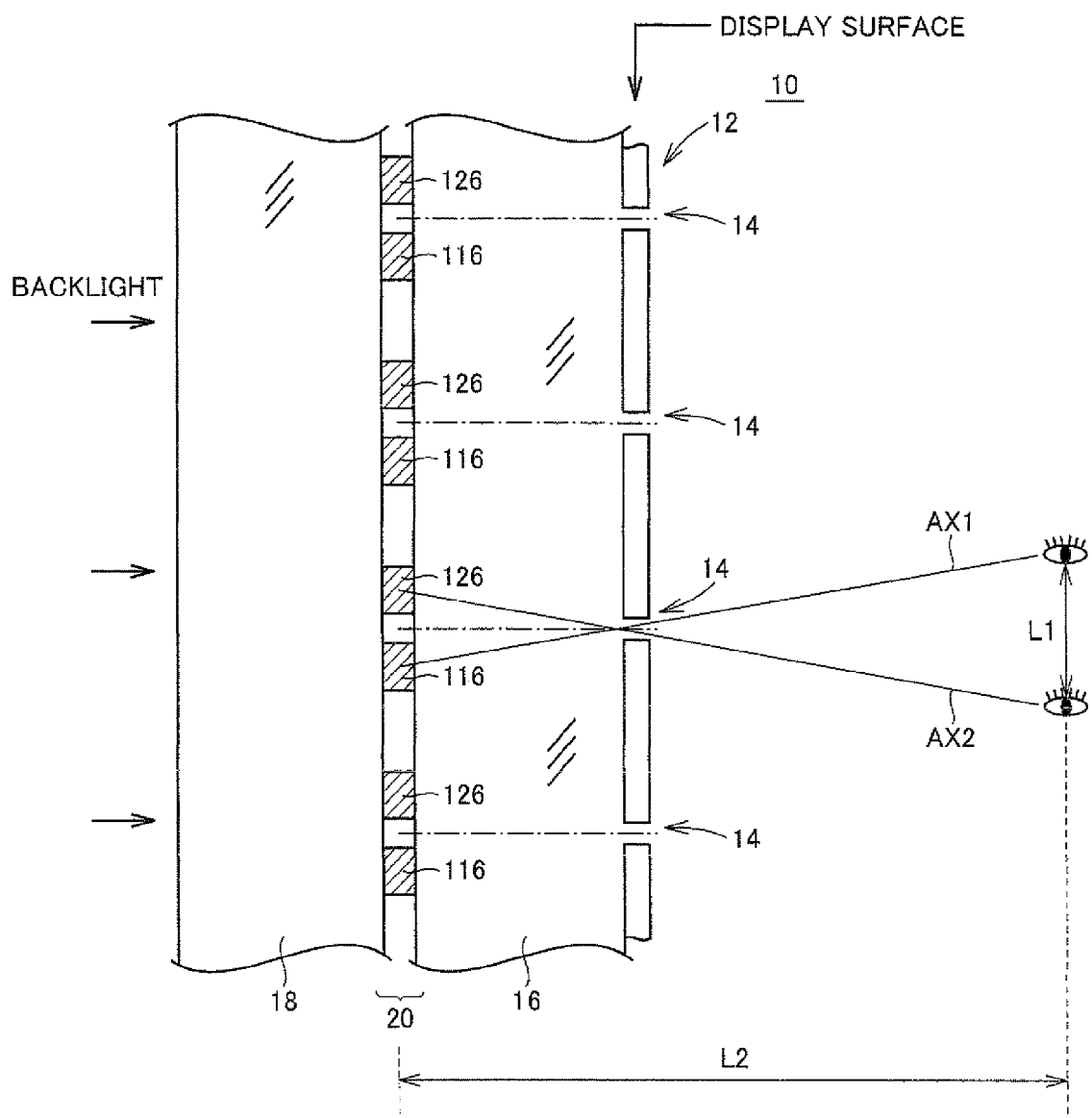
FIG. 5 shows one example of a structure of a display according to the present embodiment.

FIG. 5 shows a cross-sectional structure of a front parallax barrier type liquid crystal display device. Display 10 shown in FIG. 5 is configured such that, when the user faces display 10, light beams from different pixels enter fields of view of the user's right and left eyes respectively, owing to the parallax barrier.

More specifically, display 10 includes a first LCD 116 and a second LCD 126 provided between a glass substrate 16 and a glass substrate 18. Each of first LCD 116 and second LCD 126 includes a plurality of pixels and is a spatial light modulator for adjusting light from a backlight for each pixel. Typically, pixels in first LCD 116 and pixels in second LCD 126 are alternately arranged. A not-shown backlight is provided on a side of glass substrate 18 opposite to glass substrate 16 and light from this backlight is emitted toward first LCD 116 and second LCD 126.

A parallax barrier 12 which is a parallax optical system is provided on a side opposite to the side where glass substrate 16 is in contact with first LCD 116 and second LCD 126. In this parallax barrier 12, a plurality of slits 14 are provided in rows and columns at prescribed intervals. Corresponding pixels of first LCD 116 and corresponding pixels of second LCD 126 are arranged symmetrically to each other, with an axis passing through a central position of each slit 14 and perpendicular to a surface of glass substrate 16 serving as the reference. By appropriately controlling positional relation with pixels corresponding to such slit 14 as well as first LCD 116 and second LCD 126 in accordance with an image to be displayed, prescribed parallax between the user's eyes can be provided.

Namely, each slit 14 in parallax barrier 12 restricts a field of view of each of the user's right and left eyes to a corresponding angle. Typically, the user's right eye can visually recognize only the pixels of first LCD 116 on an optical axis AX1, while the user's left eye can visually recognize only the pixels of second LCD 126 on an optical axis AX2. Here, by causing the pixels of first LCD 116 and the pixels of second LCD 126 to display the corresponding pixels of two respective images having prescribed parallax, prescribed parallax can be given to the user.

In the example shown in FIG. 5, the surface of parallax barrier 12 on the user side corresponds to the "display surface" of display 10.

[b2. System Configuration]

Figure 6:
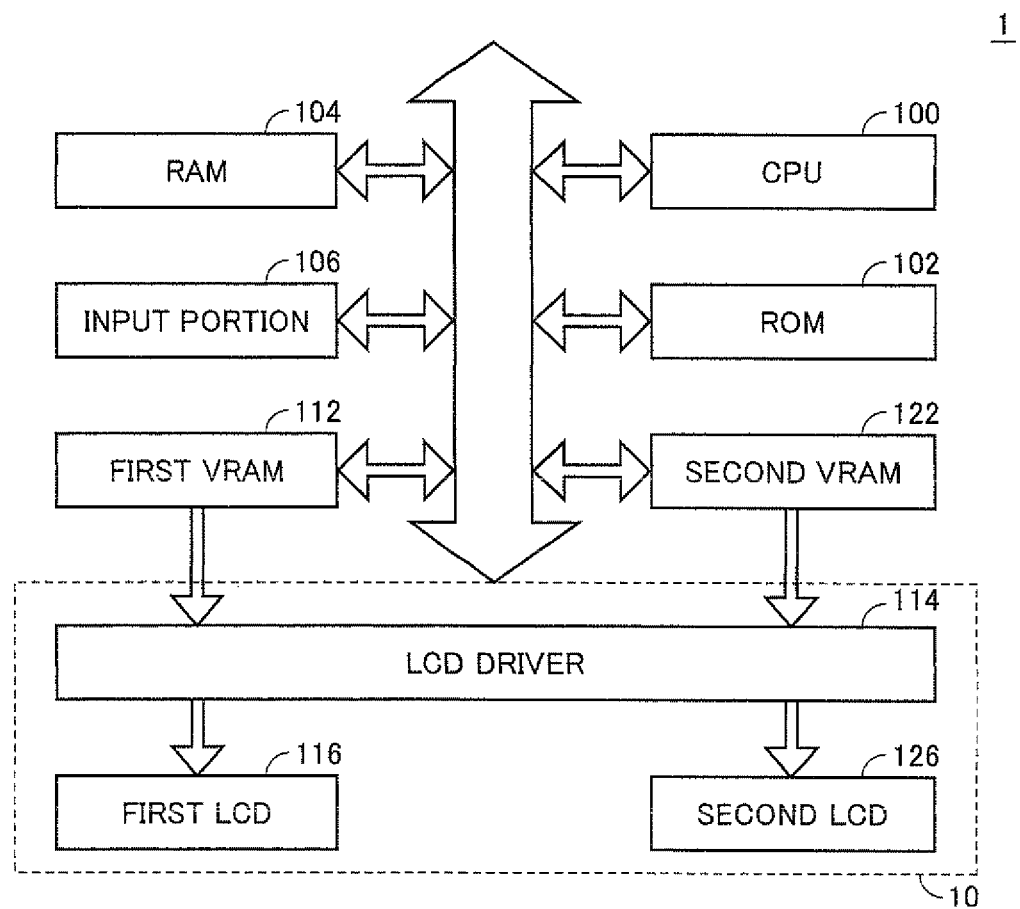
FIG. 6 shows an internal configuration of an information processing system according to the present embodiment.

Referring to FIG. 6, an information processing system 1 according to the present embodiment is typically a computer capable of performing processing using a processor. It is noted that information processing system 1 may be implemented by a personal computer, a work station, a portable terminal, a PDA (Personal Digital Assistant), a portable telephone, a portable game device, or the like.

Information processing system 1 includes display 10, a CPU (Central Processing Unit) 100, a ROM (Read Only Memory) 102, a RAM (Random Access Memory) 104, an input portion 106, and first and second VRAMs (Video RAMS) 112 and 122. It is noted that these portions are connected to each other through an internal bus so that data can be communicated therebetween.

CPU 100 executes a program stored in ROM 102 or the like by developing the program in RAM 104. By executing the program, CPU 100 provides display control processing or accompanying various types of processing as will be described later. It is noted that a program executed by CPU 100 may be distributed on a non-transitory storage medium such as a DVD-ROM (Digital Versatile Disc ROM), a CD-ROM (Compact Disk ROM), a flexible disc, a flash memory, various memory cassettes, and the like. Therefore, information processing system 1 may read a stored program code or the like from such a storage medium. In such a case, information processing system 1 is adapted to make use of a reading device adapted to a storage medium. Alternatively, in an example where a program as described above is distributed through a network, the distributed program may be installed in information processing system 1 through a not-shown communication interface or the like.

As will be described later, the program according to the present embodiment may be classified into an application and a library commonly utilized by a plurality of applications (or a sub routine or a module). In this case, for example, such a configuration that firmware including a library is stored in advance in ROM 102 or the like and an application stored in a non-transitory storage medium that can be attached to information processing system 1 is read and executed by CPU 100 is also possible.

ROM 102 is a device for storing a program to be executed by CPU 100 as described above, various setting parameters and the like in a non-volatile manner. Typically, ROM 102 is implemented by a mask ROM, a semiconductor flash memory or the like.

RAM 104 functions as a work memory for developing a program to be executed by CPU 100 as described above or temporarily storing data necessary for execution of the program. In some cases, RAM 104 may also store data of images to be used for providing three-dimensional display on information processing system 1.

Input portion 106 is a device for accepting a user's operation, and it is typically implemented by a keyboard, a mouse, a touch pen, a trackball, a pen tablet, various types of buttons (switches), or the like. When input portion 106 accepts any user's operation thereon, it transmits a signal indicating corresponding operation contents to CPU 100.

First VRAM 112 and second VRAM 122 are storage devices for storing data corresponding to a right display image to be displayed on first LCD 116 and to a left display image to be displayed on second LCD 126. Namely, display data obtained through display control processing or the like as will be described later, which is performed by CPU 100, is successively written in first VRAM 112 and second VRAM 122. Then, rendering processing in display 10 is controlled based on the display data written in first VRAM 112 and second VRAM 122.

Display 10 includes an LCD driver 114 in addition to first LCD 116 and second LCD 126 described above. LCD driver 114 is associated with first VRAM 112 and second VRAM 122. LCD driver 114 controls turn-on/turn-off (ON/OFF) of pixels constituting first LCD 116 based on the display data written in first VRAM 112, and controls turn-on/turn-off (ON/OFF) of pixels constituting second LCD 126 based on the display data written in second VRAM 122.

[b3. Program Configuration]

Figure 7A:
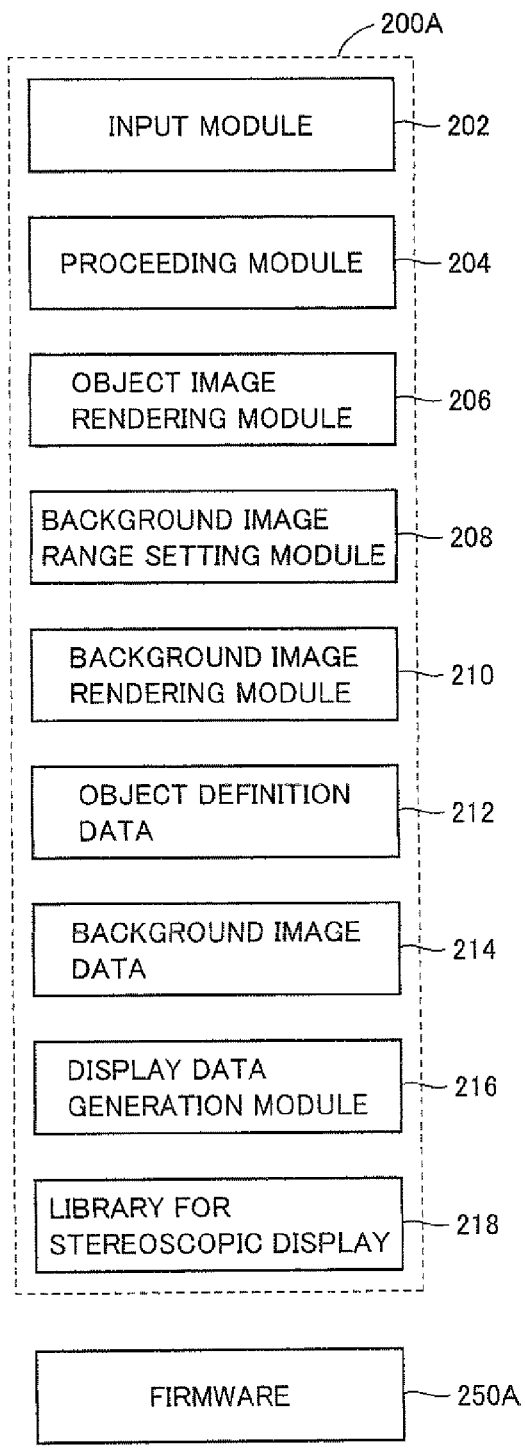
FIGS. 7A and 7B show one example of a program configuration mounted on the information processing system according to the present embodiment.

FIG. 7A is a diagram showing one example of a program configuration mounted on information processing system 1 according to the present embodiment. In information processing system 1 shown in FIG. 7A, an application 200A and firmware 250A are mounted. Typically, application 200A is distributed as stored in a storage medium, and firmware 250A is stored in advance in ROM 102 (FIG. 6) or the like. CPU 100 of information processing system 1 reads and executes instructions included in application 200A and firmware 250A as necessary.

Application 200A includes an input module 202, a proceeding module 204, an object image rendering module 206, a background image range setting module 208, a background image rendering module 210, object definition data 212, background image data 214, a display data generation module 216, and a library for stereoscopic display 218. Input module 202 generates an internal command in accordance with an indication provided through input portion 106 (FIG. 6) or the like by the user. Proceeding module 204 proceeds with the application in accordance with the internal command generated by input module 202. Namely, proceeding module 204 successively updates display data or various parameters as the application proceeds.

Object image rendering module 206 generates a right object image and a left object image with reference to object definition data 212, in accordance with a value of a parameter or the like successively updated by proceeding module 204. Namely, object image rendering module 206 provides object image rendering function 52 shown in FIG. 4. More specifically, when proceeding module 204 designates only information on reference virtual camera 300 shown FIG. 2, object image rendering module 206 calls library for stereoscopic display 218 so as to obtain information on right virtual camera 302 and left virtual camera 304, and generates a right object image and a left object image based on the obtained information (details will be described later).

Background image range setting module 208 determines respective ranges to be generated as a right background image and a left background image, in accordance with a parameter successively updated by proceeding module 204 and/or a range or the like rendered by object image rendering module 206. Namely, background image range setting module 208 provides background image range setting function 61 shown in FIG. 4. More specifically, when object image rendering module 206 calls library for stereoscopic display 218, a ratio of a distance between right virtual camera 302 and left virtual camera 304 with a width of the reference virtual plane region (see FIG. 3) with regard to reference virtual camera 300 shown FIG. 2 serving as the reference is output as a return value thereof. Object image rendering module 206 sets respective rendering ranges in the right background image and the left background image as displaced from each other by a distance obtained by multiplying a width of a background image to be displayed by the ratio of the distance above (details will be described later).

Background image rendering module 210 generates a right background image and a left background image with reference to background image data 214, in accordance with the rendering range set by background image range setting module 208.

Object definition data 212 includes definition of a three-dimensional virtual space for generating an object image and an object included in the three-dimensional virtual space. Background image data 214 includes image data for generating a background image.

Display data generation module 216 generates a right display image and a left display image based on the right object image and the left object image generated by object image rendering module 206 and on the right background image and the left background image generated by background image rendering module 210. Namely, display data generation module 216 provides display data generation function 70 shown in FIG. 4.

Library for stereoscopic display 218 calculates respective setting values for right virtual camera 302 and left virtual camera 304 for providing stereoscopic display, in response to designation of information or the like on reference virtual camera 300 shown in FIG. 2. In addition, library for stereoscopic display 218 outputs the calculated value indicating positional relation between right virtual camera 302 and left virtual camera 304 as a return value. Details of an interface of library for stereoscopic display 218 will be described later.

Firmware 250A provides a function for controlling each piece of hardware constituting information processing system 1 shown in FIG. 6 or a function for displaying a menu screen or the like. It is noted that a part or the entirety of an OS (Operating System) may be included as firmware 250A.

Figure 7B:
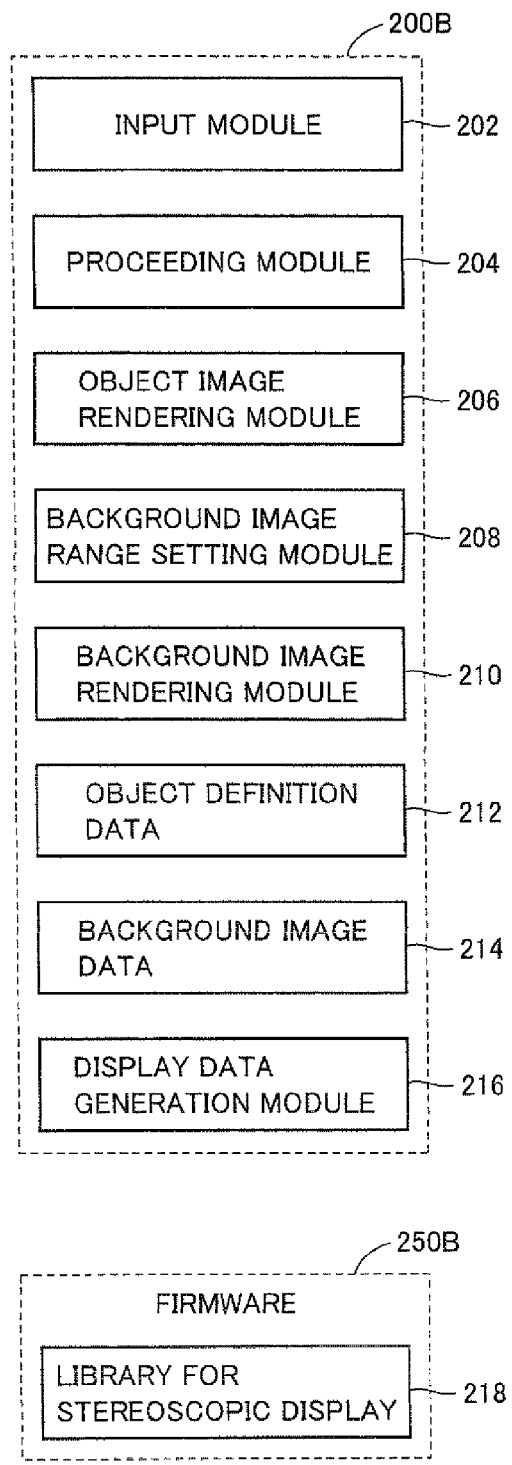

Though an example where application 200A includes library for stereoscopic display 218 in the program configuration shown in FIG. 7A is shown, this library for stereoscopic display 218 may be mounted in a form shared by a plurality of applications including stereoscopic display, as shown in FIG. 7B.

FIG. 7B is a diagram showing another example (a variation) of a program configuration mounted on information processing system 1 according to the present embodiment. In the program configuration shown in FIG. 7B, library for stereoscopic display 218 is incorporated as a part of firmware 250B. On the other hand, an application 200B does not include library for stereoscopic display 218, and it calls library for stereoscopic display 218 of firmware 250B as necessary.

[b4. Library for Stereoscopic Display]

FIG. 8 is a diagram for illustrating a data item input and output to/from library for stereoscopic display 218 shown in FIGS. 7A and 7B. Library for stereoscopic display 218 according to the present embodiment allows selection between two modes (an "application-priority mode" and a "real mode"), as a mode involved with stereoscopic display on display 10. Though details of these two modes will be described later, mode information indicating one of the two modes above is designated when library for stereoscopic display 218 is made use of. Then, a parameter as shown below is input to library for stereoscopic display 218.

Specifically, when the "application-priority mode" is designated, library for stereoscopic display 218 accepts input of (1) reference virtual camera information, (2) reference virtual plane information, (3) parallax assessment plane information, and (4) mode information, and outputs (5) right virtual camera information, (6) left virtual camera information, and (7) a distance between the virtual cameras.

(1) Reference virtual camera information is information defining an arrangement position, a view volume and the like of reference virtual camera 300 shown in FIG. 2 (respective setting values for a viewing angle, a near clipping plane, a far clipping plane, and the like), and typically, a camera matrix is used. Though details will be described later, this camera matrix includes a projection matrix and a view matrix.

(2) Reference virtual plane information is information for defining a position of the reference virtual plane (a plane including the reference virtual plane region) (see FIG. 3) with respect to reference virtual camera 300 shown in FIG. 2, and typically it includes a virtual space distance from an arrangement position of reference virtual camera 300 to the reference virtual plane (reference virtual plane region) (see FIG. 3).

(3) Parallax assessment plane information is information for defining the parallax assessment plane, and typically it includes a virtual space distance from an arrangement position of reference virtual camera 300 shown in FIG. 2 to the parallax assessment plane or a distance between the reference virtual plane and the parallax assessment plane.

(4) Mode information includes any of the "application-priority mode" and the "real mode" described above.

(5) Right virtual camera information is information defining an arrangement position, a view volume and the like (respective setting values for a viewing angle, a near clipping plane, a far clipping plane, and the like) of right virtual camera 302 calculated in accordance with the setting of reference virtual camera 300 shown in FIG. 2. Similarly, (6) left virtual camera information is information defining an arrangement position, a view volume and the like (respective setting values for a viewing angle, a near clipping plane, a far clipping plane, and the like) of left virtual camera 304 calculated in accordance with the setting of reference virtual camera 300 shown in FIG. 2. Typically, for any of the right virtual camera information and the left virtual camera information, a camera matrix including a projection matrix and a view matrix is used.

(7) Distance between the virtual cameras is information indicating positional relation between right virtual camera 302 and left virtual camera 304 calculated in accordance with the setting of reference virtual camera 300, and it includes information on a distance between right virtual camera 302 and left virtual camera 304 in the three-dimensional virtual space. Preferably, a value obtained by standardizing a distance between right virtual camera 302 and left virtual camera 304, specifically, a ratio of a distance between right virtual camera 302 and left virtual camera 304 with a width of the reference virtual plane region (see FIG. 3) serving as the reference, is used as the distance between the virtual cameras.

Meanwhile, when the "real mode" is designated, library for stereoscopic display 218 accepts input of (1) reference virtual camera information, (2) reference virtual plane information and (3') a reference degree of stereoscopic effect, and outputs (5) right virtual camera information, (6) left virtual camera information and (7) a distance between the virtual cameras. Namely, when the "real mode" is designated, library for stereoscopic display 218 accepts (3') reference degree of stereoscopic effect instead of (3) parallax assessment plane information.

(3') Reference degree of stereoscopic effect is a parameter for adjusting stereoscopic effect in stereoscopic display on display 10. In the "real mode" according to the present embodiment, setting of right virtual camera 302 and left virtual camera 304 for providing stereoscopic display close to real is made. Depending on a type of an application or a proceeding condition, however, stereoscopic display close to real may not necessarily be desired. In such a case, stereoscopic effect in stereoscopic display is adjusted by setting (3') reference degree of stereoscopic effect as appropriate.

It is noted that these input and output values (including a matrix value) may be held in a variable storage area accessible by any module included in library for stereoscopic display 218 and applications 200A and 200B.

As described above, library for stereoscopic display 218 outputs information indicating a view volume set for each of right virtual camera 302 and left virtual camera 304. Namely, with the program according to the present embodiment, by providing the setting information of the reference virtual camera to library for stereoscopic display 218, setting information of two virtual cameras of right virtual camera 302 and left virtual camera 304 can be obtained.

<C. Object Image Generation Processing>

Details of processing for generating a right object image and a left object image including processing contents in library for stereoscopic display 218 will be described hereinafter.

[c1. Overview]

Figure 9:
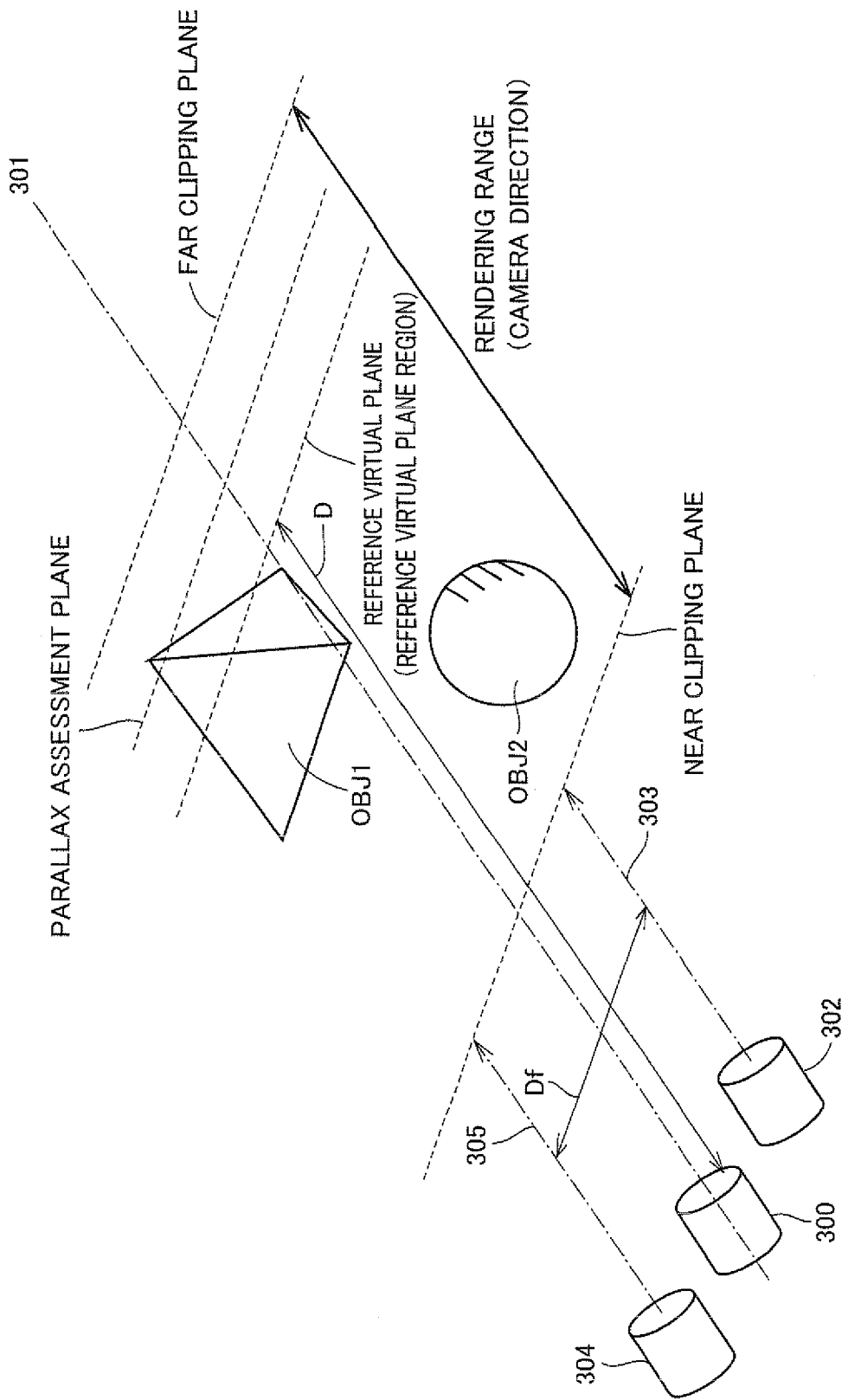
FIG. 9 schematically shows one example of a three-dimensional virtual space to be subjected to object image generation processing according to the present embodiment.
Figure 10:
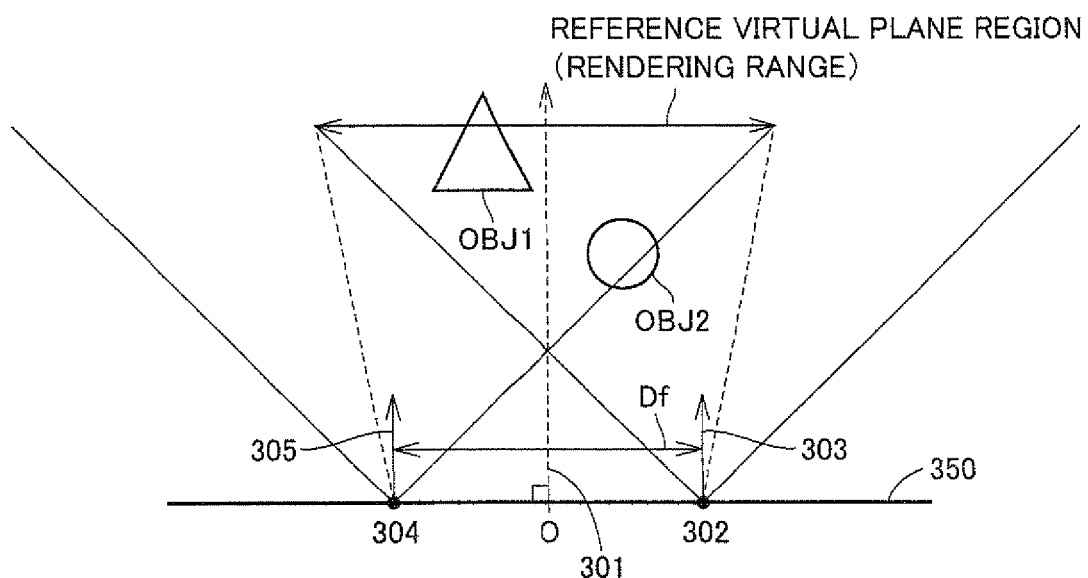
FIG. 10 schematically shows generation processing of an object image (a right object image and a left object image) generated in a state shown in FIG. 9.

As shown in FIGS. 9 and 10, in the present embodiment, basically, stereoscopic display is provided by using a pair of object images (stereo images) including a common display target (a subject) and having prescribed parallax. Such a pair of object images is dynamically generated by arranging a pair of virtual cameras (right virtual camera 302 and left virtual camera 304) within the three-dimensional virtual space and virtually photographing an object within the three-dimensional virtual space with this pair of virtual cameras. Namely, a pair of object images is rendered by using two virtual cameras different in viewpoint for a common object, with a computer graphics technique such as polygon generation.

In the three-dimensional virtual space shown in FIGS. 9 and 10, it is assumed that right virtual camera 302 and left virtual camera 304 are arranged at a distance from each other by a virtual space distance Df. With such arrangement, parallax in accordance with this virtual space distance Df is generated between the right object image and the left object image generated by right virtual camera 302 and left virtual camera 304 respectively. It is noted that a right camera direction 303 in which right virtual camera 302 photographs the three-dimensional virtual space is the same as a left camera direction 305 in which left virtual camera 304 photographs the three-dimensional virtual space. Namely, right camera direction 303 is in parallel to left camera direction 305.

It is assumed that objects OBJ1 and OBJ2 are arranged in this order, from the side farther from right virtual camera 302 and left virtual camera 304. By way of example, object OBJ1 is assumed as a quadrangular pyramid and object OBJ2 is assumed as a sphere.

Each of right virtual camera 302 and left virtual camera 304 renders only an object within a prescribed range in a corresponding camera direction in the three-dimensional virtual space. Namely, right virtual camera 302 renders a range included in the view volume defined by the corresponding viewing angle, the near clipping plane and the far clipping plane, and left virtual camera 304 renders a range included in the view volume defined by the corresponding viewing angle, the near clipping plane and the far clipping plane.

In addition, within the three-dimensional virtual space, the reference virtual plane and the reference virtual plane region which is a partial region on the reference virtual plane are set. This reference virtual plane (or the reference virtual plane region) is a plane (or a region) corresponding to a position on the display surface of display 10 as described above, and it is set perpendicular to any of right camera direction 303 and left camera direction 305. This reference virtual plane region defines a position and a region within the three-dimensional virtual space, of which presence the user feels around the display surface of display 10 when stereoscopic display is provided on display 10.

Figure 11:
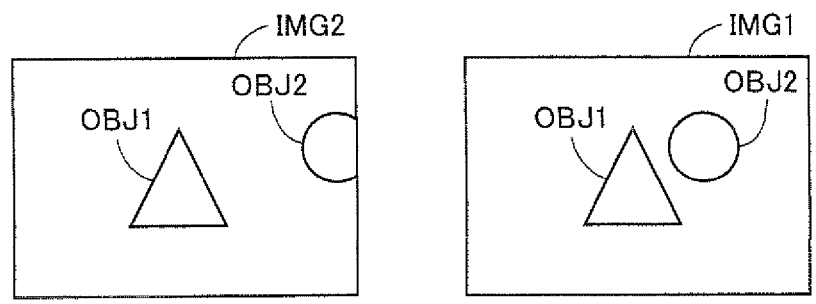
FIG. 11 shows one example of object images generated by a right virtual camera and a left virtual camera shown in FIG. 10, respectively.

When the rendering range (view volume) is thus set, right virtual camera 302 and left virtual camera 304 generate object images as shown in FIG. 11, respectively. FIG. 11 illustrates a right object image IMG1 generated as a result of virtual photographing by right virtual camera 302 in the three-dimensional virtual space as shown in FIGS. 9 and 10 and a left object image IMG2 as a result of virtual photographing by left virtual camera 304 therein.

When right object image IMG1 and left object image IMG2 are compared with each other, a position where object OBJ1 is present within right object image IMG1 substantially matches with a position of object OBJ1 within left object image IMG2. In contrast, a position of object OBJ2 within right object image IMG1 is different from a position where object OBJ2 is present within left object image IMG2. Namely, a user facing display 10 visually recognizes object OBJ1 with no parallax, while he/she recognizes object OBJ2 with a certain amount of parallax.

In other words, as shown in FIG. 9, since the reference virtual plane (reference virtual plane region) is set within the three-dimensional virtual space at a position passing through object OBJ1, how object OBJ1 is displayed is identical between the right object image and the left object image. Consequently, there is substantially no parallax for object OBJ1 on the display surface of display 10, and for the user, a space around object OBJ1 just looks like present around the display surface of display 10.

As described above, it is considered as general that an object to which the user's attention is desirably paid (object OBJ1 in the example described above) is stereoscopically displayed as if it were located around the display surface of display 10. In order to thus stereoscopically display an object to which the user's attention is desirably paid, right virtual camera 302 and left virtual camera 304 should be set within the three-dimensional virtual space, and in succession the reference virtual plane should be set at a position in accordance with a position of the object to desirably be displayed around the display surface of display 10, in a manner perpendicular to right camera direction 303 and left camera direction 305.

In the present embodiment, from a point of view of lessening processing load in rendering involved with an object, a rendering range (view volume) of each of right virtual camera 302 and left virtual camera 304 is set with the reference virtual plane region serving as the reference. As shown in FIG. 10, in a case where right virtual camera 302 and left virtual camera 304 are set on reference line 350 passing through these virtual cameras at a distance from each other by virtual space distance Df, each of right virtual camera 302 and left virtual camera 304 can render the view volume with its arrangement position serving as the reference. In the present embodiment, the rendering range with the reference virtual plane region serving as the reference is set. Namely, for right virtual camera 302, a view volume defined by an arrangement position thereof and an outer perimeter of the reference virtual plane region is set as the rendering range. For left virtual camera 304 as well, a view volume defined by an arrangement position thereof and an outer perimeter of the reference virtual plane region is set as the rendering range.

By thus setting the respective view volumes defined by the outer perimeter of the reference virtual plane region for right virtual camera 302 and left virtual camera 304, the right object image and the left object image generated by right virtual camera 302 and left virtual camera 304 respectively can be used for stereoscopic display on display 10 as they are. More specifically, the right object image output from right virtual camera 302 is written in first VRAM 112 (FIG. 6) as it is, while the left object image output from left virtual camera 304 is written in second VRAM 122 (FIG. 6) as it is. Thus, in the present embodiment, an (extra) image in a range not used for display on display 10 is not generated. Therefore, unnecessary rendering processing can be avoided.

Meanwhile, when an object arranged within the three-dimensional virtual space, to which the user's attention is desirably paid, is stereoscopically displayed on display 10, fields of view (view volumes) different from each other should be set for right virtual camera 302 and left virtual camera 304, respectively. Therefore, a creator of an application including stereoscopic display should appropriately designate respective setting values (such as an arrangement position, a view volume and the like) for the right virtual camera and the left virtual camera, in accordance with an object to which the user's attention is desirably paid, in each scene associated with proceeding of the application. Such an operation imposes great load on the creator and may impede creation of an application utilizing stereoscopic display.

The program according to the present embodiment (typically mounted as library for stereoscopic display 218 described above) provides a function for allowing automatic setting of various parameters necessary for providing stereoscopic display, simply by designating a parameter similar to that in an application utilizing only two-dimensional display (not utilizing stereoscopic display) as shown in FIG. 1.

More specifically, as in the application utilizing only two-dimensional display, a creator sets single reference virtual camera 300 (see FIGS. 2 and 3) at a position in accordance with an object to be displayed on display 10. It is noted that a setting value for this reference virtual camera includes a value of an arrangement position of reference virtual camera 300 and a value of a corresponding view volume. In addition to such setting items, the creator sets as the reference virtual plane, a position where an object to be displayed around the display surface of display 10 is present. Then, a region included inside the view volume of the reference virtual camera in the reference virtual plane is determined as the reference virtual plane region.

Then, the program according to the present embodiment calculates the respective arrangement positions, the view volumes and the like of right virtual camera 302 and left virtual camera 304 based on the setting as described above. Through such processing, the creator of the application utilizing stereoscopic display can stereoscopically display an intended range within the three-dimensional virtual space on display 10, with workload as much as in development of an application utilizing only two-dimensional display. In addition, since an object present around the reference virtual plane region is displayed on the display surface of display 10 with no parallax or little parallax, the user who plays the application can most readily visually recognize that object. In addition, since it is ensured that the region set as the reference virtual plane region is reliably displayed on display 10, the creator of the application should only take into account the reference virtual camera and the reference virtual plane region, without considering respective setting values and the like for right virtual camera 302 and left virtual camera 304. Therefore, development of an application is facilitated.

Moreover, depending on contents in an application, real display of a state of the three-dimensional virtual space to the user may be desired. Namely, it may also be effective to give the user feeling as if he/she were present in the three-dimensional virtual space. In this case, owing to stereoscopic display on display 10, the user will feel as if an actual display target were really present at the site.

As described above, depending on contents or proceeding of an application, such need as how stereoscopic display should be provided to the user is different. Therefore, in the program according to the present embodiment, at least two modes (the "application-priority mode" and the "real mode" described above) are prepared. Then, as the creator of the application designates any mode to be used, respective setting values for right virtual camera 302 and left virtual camera 304 in accordance with that mode are automatically determined.

More specifically, in the "application-priority mode," respective setting values for right virtual camera 302 and left virtual camera 304 are determined such that contents in a range intended by the creator of the application can stereoscopically be displayed. Meanwhile, in the "real mode", respective setting values for right virtual camera 302 and left virtual camera 304 are determined such that the user can be given feeling as if he/she were present in the three-dimensional virtual space.

Details of processing for determining respective setting values for right virtual camera 302 and left virtual camera 304 in each mode will be described hereinafter.

[c2. Application-Priority Mode]

In the "application-priority mode," the creator of the application designates an arrangement position and a view volume (rendering range) of a single reference virtual camera (reference virtual camera 300 shown in FIGS. 2 and 3) as in creation of an application utilizing only two-dimensional display (not utilizing stereoscopic display) ((1) reference virtual camera information shown in FIG. 8). At the same time, the creator designates which two-dimensional position within a space included in the designated view volume is desirably displayed to be located around the display surface in stereoscopic display on display 10 ((2) reference virtual plane information shown in FIG. 8). In addition, the creator evaluates an amount of parallax generated between the right object image and the left object image and designates a parallax assessment plane for ensuring that the user can comfortably accept stereoscopic display on display 10 ((3) parallax assessment plane information shown in FIG. 8).

In response to this designation, library for stereoscopic display 218 sets right virtual camera 302 and left virtual camera 304 such that parallax generated between the right object image generated by right virtual camera 302 and the left object image generated by left virtual camera 304 does not exceed a predetermined value. Then, library for stereoscopic display 218 outputs (5) right virtual camera information for defining set right virtual camera 302 and (6) left virtual camera information for defining set left virtual camera 304, and outputs (7) distance between the virtual cameras indicating positional relation between right virtual camera 302 and left virtual camera 304.

(c2-i. Projection Matrix and View Matrix)

In the description below, an example where (1) reference virtual camera information, (5) right virtual camera information and (6) left virtual camera information are all defined as a camera matrix is shown. This camera matrix will now be described.

This camera matrix represents one example of a method of defining a field of view (view volume) of a virtual camera, and it typically includes a view matrix (3 rows×4 columns) for converting a three-dimensional virtual space in a direction viewed from the virtual camera and a projection matrix (4 rows×4 columns) for projection on a two-dimensional screen (projection plane).

Figure 12:
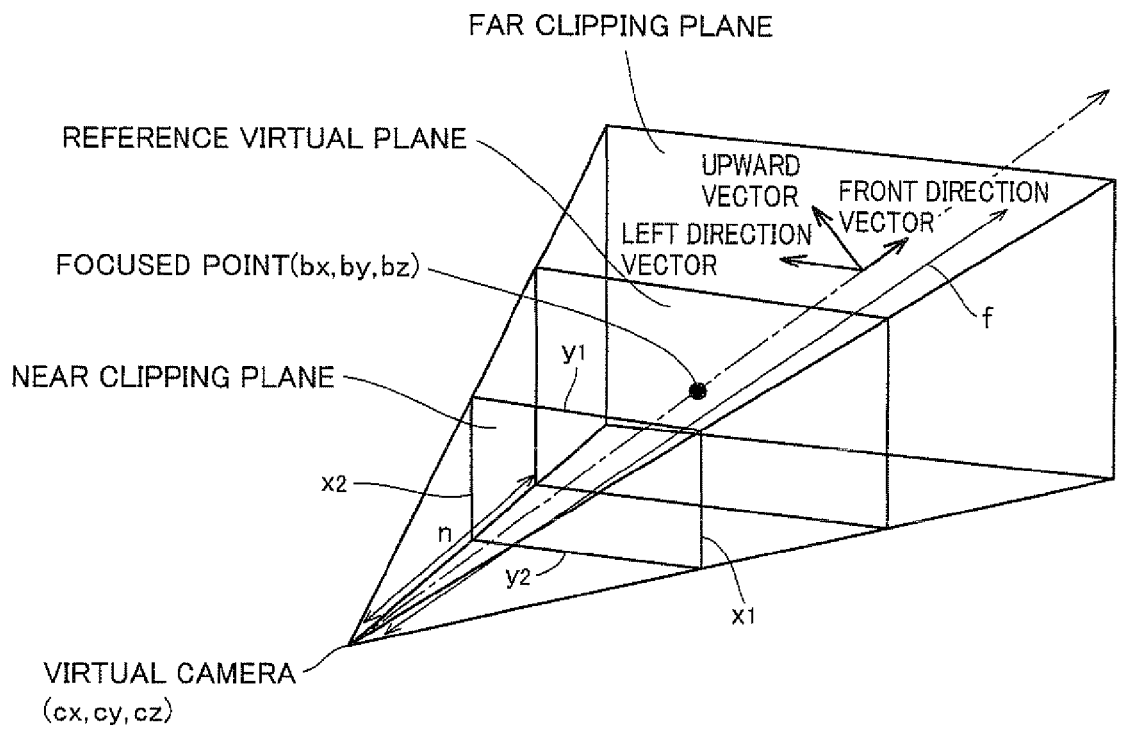
FIG. 12 is a diagram for illustrating a camera matrix according to the present embodiment.

As shown in FIG. 12, a certain three-dimensional virtual space is defined by three axes of X, Y and Z. A coordinate of the virtual camera is assumed as (cx, cy, cz), and a coordinate of a focused point (an intersection of a direction of the virtual camera and the reference virtual plane) is assumed as (bx, by, bz). In addition, a distance from the virtual camera to the near clipping plane is assumed as n, and a distance from the virtual camera to the far clipping plane is assumed as f. Moreover, a vector indicating an orientation of the virtual camera is defined as a front direction vector (Zx, Zy, Zz), an upward vector (Yx, Yy, Yz), and a left direction vector (Xx, Xy, Xz). It is noted that each of these vectors is a unit vector of which magnitude is "1".

A projection matrix in the case shown in FIG. 12 is shown as expression (1), and a view matrix is shown as expression (2).

$$\begin{bmatrix} \frac{2 \times n}{x2 - x1} & 0 & \frac{x2 + x1}{x2 - x1} & 0 \\ 0 & \frac{2 \times n}{y1 - y2} & \frac{y1 + y2}{y1 - y2} & 0 \\ 0 & 0 & \frac{-(f+n)}{f-n} & \frac{-2 \times f \times n}{f-n} \\ 0 & 0 & -1 & 0 \end{bmatrix} \quad (1)$$

$$\begin{bmatrix} -Xx & -Xy & -Xz & cx \times Xx + cy \times Xy + cz \times Xz \\ Yx & Yy & Yz & -cx \times Yx - cy \times Yy - cz \times Yz \\ -Zx & -Zy & -Zz & cx \times Zx + cy \times Zy + cz \times Zz \end{bmatrix} \quad (2)$$

By using such a camera matrix (a projection matrix and a view matrix), adaptation to a three-dimensional virtual space set for each application can be achieved. Namely, the camera matrix is a matrix defined in a versatile dimension, and processing for setting a virtual camera as described above can be performed without depending on an application.

Though a method of generating a projection matrix using a coordinate of a virtual camera and a coordinate of a focused point has been exemplified in FIG. 12, a projection matrix can be generated by using a direction of illumination and a virtual camera orientation vector.

In addition, though a method of generating a view matrix using positions of four sides (a size) defining the near clipping plane has been exemplified in FIG. 12, a view matrix can also be generated based on an angle of view of a virtual camera.

It is noted that both of a projection matrix and a view matrix can be converted bidirectionally. For example, regarding the projection matrix, the projection matrix can also be generated based on a coordinate of a virtual camera and a coordinate of a focused point, whereas a coordinate of a virtual camera and a coordinate of a focused point can also be calculated from the projection matrix.

Therefore, when respective arrangement positions and view volumes of right virtual camera 302 and left virtual camera 304 in accordance with set reference virtual camera 300 are set in accordance with a method as shown in FIGS. 13A to 13C and 14A to 14D which will be described later, a camera matrix (a projection matrix and a view matrix) of each of right virtual camera 302 and left virtual camera 304 is output based on such information.

(c2-ii. Reference Virtual Plane)

As shown in FIG. 9, the reference virtual plane is set with reference virtual camera 300 serving as the reference. In the description below, an example where a virtual space distance D from reference virtual camera 300 to the reference virtual plane along a camera direction 301 of reference virtual camera 300 (reference camera direction) is defined as (2) reference virtual plane information is shown.

(c2-iii. Parallax Assessment Plane)

FIGS. 13A to 13C and 14A to 14D show examples where a parallax assessment plane 361 is set as a position corresponding to a depth allowing the user who views display 10 to comfortably accept stereoscopic display. Namely, since a display target located at a reference virtual plane region 360 in the three-dimensional virtual space is displayed around the display surface of display 10, the display target located on parallax assessment plane 361 is seen on the rear side relative to the display surface of display 10. Regarding a portion corresponding to parallax assessment plane 361 in the right object image and the left object image, an amount of parallax in accordance with positional relation between right virtual camera 302 and left virtual camera 304 is generated. As this amount of parallax relatively increases, load imposed on the user who views display 10 increases. Therefore, right virtual camera 302 and left virtual camera 304 should be set such that parallax at parallax assessment plane 361 does not exceed a prescribed threshold value.

Though FIGS. 13A to 13C and 14A to 14D exemplify a case where parallax assessment plane 361 is set opposite to reference virtual camera 300 with respect to reference virtual plane region 360, it may be set on the side of reference virtual camera 300. In this case, parallax assessment plane 361 is set at a position corresponding to such an amount of image pop-up that the user who views display 10 can comfortably accept stereoscopic display.

In addition, a first parallax assessment plane may be set on a farther side relative to reference virtual plane region 360 and a second parallax assessment plane may be set on a nearer side relative to reference virtual plane region 360, and then whether a condition at each parallax assessment plane is satisfied or not may be evaluated.

In any case, the parallax assessment plane is arranged in parallel to reference virtual plane region 360 and used to evaluate parallax generated between the right object image generated by right virtual camera 302 and the left object image generated by left virtual camera 304. Namely, by maintaining parallax for a display target present on parallax assessment plane 361 to a prescribed threshold value or lower, it is ensured that stereoscopic display of at least an object present between reference virtual plane region 360 and parallax assessment plane 361 is comfortably accepted by the user.

A limit value of the parallax on this parallax assessment plane 361 is determined by a physical size and characteristics of information processing system 1 (display 10), physical characteristics dependent on the user, and the like. More specifically, the limit value of the parallax is dependent on a display size of display 10 (a vertical length and a horizontal length), a size of each pixel, an interval in a parallax barrier, an interval between the user's eyes (an actual distance L1 shown in FIG. 5), a distance from the user to the display surface of display 10 (an actual distance L2 shown in FIG. 5), and the like.

Figure 13A:
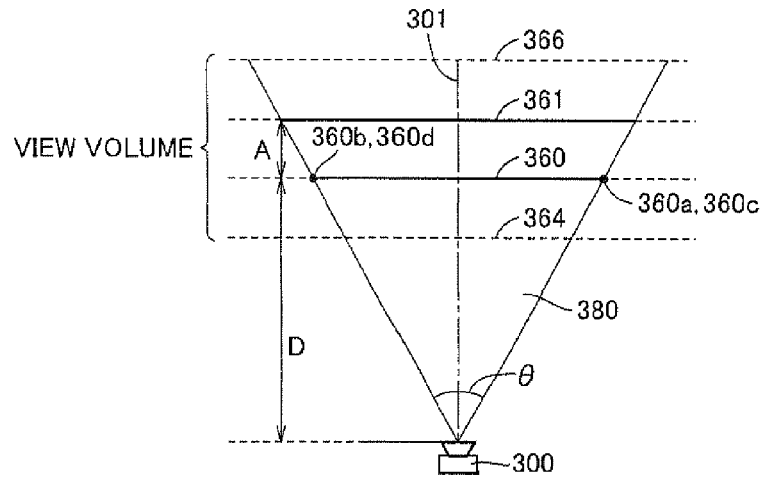
FIGS. 13A to 13C are diagrams for two-dimensionally illustrating processing for setting the right virtual camera and the left virtual camera according to the present embodiment.

In the description below, an example where (3) parallax assessment plane information is defined as a virtual space distance A from reference virtual plane region 360 to parallax assessment plane 361 as shown in FIG. 13A is shown.

It is noted that (2) reference virtual plane information and (3) parallax assessment plane information are not limited to those described above, and a virtual space distance from reference virtual camera 300 to parallax assessment plane 361 may be defined and then a virtual space distance from reference virtual camera 300 to reference virtual plane region 360 may be provided as a ratio with the virtual space distance from reference virtual camera 300 to parallax assessment plane 361 serving as the reference.

(c2-iv. Processing for Setting Right Virtual Camera and Left Virtual Camera)

How right virtual camera 302 and left virtual camera 304 are set in response to setting of reference virtual camera 300 will now be described with reference to FIGS. 13A to 13C and 14A to 14D.

Referring to FIG. 13A, initially, it is assumed that designation to set reference virtual camera 300 at a certain position in the three-dimensional virtual space has been made. At the same time, it is assumed that designation to set reference virtual plane region 360 at a position distant from reference virtual camera 300 by virtual space distance D and to set parallax assessment plane 361 at a position distant from reference virtual plane region 360 by virtual space distance A has been made.

When the virtual space distance between reference virtual camera 300 and reference virtual plane region 360 is provided, as shown in FIG. 13A, reference virtual plane region 360 is determined as a plane region orthogonal to the camera direction of reference virtual camera 300 that is included in view volume 380 of this reference virtual camera 300. This view volume 380 corresponds to a range effectively rendered by reference virtual camera 300 in the three-dimensional virtual space.

More specifically, view volume 380 corresponds to a frustum obtained by dividing a quadrangular pyramid having a viewing angle of reference virtual camera 300 as a vertex by a near clipping plane 364 and a far clipping plane 366. Namely, view volume 380 is defined by the viewing angle of reference virtual camera 300, near clipping plane 364 corresponding to the plane on the side closest to reference virtual camera 300, and far clipping plane 366 corresponding to the plane on the side farthest from reference virtual camera 300. In other words, view volume 380 is inscribed at each vertex 360a, 360b, 360c, 360d defining reference virtual plane region 360.

Respective positions of a right maximum parallax plane 362 and a left maximum parallax plane 363 are determined on a plane including parallax assessment plane 361, from the state shown in FIG. 13A. This right maximum parallax plane 362 is a range rendered by left virtual camera 304 in a case where parallax on parallax assessment plane 361 is set as the limit value. Similarly, this left maximum parallax plane 363 is a range rendered by right virtual camera 302 in a case where parallax on parallax assessment plane 361 is set as the limit value.

Figure 13B:
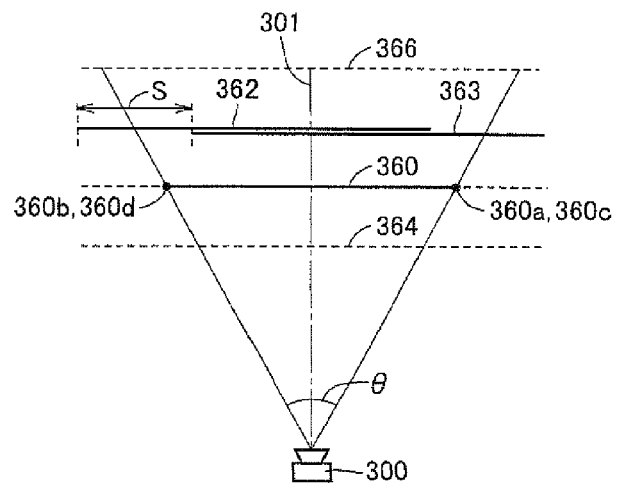

More specifically, respective positions of right maximum parallax plane 362 and left maximum parallax plane 363 are determined such that an amount of displacement between right maximum parallax plane 362 and left maximum parallax plane 363 matches with parallax tolerable on parallax assessment plane 361 (a maximum value corresponding to the parallax limit amount). In other words, as shown in FIG. 13B, by sliding parallax assessment plane 361 toward the left over the sheet surface and toward the right over the sheet surface, right maximum parallax plane 362 and left maximum parallax plane 363 are obtained. Here, a virtual space distance S representing a distance between right maximum parallax plane 362 and left maximum parallax plane 363 corresponds to the parallax limit amount on the display surface of display 10.

Figure 13C:
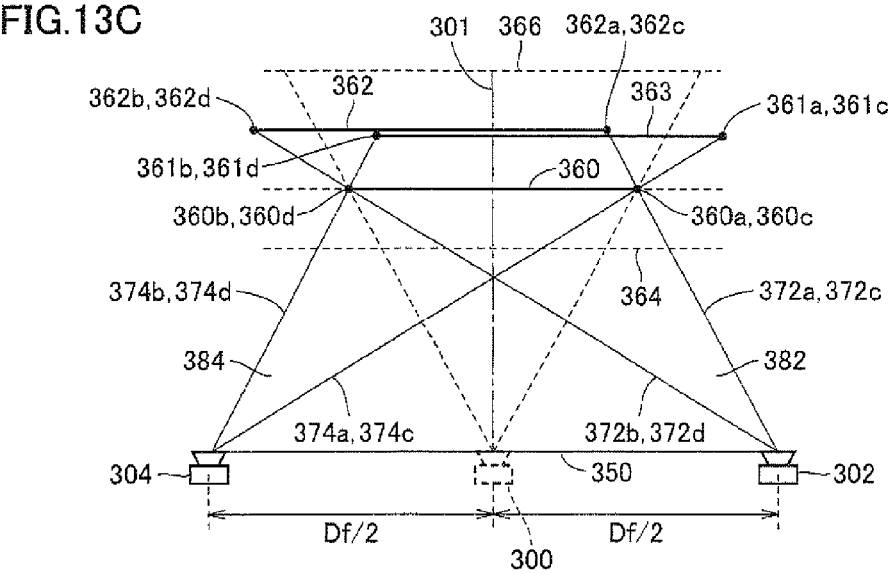

Based on reference virtual plane region 360 and right maximum parallax plane 362 and left maximum parallax plane 363 of which positions are determined in the procedure as described above, respective arrangement positions of right virtual camera 302 and left virtual camera 304 are determined. In the present embodiment, as shown in FIG. 13C, reference line 350 passing through reference virtual camera 300 and extending in parallel to reference virtual plane region 360 is defined, and right virtual camera 302 and left virtual camera 304 are set on this reference line 350. More specifically, right virtual camera 302 is set at a position at which the view volume including reference virtual plane region 360 and right maximum parallax plane 362 can be defined. Similarly, left virtual camera 304 is set at a position where the view volume including reference virtual plane region 360 and left maximum parallax plane 363 can be defined. Namely, right virtual camera 302 is set at a position resulted from movement of the arrangement position of reference virtual camera 300 toward the right along reference line 350, and left virtual camera 304 is set at a position resulted from movement of the arrangement position of reference virtual camera 300 toward the left along reference line 350.

In the example shown in FIGS. 13A to 13C, right virtual camera 302 is set at a position resulted from movement from the arrangement position of reference virtual camera 300 toward the right by Df/2 along reference line 350, and left virtual camera 304 is set at a position resulted from movement from the arrangement position of reference virtual camera 300 toward the left by Df/2 along reference line 350.

Turning to respective view volumes of right virtual camera 302 and left virtual camera 304 set as described above, as shown in FIGS. 14B to 14D, respective view volumes of right virtual camera 302 and left virtual camera 304 are set such that a range of reference virtual plane region 360 (cross-sectional region) included in view volume 380 of reference virtual camera 300 is maintained. Namely, view volume 382 of right virtual camera 302 and view volume 384 of left virtual camera 304 are set such that each of a cross-section at a position corresponding to reference virtual plane region 360 in view volume 382 of right virtual camera 302 and a cross-section at a position corresponding to reference virtual plane region 360 in view volume 384 of left virtual camera 304 coincides with a cross-section at a position corresponding to reference virtual plane region 360 in view volume 380 of reference virtual camera 300.

In other words, respective positions of four vertices 360a, 360b, 360c, and 360d of reference virtual plane region 360 included in view volume 380 of reference virtual camera 300 are obtained in advance. Then, view volume 382 of right virtual camera 302 is defined by straight lines 372a, 372b, 372c, and 372d extending from the arrangement position of right virtual camera 302 through vertices 360a, 360b, 360c, and 360d of reference virtual plane region 360, respectively. Here, straight lines 372a, 372b, 372c, and 372d are set to intersect with vertices 362a, 362b, 362c, and 362d of right maximum parallax plane 362, respectively. In addition, view volume 384 of left virtual camera 304 is defined by straight lines 374a, 374b, 374c, and 374d extending from the arrangement position of left virtual camera 304 through vertices 360a, 360b, 360c, and 360d of reference virtual plane region 360, respectively. Here, straight lines 374a, 374b, 374c, and 374d are set to intersect with vertices 363a, 363b, 363c, and 363d of left maximum parallax plane 363, respectively.

The camera directions of right virtual camera 302 and left virtual camera 304 thus set are both maintained in parallel to reference camera direction 301 of reference virtual camera 300. Consequently, the camera directions of right virtual camera 302 and left virtual camera 304 are both orthogonal to reference line 350.

[c3. Real Mode]

In the "real mode", the creator of the application designates an arrangement position and a view volume (rendering range) of a single reference virtual camera (reference virtual camera 300 shown in FIGS. 2 and 3) ((1) reference virtual camera information shown in FIG. 8), as in creation of an application utilizing only two-dimensional display (not utilizing stereoscopic display). At the same time, the creator designates which two-dimensional position within a space included in the designated view volume is desirably displayed to be located around the display surface in stereoscopic display on display 10 ((2) reference virtual plane information shown in FIG. 8).

In addition, the creator designates a reference degree of stereoscopic effect for adjusting stereoscopic effect in stereoscopic display ((3') reference degree of stereoscopic effect shown in FIG. 8). Namely, in the real mode, (3) parallax assessment plane information as in the application-priority mode described above is not necessary, but instead (3') reference degree of stereoscopic effect is input. As described above, (3') reference degree of stereoscopic effect is used in indicating adjustment of stereoscopic effect in stereoscopic display when stereoscopic display close to real may not necessarily be desired, depending on a type of an application or a proceeding condition. Typically, the reference degree of stereoscopic effect is given as a coefficient taking a value from "0" to "1". When "1" is set, right virtual camera 302 and left virtual camera 304 are set such that stereoscopic display close to real can be provided. As the value is closer to "0", right virtual camera 302 and left virtual camera 304 are set such that stereoscopic display with weaker stereoscopic effect is provided.

In response to such designation, library for stereoscopic display 218 sets right virtual camera 302 and left virtual camera 304 such that a virtual space distance between the virtual cameras does not exceed a tolerable maximum value, as will be described below in detail. The tolerable maximum value for the virtual space distance is a value obtained by multiplying a virtual space distance between the virtual cameras for stereoscopic display close to real by a reference degree of stereoscopic effect.

(c3-i. Processing for Setting Right Virtual Camera and Left Virtual Camera)

Figure 15C:
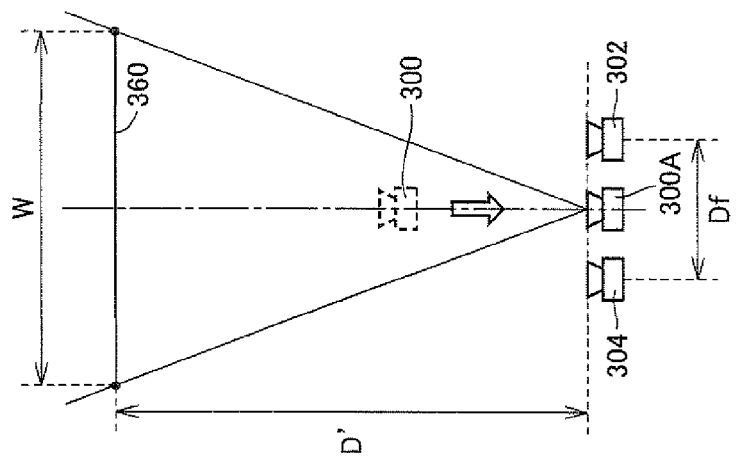
FIGS. 15A to 15C are diagrams for illustrating processing contents in a real mode according to the present embodiment.
Figure 15B:
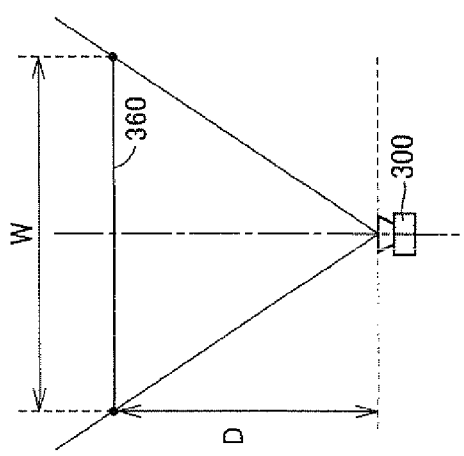
Figure 15A:
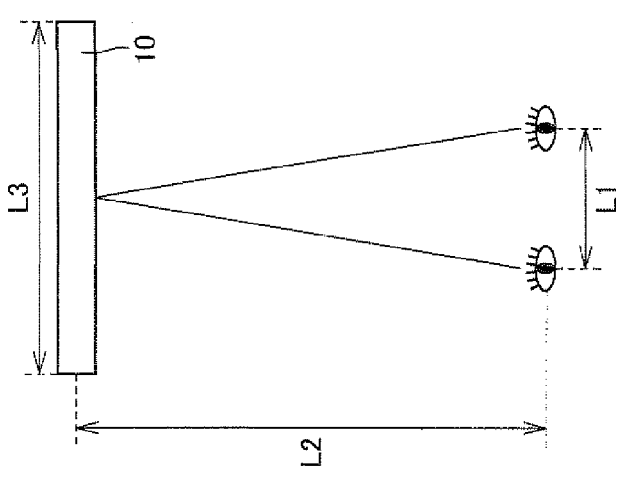

FIGS. 15A to 15C are diagrams for illustrating processing contents in the real mode according to the present embodiment. In this real mode, as shown in FIG. 15A, rendering processing is performed so as to be equivalent to optical relation in a case where the user views the display surface in a manner facing display 10. Namely, respective setting positions and view volumes of the right virtual camera and the left virtual camera are determined in correspondence with positional relation defined by actual distance L1 between the user's right eye and left eye, actual distance L2 from the user's eyes to the display surface of display 10, and an actual screen width L3 of the display surface of display 10.

It is noted that (1) reference virtual camera information and (2) reference virtual plane information input in the real mode are basically used for designating reference virtual plane region 360 to be rendered. Namely, respective positions of reference virtual camera 300 as well as right virtual camera 302 and left virtual camera 304 set in connection therewith may be changed from positions set by the application.

For example, as shown in FIG. 15B, a case where reference virtual plane region 360 is set at a position at a distance from reference virtual camera 300 by virtual space distance D is considered. In this case, based on the view volume set for reference virtual camera 300 and virtual space distance D, a range of reference virtual plane region 360 is determined. Here, a width corresponding to a lateral direction of the display surface of reference virtual plane region 360 is assumed as a virtual space distance W.

Then, a position and a view volume of reference virtual camera 300 are adjusted such that a range (within the three-dimensional virtual space) of this reference virtual plane region 360 corresponds to a(n actual) size of the display surface of display 10. More specifically, a virtual space distance D' from reference virtual plane region 360 to reference virtual camera 300 is determined such that relation of "actual distance L2: virtual space distance D'=actual screen width L3 of display surface: virtual space distance W" is satisfied. Here, as shown in FIG. 15C, since a size of reference virtual plane region 360 is maintained constant, a field of view (view volume) of reference virtual camera 300 is set again as a distance from reference virtual plane region 360 is changed.

Thus, the tolerable maximum value of the virtual space distance between right virtual camera 302 and left virtual camera 304 is determined in accordance with the actual distance between the user and the display surface of display 10.

After reference virtual camera 300 is set again, right virtual camera 302 and left virtual camera 304 are set such that a virtual space distance between these virtual cameras corresponds to the actual interval between the user's eyes. More specifically, virtual space distance Df is determined such that relation of "actual distance L2: virtual space distance D'=actual distance L1: virtual space distance Df" is satisfied. This virtual space distance Df corresponds to a theoretical maximum value tolerable in a case where the user views the display surface in a manner facing display 10, for providing stereoscopic display close to real on display 10. Then, a value obtained by multiplying this virtual space distance Df by the reference degree of stereoscopic effect is determined as the virtual space distance between right virtual camera 302 and left virtual camera 304. More specifically, respective positions of right virtual camera 302 and left virtual camera 304 are determined such that these cameras are distant from each other by this determined virtual space distance, with reference virtual camera 300 lying therebetween.

Through such processing, in display of the three-dimensional virtual space of which display to the user is intended by the creator of the application, expression as if an actual object were really present on display 10 can be provided. Namely, by setting right virtual camera 302 and left virtual camera 304 as described above, positional relation between reference virtual camera 300 in the three-dimensional virtual space and an object around reference virtual plane region 360 substantially matches with positional relation between the user's eyes in a real space and the display surface of display 10. Therefore, display as if a virtual space were seen through a window having a frame as large as a screen of display 10 can be provided.

[c4. Stereoscopic Effect Adjustment]

Virtual space distance Df between right virtual camera 302 and left virtual camera 304 determined in the application-priority mode and the real mode described above is not necessarily used as it is, but it may be used after subsequent further adjustment based on a prescribed condition (a value tolerable by an application, a user's operation, or the like). In that case, virtual space distance Df exhibits a maximum value between right virtual camera 302 and left virtual camera 304 under a condition given by an application or the like. Namely, virtual space distance Df between right virtual camera 302 and left virtual camera 304 is a parameter determining maximum parallax that could be generated between a right object image and a left object image displayed on display 10, and a maximum value thereof is restricted in accordance with a parallax limit amount under a condition set by an application or the like.

Virtual space distance Df between right virtual camera 302 and left virtual camera 304 is in proportion to a degree of stereoscopic effect that can be felt by the user who views display 10. In other words, if this virtual space distance Df is "0", that is, if right virtual camera 302 and left virtual camera 304 are set at the same position, the subject is displayed on display 10 two-dimensionally rather than stereoscopically.

From a point of view of user-friendliness, a degree of stereoscopic effect determined by the processing as described above is preferably adjustable in accordance with a user's operation. Namely, a virtual space distance between right virtual camera 302 and left virtual camera 304 can preferably be increased and decreased by a user's operation, in a range up to virtual space distance Df (maximum value) between right virtual camera 302 and left virtual camera 304 determined by the processing as described above.

A mechanism for accepting such a user's operation is preferably a mechanism for accepting a user's operation as a one-dimensional parameter value associated with a degree of stereoscopic effect. Forms as shown in FIGS. 16 to 18 represent examples of input means (user interface) for accepting a one-dimensional parameter value associated with this degree of stereoscopic effect.

Figure 16:
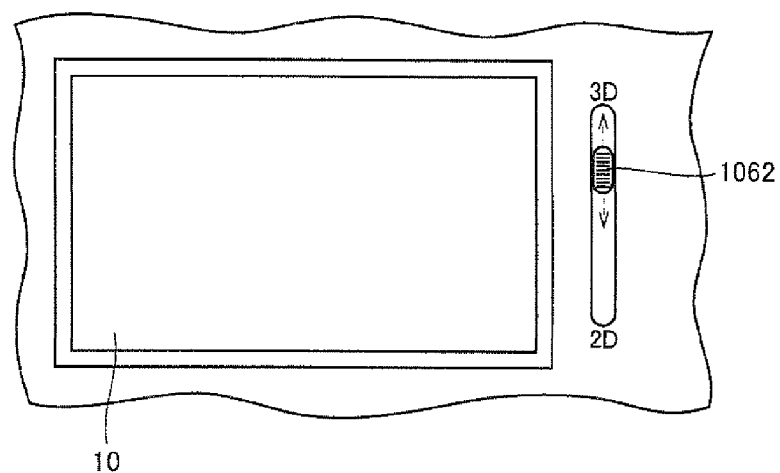
FIGS. 16 to 18 show one example of a configuration for accepting stereoscopic effect adjustment made by a user according to the present embodiment.

FIG. 16 shows a mechanism slidably operable in a direction of a prescribed one axis (a slider 1062) by way of example of a configuration for accepting adjustment by the user of stereoscopic effect according to the present embodiment. This slider 1062 is provided on a side or the like of the display surface of display 10. As shown in FIG. 16, a character "3D" indicating stereoscopic display is provided in an upward direction on the sheet surface, and a character "2D" indicating two-dimensional display is provided in a downward direction on the sheet surface.

Namely, as the user adjusts slider 1062, a virtual space distance between right virtual camera 302 and left virtual camera 304 varies from the maximum value "Df" to a minimum value "0". In other words, setting is made such that virtual space distance Df between right virtual camera 302 and left virtual camera 304 initially set by library for stereoscopic display 218 corresponds to the maximum value (the uppermost portion on the sheet surface) in a range of adjustment by slider 1062 and such that "0" corresponds to the minimum value (the lowermost portion on the sheet surface) in the range of adjustment by slider 1062. Namely, assuming an adjustment value given by slider 1062 as $\gamma$, virtual space distance Df after adjustment of stereoscopic effect can be expressed in the following expression.

$$\text{Virtual space distance } Df' = \text{Virtual space distance } Df \text{ (maximum value)} \times \text{Adjustment value } \gamma \ (0 \leq \gamma \leq 1)$$

It is noted that virtual space distance Df (maximum value) between right virtual camera 302 and left virtual camera 304 may completely unmatch with the maximum value of the range of adjustment by slider 1062. For example, a value obtained by multiplying virtual space distance Df (maximum value) by a prescribed constant $\alpha$ ($0<\alpha<1$) may be brought in correspondence with the maximum value of the range of adjustment by slider 1062. In this case, assuming an adjustment value given by slider 1062 as $\gamma$, virtual space distance Df after adjustment of stereoscopic effect can be expressed in the following expression.

$$\text{Virtual space distance } Df' = \text{Constant } \alpha \times \text{Virtual space distance } Df \text{ (maximum value)} \times \text{Adjustment value } \gamma \ (0 \leq \gamma \leq 1)$$

In response to such a user's operation of slider 1062, at least one of arrangement positions of right virtual camera 302 and left virtual camera 304 set in the processing as described above is changed. Then, when the position(s) of right virtual camera 302 and/or left virtual camera 304 is (are) changed, the field(s) of view (view volume(s)) of right virtual camera 302 and/or left virtual camera 304 is (are) also set again.

Figure 17:
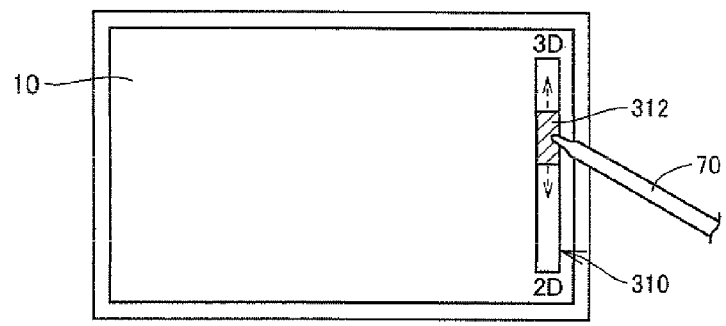

FIG. 17 shows a user interface in a case where display 10 is implemented as a touch panel by way of another example of a configuration for accepting adjustment by the user of stereoscopic effect according to the present embodiment. In this user interface as well, an image object 310 along a direction of a prescribed one axis similar to the slider shown in FIG. 16 above and an image object 312 displayed to move relatively to this image object 310 are displayed. As the user touches display 10 using a touch pen (stylus pen) 70 or the like, this image object 312 moves in accordance with the user's touch operation. Then, an indication in accordance with the position of this image object 312 is generated.

Figure 18:
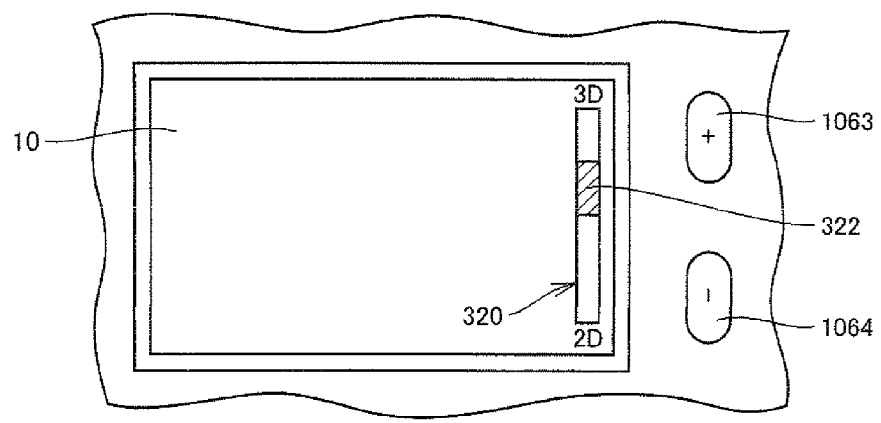

FIG. 18 shows a user interface using display 10 and an operation button by way of yet another example of a configuration for accepting adjustment by the user of stereoscopic effect according to the present embodiment. In this user interface as well, an image object 320 along a direction of a prescribed one axis similar to the slider shown in FIG. 16 above and an image object 322 displayed to move relatively to this image object 320 are displayed. As the user presses the operation button provided on information processing system 1 (a + button 1063 and a − button 1064), this image object 322 moves. Then, an indication in accordance with the position of this image object 322 is generated.

[c5. Variation Involved with Setting of Virtual Camera]

In the embodiment described above, in setting the right virtual camera and the left virtual camera, processing for moving the arrangement position of reference virtual camera 300 along reference line 350 toward the right and the left by an equal distance has been exemplified, however, any one virtual camera may be fixed at the arrangement position of reference virtual camera 300 and the other virtual camera alone may be moved. Processing in such a case will be exemplified hereinafter.

Figure 19A:
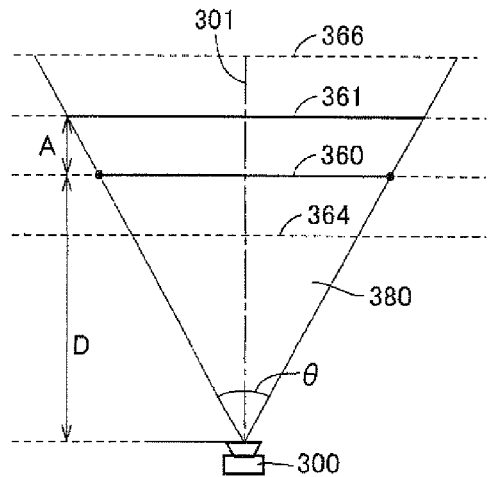
FIGS. 19A to 19C are diagrams far two-dimensionally illustrating processing for setting the right virtual camera and the left virtual camera according to a variation of the present embodiment.
Figure 19B:
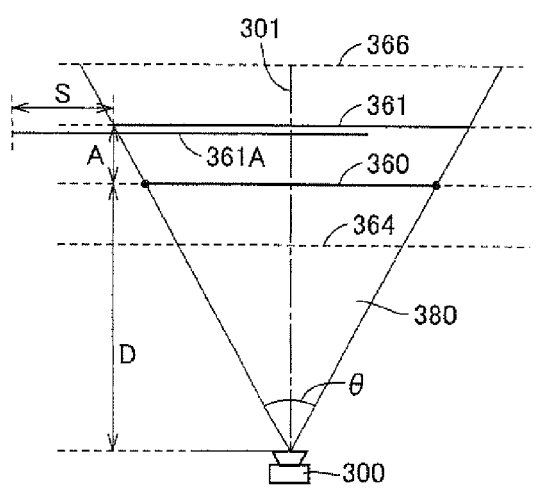

Referring to FIG. 19A, it is assumed that reference virtual camera 300 is designated at a certain position in a three-dimensional virtual space. In this state, the right maximum parallax plane and the left maximum parallax plane in a case where parallax on parallax assessment plane 361 is set as the limit value are determined. In this case, unlike FIG. 13B above, a position of a right maximum parallax plane 361A for setting a position of one virtual camera (in the example shown in FIG. 19B, a right virtual camera 300A) is calculated while parallax assessment plane 361 corresponding to reference virtual camera 300 is fixed. Namely, as shown in FIG. 19B, by sliding parallax assessment plane 361 toward the left over the sheet surface, right maximum parallax plane 361A is obtained. Here, virtual space distance S between parallax assessment plane 361 and right maximum parallax plane 361A corresponds to the parallax limit amount.

Figure 19C:
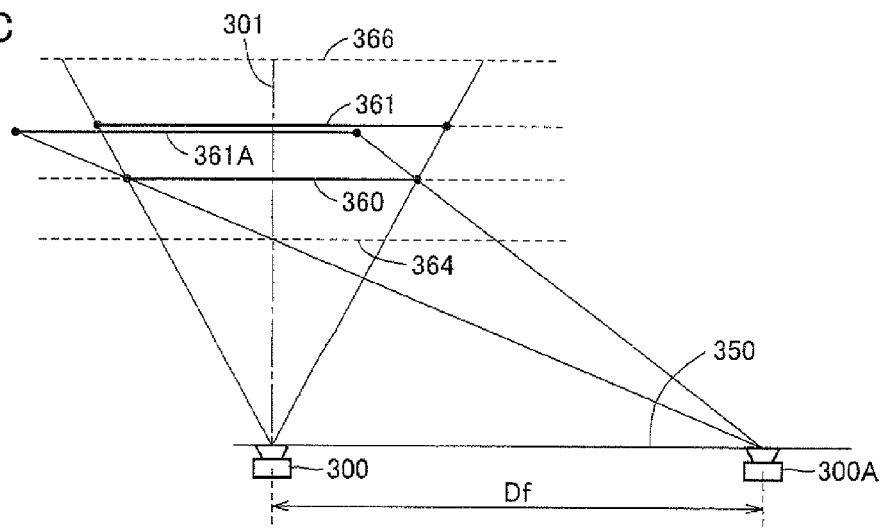

Finally, as shown in FIG. 19C, reference line 350 passing through reference virtual camera 300 and extending in parallel to the reference virtual plane is defined, and right virtual camera 300A is set on this reference line 350. More specifically, right virtual camera 300A is set at a position where a view volume including reference virtual plane region 360 and right maximum parallax plane 361A can be defined. Then, right virtual camera 300A and reference virtual camera 300 are used to generate the right object image and the left object image respectively.

According to the method as shown in FIGS. 19A to 19C, a viewpoint stereoscopically displayed on the display surface of display 10 moves from reference virtual camera 300 to a point intermediate between right virtual camera 300A and reference virtual camera 300. For example, in a case of a user whose dominant eye is known (the left eye in the example shown in FIGS. 19A to 19C), by setting positions of a pair of virtual cameras with the method as shown in FIGS. 19A to 19C, switch from two-dimensional display to stereoscopic display can be accepted with less uncomfortableness.

Though a configuration where right virtual camera 300A is set by moving reference virtual camera 300 toward the right has been described in the example shown in FIGS. 19A to 19C, right virtual camera 300A may be set at the position of reference virtual camera 300 and reference virtual camera 300 may be moved toward the left to set a left virtual camera.

[c6. Return Value]

Referring again to FIG. 8, library for stereoscopic display 218 not only calculates respective setting values for right virtual camera 302 and left virtual camera 304 but also returns a value indicating a result of prescribed processing to an application or the like as a return value. In the present embodiment, library for stereoscopic display 218 returns information indicating positional relation between right virtual camera 302 and left virtual camera 304 as a return value. In the description below, a processing example where virtual space distance Df between right virtual camera 302 and left virtual camera 304 within the three-dimensional virtual space is used will be described by way of typical example of this positional relation.

This virtual space distance Df corresponds to an amount of parallax for a subject image corresponding to an object within the right object image and the left object image generated when the object located at infinity within the three-dimensional virtual space is virtually photographed by right virtual camera 302 and left virtual camera 304, which can be explained as follows. When viewed from right virtual camera 302 and left virtual camera 304, the object located at infinity looks like present on a straight line extending from each virtual camera position in a virtual camera direction. Therefore, when a certain object located at infinity is viewed from the right virtual camera and when the same object is viewed from the left virtual camera, the object located at infinity looks like present right in front of each virtual camera. Therefore, by rendering the object such that the object is seen as if it were present right in front of each virtual camera, it can be expressed as the object located at infinity. In order to show the object as if it were located right in front of each virtual camera, it is only necessary to generate and display images having an amount of parallax corresponding to a distance between the virtual cameras. It is noted that parallax generated for an object located at any position between right virtual camera 302, left virtual camera 304 and infinity is smaller than parallax generated for the object located at infinity (virtual space distance Df).

Therefore, by displaying on display 10 such a pair of images that difference in position of appearance of the subject image for the same object represented therein is of magnitude corresponding to virtual space distance Df, the subject image can visually be recognized as being located on the rearmost side when viewed from the user. In other words, by generating a right background image and a left background image having appropriate parallax in coordination with virtual space distance Df between right virtual camera 302 and left virtual camera 304, the background image can always be displayed on the rear side relative to any object even when a degree of stereoscopic effect on display 10 is varied. Though details will be described later, in the present embodiment, the right background image and the left background image are generated in accordance with a return value ((7) distance between the virtual cameras shown in FIG. 8) from library for stereoscopic display 218.

Virtual space distance Df described above represents a virtual space distance in a three-dimensional space of interest, and it has a unit system different from an actual size of the display surface of display 10. Therefore, in order to be able to readily determine how much amount of parallax should be generated between the right background image and the left background image on the display surface of display 10, a standardized, dimensionless value is preferably used as a return value.

In the present embodiment, a ratio standardized with a rendering range displayed on display 10 serving as the reference is used as such a dimensionless value. More specifically, library for stereoscopic display 218 outputs as a return value, a ratio of virtual space distance Df between right virtual camera 302 and left virtual camera 304, with a width of the reference virtual plane region (see FIG. 3) included in the view volume of reference virtual camera 300, which is a virtual plane perpendicular to camera direction 301 of reference virtual camera 300, serving as the reference.

Namely, since the reference virtual plane region corresponds to a range rendered on the display surface of display 10, a ratio of virtual space distance Df to a width of the reference virtual plane region matches with a ratio of an actual amount of parallax to be generated between the right background image and the left background image to an actual screen width of display 10. Therefore, by adopting the ratio of virtual space distance Df to the width of the reference virtual plane region as the return value, an amount of parallax to be generated between the right background image and the left background image, that are pictures located on the rearmost side when viewed from the user, can readily be determined in accordance with an actual screen width of display 10.

As described above, the return value from library for stereoscopic display 218 corresponds to the ratio of virtual space distance Df between right virtual camera 302 and left virtual camera 304, with the width of the reference virtual plane region within the three-dimensional virtual space serving as the reference.

Figure 20:
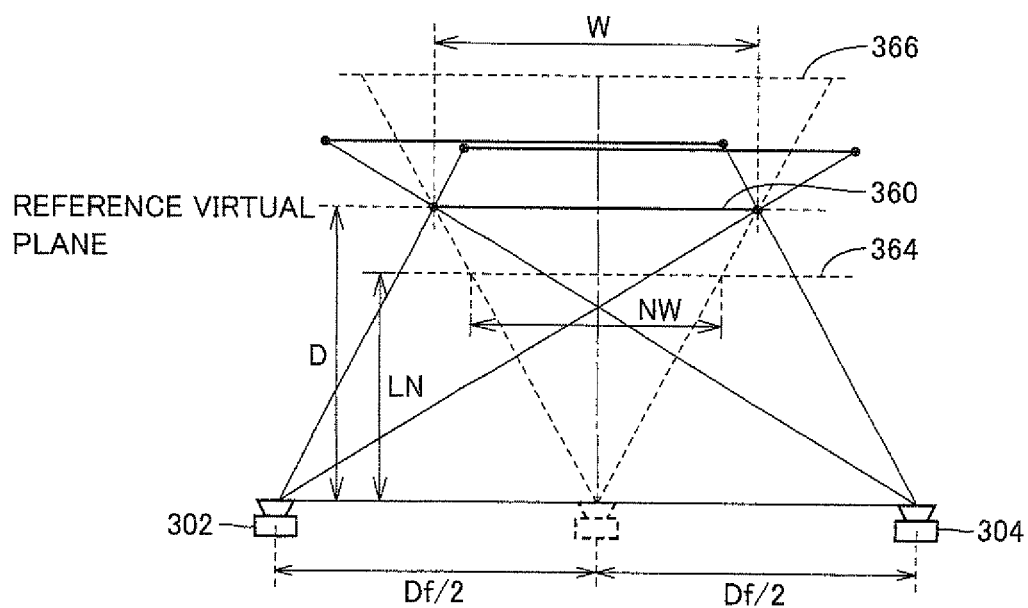
FIG. 20 is a diagram for illustrating processing for calculating a return value in the library for stereoscopic display according to the present embodiment.

Referring to FIG. 20, a return value RV is calculated as: return value RV (virtual space distance Df between right virtual camera 302 and left virtual camera 304/virtual space distance W corresponding to the width of reference virtual plane region 360). Here, virtual space distance W can be expressed as follows, by using a virtual space distance LN from reference virtual camera 300 to near clipping plane 364, virtual space distance D from reference virtual camera 300 to the reference virtual plane, and a virtual space distance NW corresponding to a width of near clipping plane 364.

> Virtual space distance $W$=Virtual space distance $NW$×Virtual space distance $D$/Virtual space distance $LN$ Therefore, return value RV can be calculated as below.

> Return value $RV$={Virtual space distance $Df$/(Virtual space distance $NW$×Virtual space distance $D$/Virtual space distance $LN$)}

Among these parameters, virtual space distance NW and virtual space distance LN are calculated based on (1) reference virtual camera information (see FIG. 8) input to library for stereoscopic display 218, and virtual space distance D is calculated based on (2) reference virtual plane information input to library for stereoscopic display 218. In addition, virtual space distance Df is determined as a result of processing for setting right virtual camera 302 and left virtual camera 304, as described above.

[c7. Variation Involved with Library for Stereoscopic Display]

In the example shown in FIGS. 13A to 13C above, an example where parallax assessment plane 361 is set at any position between near clipping plane 364 and far clipping plane 366 has been shown. By way of example, library for stereoscopic display 218 shown in FIG. 8 defines parallax assessment plane 361 as shown in FIG. 13A by using virtual space distance A from reference virtual plane region 360 ((3) parallax assessment plane information).

In contrast, a position where parallax assessment plane 361 is to be set may be set in advance. For example, parallax assessment plane 361 may be set so as to match with far clipping plane 366. Namely, an amount of parallax generated between a right object image and a left object image may be evaluated at far clipping plane 366.

Thus, if parallax assessment plane 361 is caused to match with far clipping plane 366, an amount of parallax in a plane located on the rearmost side within a rendered range in a virtual space is to be evaluated. Therefore, it can be guaranteed that parallax exceeding the parallax limit amount is not generated for any object present within a range to be rendered.

In such a case, it is not necessary to input (3) parallax assessment plane information to the library for stereoscopic display, because, namely, simply by setting far clipping plane 366 with the use of at least (1) reference virtual camera information, parallax assessment plane 361 can automatically be set.

Figure 21:
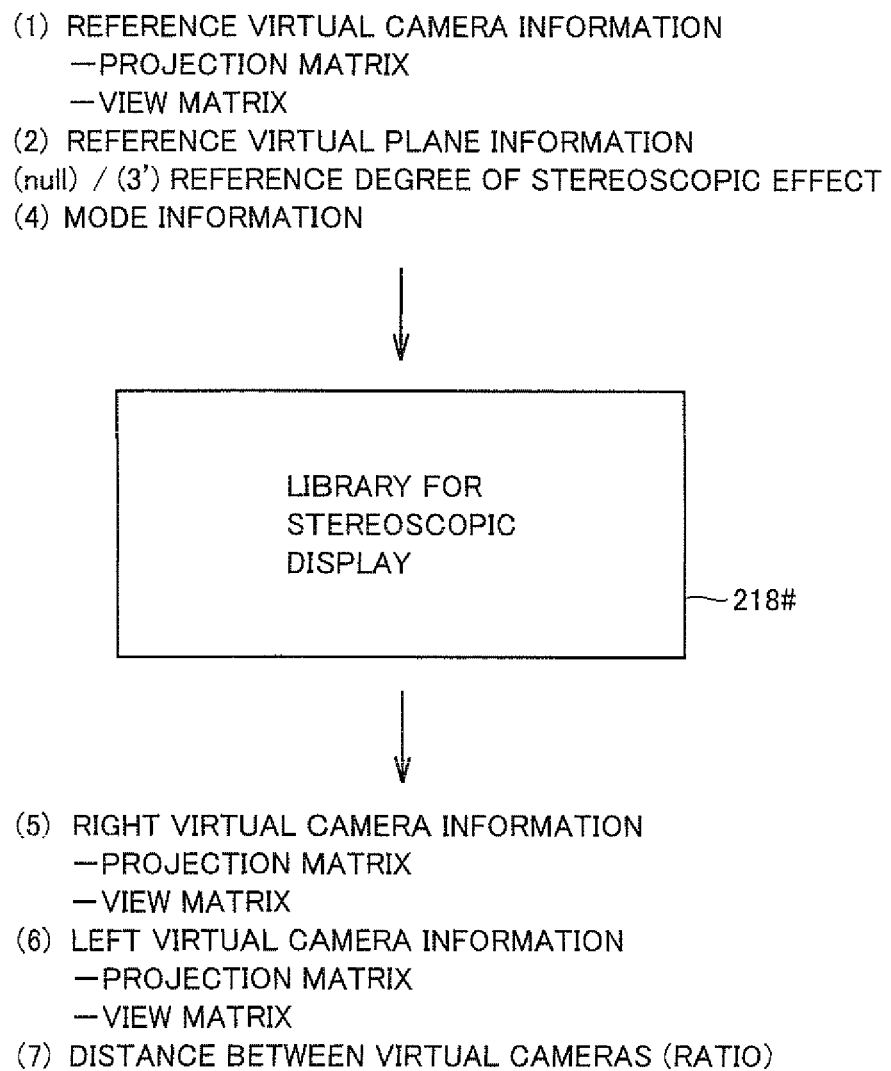
FIG. 21 shows a data item input and output to/from a library for stereoscopic display according to the variation of the present embodiment.

If parallax assessment plane 361 is set to match with far clipping plane 366, a library for stereoscopic display 218# as shown in FIG. 21 may be used. In library for stereoscopic display 218# shown in this FIG. 21, input of (3) parallax assessment plane information is omitted (or an invalid value "null" is input). Since information provided to library for stereoscopic display 218# can thus be decreased, simplification and higher speed of processing can be achieved.

An alternative configuration may also be designed so as to have input factors as many as those in library for stereoscopic display 218 shown in FIG. 8. In this case, in the "application-priority mode" as well, information corresponding to (3') reference degree of stereoscopic effect may be accepted. Typically, library for stereoscopic display 218# accepts input of a reference degree of stereoscopic effect, which is a coefficient taking a value from "0" to "1", and adjusts virtual space distance Df to the right virtual camera (see FIG. 10). More specifically, it is used for processing for further correction of virtual space distance Df (or return value RV) calculated in accordance with the procedure as described above. Namely, library for stereoscopic display 218# is configured to be able to accept a parameter for realizing a function to adjust stereoscopic effect as shown in FIGS. 16 to 18.

By adopting such a mechanism, stereoscopic effect can supplementarily be adjusted also in the "application-priority mode."

<D. Background Image Generation Processing>

[d1. Overview]

Processing for generating a right background image and a left background image based on a return value from library for stereoscopic display 218 described above (background image generation processing) will now be described.

As described above, in order to express a background image on display 10 as a picture located on the rearmost side when viewed from the user, an amount of parallax between the right background image and the left background image on the display surface of display 10 should be set to a value in accordance with virtual space distance Df between right virtual camera 302 and left virtual camera 304 determined in advance.

Basically, an object displayed as a background image is provided as a two-dimensional image not having information in a direction of depth, unlike an object or the like to which the user's attention is desirably paid. Therefore, original background image BG (see FIGS. 1 and 2) having a size greater than a size of display on display 10 is prepared in advance and two rendering ranges to be output as the right background image and the left background image respectively in this original background image BG are set at positions displaced from each other by a distance in accordance with virtual space distance Df, so that the right background image and the left background image having an amount of parallax suitable for display as the background image can be generated.

Alternatively, in such processing as generating a background image which is a planar, two-dimensional image by virtually photographing a virtual space on which inner surface a background image is drawn with a virtual camera, a pair of virtual cameras (for generating a background image)

having respective view volumes (rendering ranges) in accordance with virtual space distance Df between right virtual camera 302 and left virtual camera 304 with the view volume (rendering range) of the previously set virtual camera for generating a background image serving as the reference may be set.

[d2. Generation of Background Image from Original Background Image]

Figure 22A:
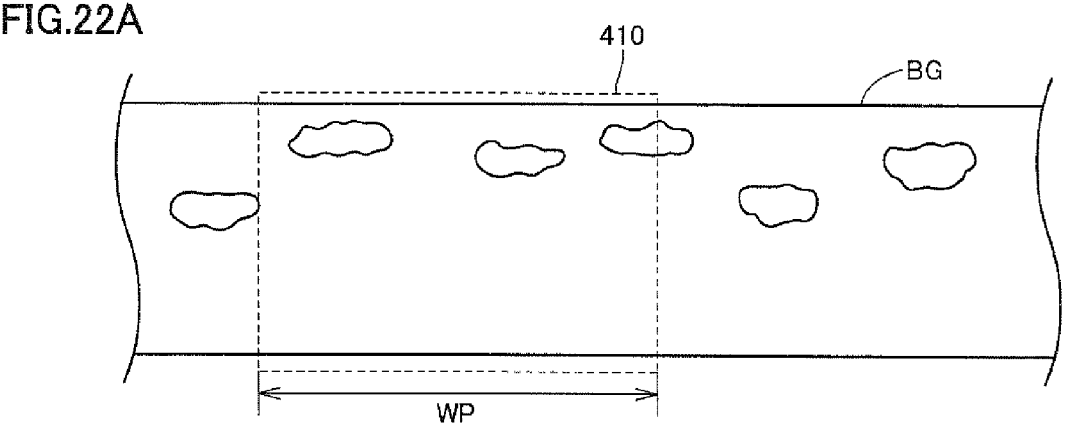
FIGS. 22A to 22C are schematic diagrams for illustrating processing for generating a background image according to the present embodiment.
Figure 22B:
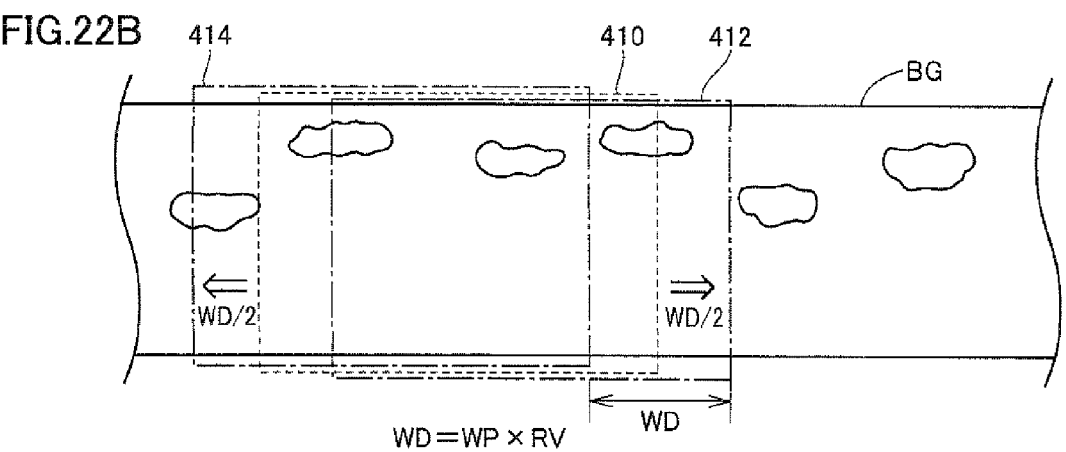
Figure 22C:
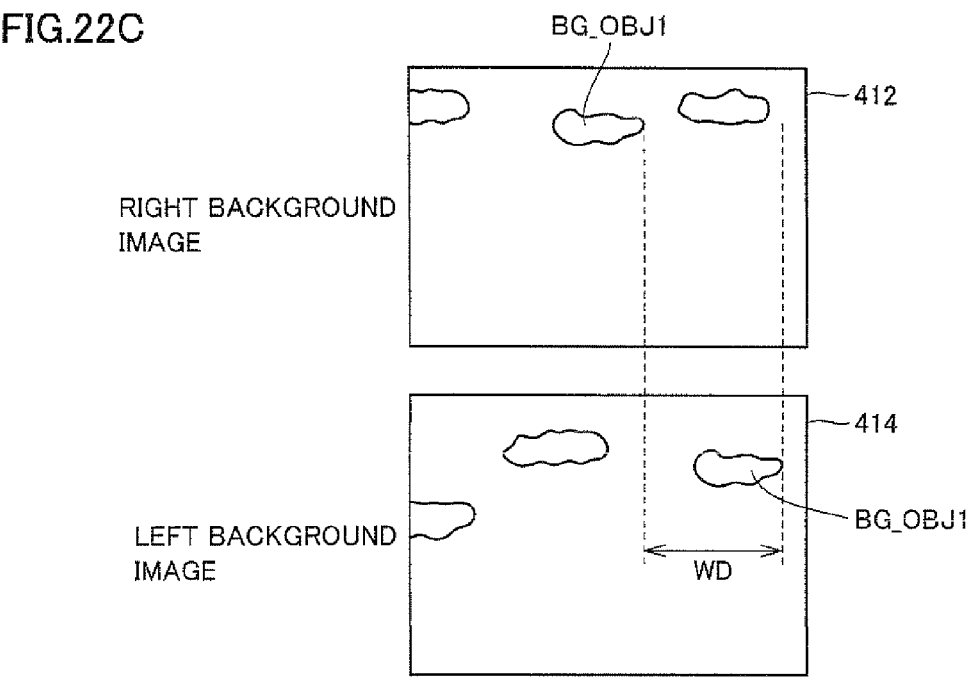

A processing example in which a right background image and a left background image are generated using original background image BG (see FIGS. 1 and 2) having a size greater than a size of display on display 10 will be described hereinafter. FIGS. 22A to 22C are schematic diagrams for illustrating background image generation processing according to the present embodiment.

For example, it is assumed that a rendering range 410 as shown in FIG. 22A has been designated as a background image in providing two-dimensional display as shown in FIG. 1. Here, a case where contents substantially the same as contents in rendering range 410 are displayed as a background in providing stereoscopic display as shown in FIG. 2 is considered.

In this case, as shown in FIG. 22B, a right rendering range 412 is set as a region of an image generated as a right background image, and a left rendering range 414 is set as a region of an image generated as a left background image. Right rendering range 412 and left rendering range 414 are set as displaced from each other by a distance WD in accordance with virtual space distance Df between right virtual camera 302 and left virtual camera 304 described above. So long as an amount of information (image size) displayed on display 10 is the same between two-dimensional display and stereoscopic display, the size of each of right rendering range 412 and left rendering range 414 matches with the size of rendering range 410.

Consequently, as shown in FIG. 22C, displacement by distance WD is caused between positions where subject images of the same object (in the example shown in FIG. 22C, a background object BG_OBJ1) appear in the right background image defined by right rendering range 412 and the left background image defined by left rendering range 414, respectively. Therefore, an amount of parallax of distance WD is generated on the display surface of display 10.

This distance WD is calculated by multiplying a width WP of a range rendered on display 10, that is, rendering range 410 (right rendering range 412 and left rendering range 414), by return value RV (a ratio of virtual space distance Df between right virtual camera 302 and left virtual camera 304 to a width of the reference virtual plane region within the three-dimensional virtual space). This relation can be expressed as follows.

Distance $WD$=Width $WP$ of rendering range×Return value $RV$

Though a unit (for example, [mm]) indicating an actual display width (physical length) of the display surface of display 10 may be employed for width WP of the rendering range and distance WD calculated from width WP, the number of pixels of a background image to be rendered is preferably employed as the unit, from a point of view of ease in processing. In addition, since return value RV has been standardized, it is a dimensionless value.

Namely, as can clearly be seen from the expression above, right rendering range 412 to be output as the right background image is set with respect to original background image BG, left rendering range 414 to be output as the left background image is set at a position set by displacing right rendering range 412 by distance WD obtained by multiplying a width of right rendering range 412 by return value RV (the ratio of virtual space distance Df between right virtual camera 302 and left virtual camera 304 to the width of the reference virtual plane region within the three-dimensional virtual space).

If the creator of the application designates rendering range 410 in advance as shown in FIG. 22B, right rendering range 412 and left rendering range 414 are preferably set with rendering range 410 serving as the reference. More specifically, right rendering range 412 is set at a position set by displacing rendering range 410 by ½ of distance WD toward the right over the sheet surface, and left rendering range 414 is set at a position set by displacing rendering range 410 by ½ of distance WD toward the left over the sheet surface. By thus setting right rendering range 412 and left rendering range 414 with rendering range 410 serving as the reference, a picture in a range intended by the creator of the application to desirably be displayed as a background in two-dimensional display as shown in FIG. 1 can be displayed substantially similarly also in stereoscopic display as shown in FIG. 2.

Regarding correspondence with each module shown in FIGS. 7A and 7B, background image range setting module 208 sets right rendering range 412 and left rendering range 414 shown in FIGS. 22A to 22C in accordance with return value RV output from library for stereoscopic display 218. In addition, background image rendering module 210 generates the right background image and the left background image in accordance with right rendering range 412 and left rendering range 414 set by background image range setting module 208. Further, background image data 214 includes data defining original background image BG.

[d3. Variation 1]

In the description above, a configuration in which right rendering range 412 to be output as the right background image and left rendering range 414 to be output as the left background image are designated with respect to original background image BG has been exemplified, however, a virtual camera for generating a background image may be set with respect to a three-dimensional virtual space including a background object displayed as a background and then the set virtual camera may be used to generate a background image. Such a processing example will now be described.

Figure 23:
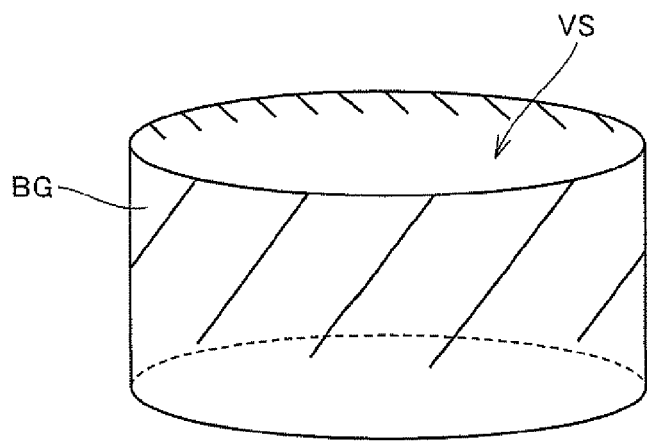
FIG. 23 is a schematic diagram for illustrating processing for generating a background image according to the variation of the present embodiment.

In general, any shape of a three-dimensional virtual space can be set depending on its definition contents, however, for the sake of facilitated understanding, in the description below, a cylindrical three-dimensional virtual space VS as shown in FIG. 23 is considered by way of example. It is assumed that original background image BG is attached to an inner circumferential surface of this three-dimensional virtual space VS.

It is assumed that reference virtual camera (background) 400 for generating a background image is arranged in such three-dimensional virtual space VS. Here, a field of view (view volume) of reference virtual camera (background) 400 is basically set to include only original background image BG arranged around the same. Namely, reference virtual camera 400 has a rendering range 450, which is a plane set for original background image BG, as a rendering range.

Then, with rendering range 450 serving as the reference, a right rendering range 452 is set as a region of an image generated as a right background image, and a left rendering range 454 is set as a region of an image generated as a left background image. Right rendering range 452 and left rendering range 454 are set at positions displaced from each other by distance WD in accordance with virtual space distance Df between right virtual camera 302 and left virtual camera 304 described above.

In setting these right rendering range 452 and left rendering range 454, instead of processing for directly determining the ranges, arrangement positions and fields of view (view volumes) of right virtual camera (background) 402 and left virtual camera (background) 404 corresponding to right rendering range 452 and left rendering range 454 respectively may be calculated. In this case, as in the background image generation processing described above, a virtual space distance between right virtual camera 302 and left virtual camera 304 is calculated, and then respective arrangement positions of right rendering range 452 and left rendering range 454 are determined with original rendering range 450 serving as the reference. In accordance therewith, arrangement positions and fields of view (view volumes) of right virtual camera (background) 402 and left virtual camera (background) 404 are calculated, respectively.

As shown in FIGS. 22A to 22C and 23, when reference virtual camera 400 for generating a background image is arranged in a three-dimensional virtual space, a library for stereoscopic display 218A or 218A# as shown in FIG. 25 or 26 can also be adopted.

Namely, library for stereoscopic display 218A shown in FIG. 25 accepts (1') reference virtual camera (background) information as the input, in addition to input of (1) reference virtual camera information, (2) reference virtual plane information, (3) parallax assessment plane information, and (4) mode information. Then, library for stereoscopic display 218A outputs (5) right virtual camera information, (6) left virtual camera information, (8) right virtual camera (background) information, and (9) left virtual camera (background) information. Namely, library for stereoscopic display 218A shown in FIG. 25 does not output (7) distance between the virtual cameras, but instead, outputs (8) right virtual camera (background) information and (9) left virtual camera (background) information in accordance with input of (V) reference virtual camera (background) information, based on internally calculated (7) distance between the virtual cameras.

In addition, FIG. 26 shows library for stereoscopic display 218A# adapted to processing as shown in FIGS. 22A to 22C and 23 in correspondence with library for stereoscopic display 218# shown in FIG. 21. Since a basic structure is the same as that of library for stereoscopic display 218A shown in FIG. 25, detailed description will not be repeated.

By using such library for stereoscopic display 218A or 218A#, the creator of the application can obtain respective setting values for right virtual camera 302 and left virtual camera 304 as well as respective setting values for right virtual camera (background) 402 and left virtual camera (background) 404 simply by setting reference virtual camera 300 for generating an object image and reference virtual camera 400 for generating a background image.

Figure 24:
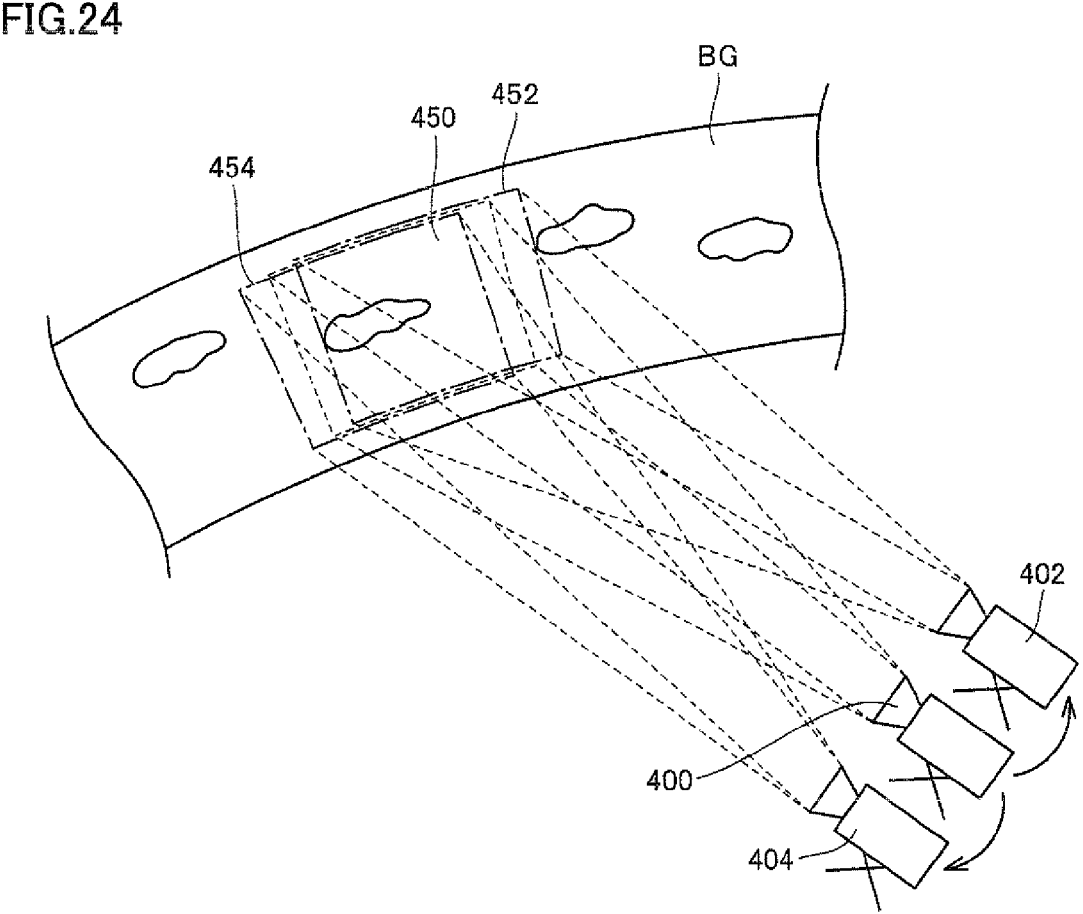
FIG. 24 is a diagram for schematically illustrating processing for generating a background image according to the variation of the present embodiment.

In addition, an object to stereoscopically be displayed, such as objects OBJ1 and OBJ2 described above, may additionally virtually be arranged in three-dimensional virtual space VS shown in FIGS. 23 and 24. In this case, independently of right virtual camera (background) 402 and left virtual camera (background) 404 described above, right virtual camera 302 and left virtual camera 304 for generating an object image are arranged within three-dimensional virtual space VS. Then, as set right virtual camera 302 and left virtual camera 304 photograph an object or the like to which the user's attention is desirably paid, a right object image and a left object image are generated.

Even when an object expressed as an object image and an object expressed as a background image are arranged within the same three-dimensional virtual space, in some cases, viewpoints of respective virtual cameras are preferably set independently of each other as an application proceeds. For example, considering a case where travel of an object to which the user's attention is desirably paid (typically, a character object) is expressed, a viewpoint of a virtual camera for generating an object image is preferably moved as the object travels, whereas a virtual camera for generating a background image preferably renders a specific rendering range as a background image, without being affected by travel of the object. Thus, such a situation that, while a background expressed on the rearmost side on display 10 is substantially constant, only the character object operated by the user travels, can be expressed.

[d3. Variation 2]

In the description above, processing in which a range in original background image BG defined in advance, in accordance with proceeding or the like of an application, is basically output as a background image has been described, however, contents in original background image BG itself may sequentially be updated in accordance with proceeding of the application, the user's operation or the like. Even in such a case, the creator of the application can readily generate a right background image and a left background image to desirably be displayed as a background in stereoscopic display simply by designating a rendering range to be displayed as a background, as in the case of developing an application utilizing only two-dimensional display.

<E. Display Data Generation Processing>

Processing for generating data used for image display on display 10 (a right display image and a left display image) using a right object image and a left object image as well as a right background image and a left background image generated in the processing described above will now be described.

In the present embodiment, a right display image to be displayed on display 10 is generated by superimposing a right object image and a right background image on each other, and a left display image to be displayed on display 10 is generated by superimposing a left object image and a left background image on each other.

Figure 27:
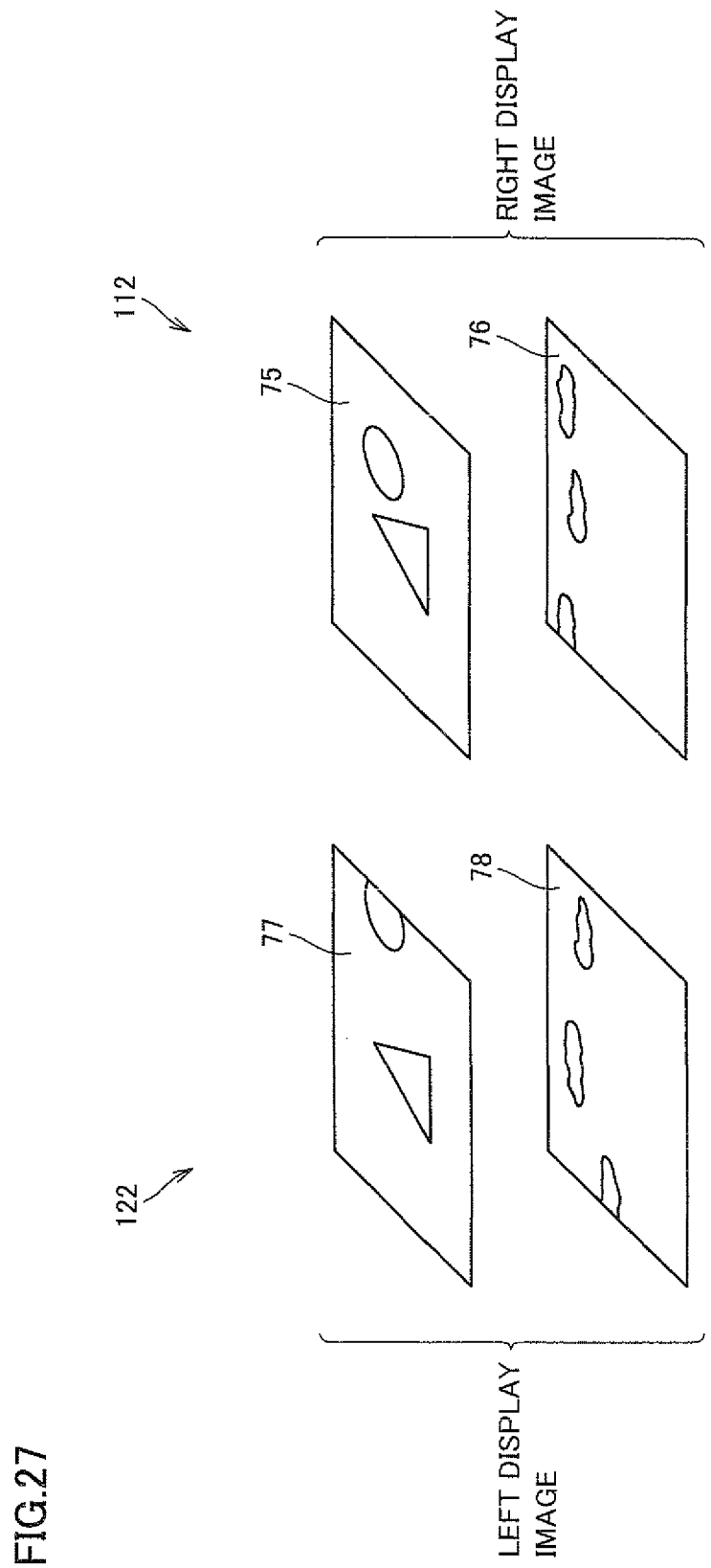
FIG. 27 is a diagram for schematically illustrating processing for generating display data according to the present embodiment.

Referring to FIG. 27, in typical mounting, at least two layers 75 and 76 are provided in first VRAM 112 (FIG. 6) brought in correspondence with first LCD 116 visually recognized by the user's right eye. Similarly, at least two layers 77 and 78 are provided also in second VRAM 122 (FIG. 6) brought in correspondence with second LCD 126 visually recognized by the user's left eye.

The right object image is written in upper layer 75 provided in first LCD 116, and the right background image is written in lower layer 76. Then, the images written in layer 75 and layer 76 are combined and output as the right display image.

Similarly, the left object image is written in upper layer 77 provided in second LCD 126, and the left background image is written in lower layer 78. Then, the images written in layer 77 and layer 78 are combined and output as the left display image.

<F. Processing Procedure>

Processing contents of the program according to the present embodiment will now be described with reference to FIGS. 28 and 29. It is noted that each step shown in FIGS. 28 and 29 is typically provided by execution of the program by CPU 100 of information processing system 1.

(f1. Main Routine)

In the flowchart shown in FIG. 28, processing in a case where stereoscopic display is provided on display 10 by designating a parameter as in two-dimensional display of an object within a three-dimensional virtual space on display 10 as shown in FIG. 1 as the application proceeds will be described.

Figure 28:
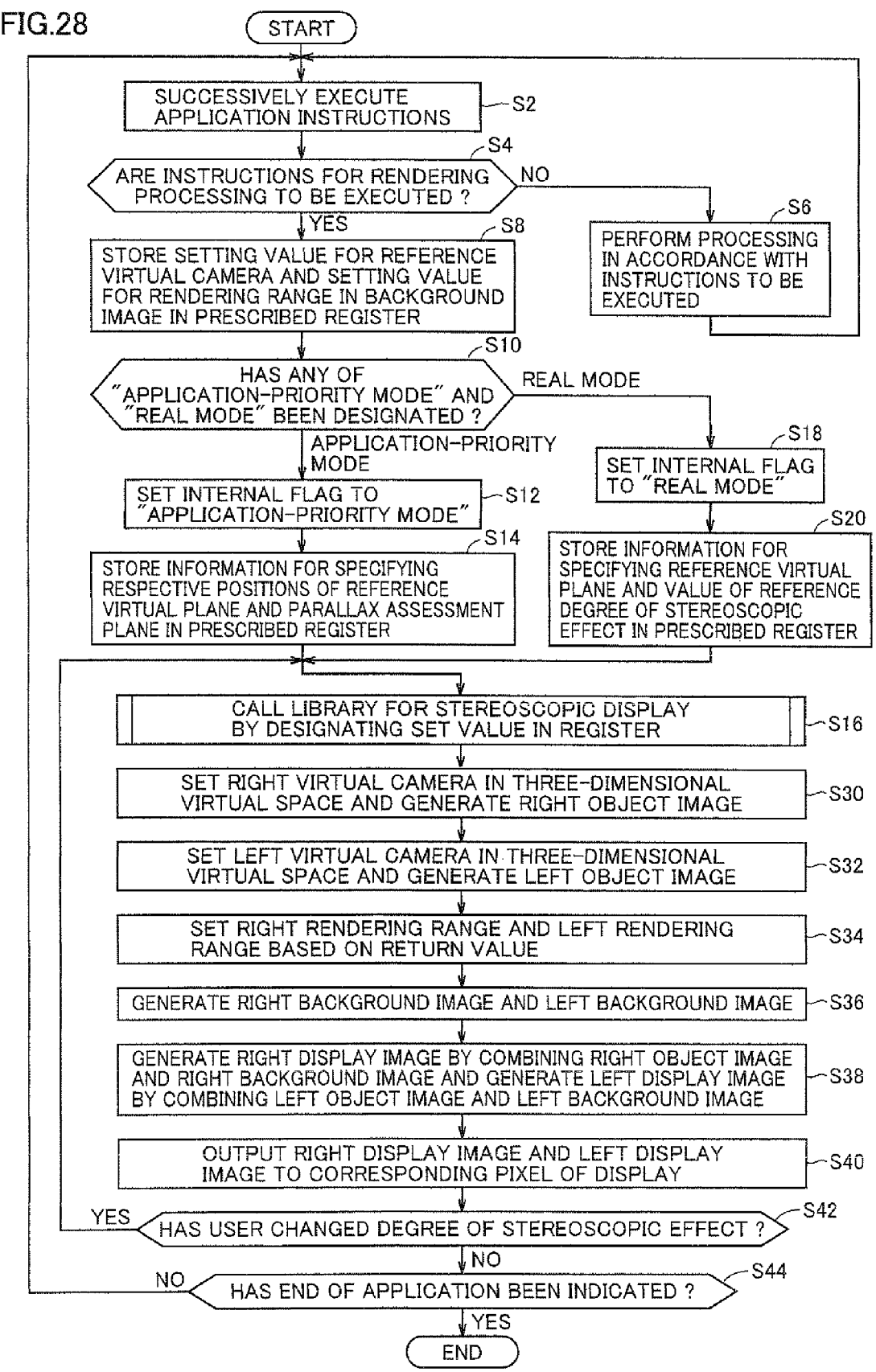
FIG. 28 is a flowchart showing a main routine of the program according to the present embodiment.
Figure 29:
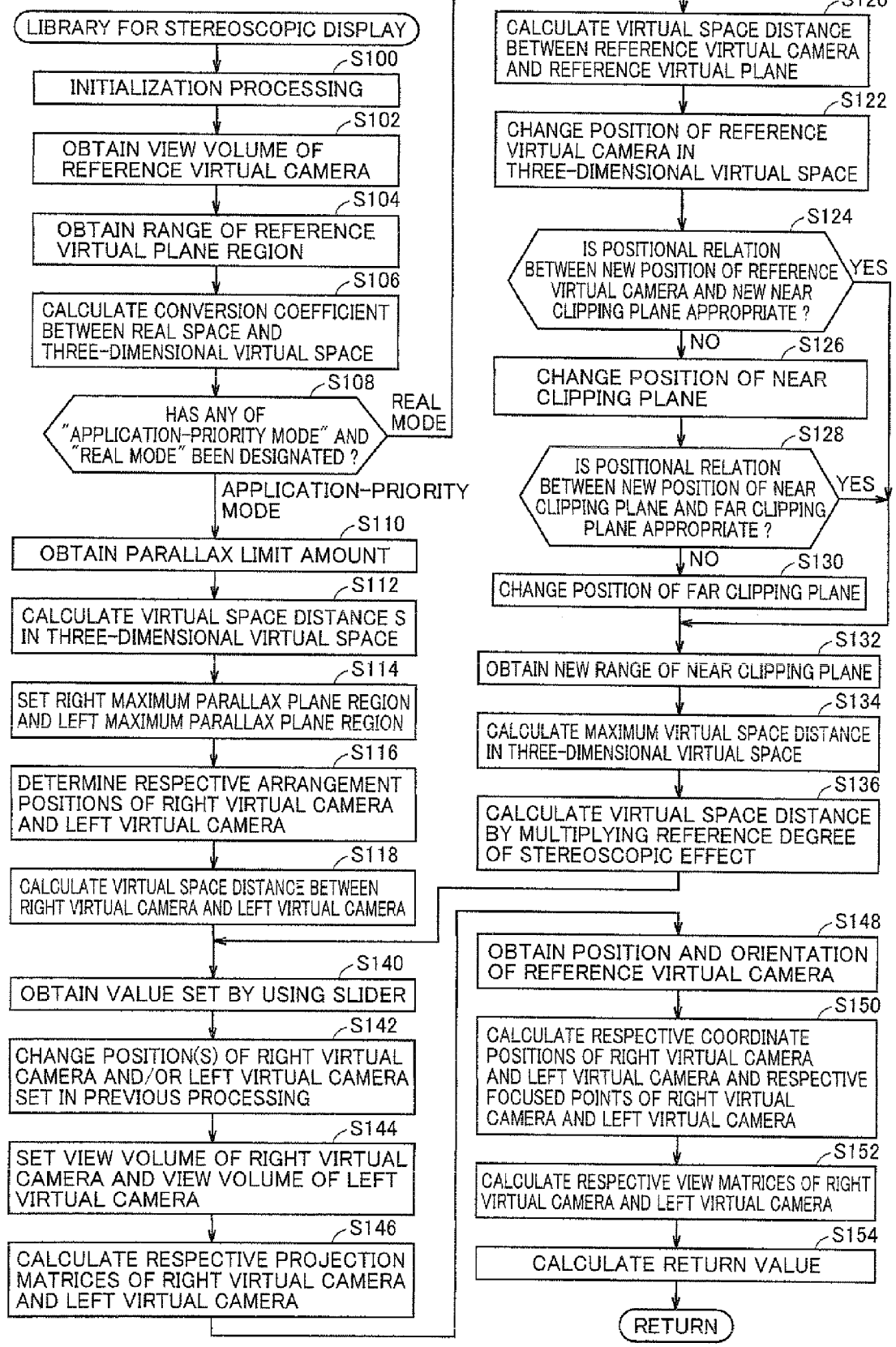
FIG. 29 is a flowchart showing the library for stereoscopic display according to the present embodiment.

Referring to FIG. 28, CPU 100 successively executes application instructions described in the program (step S2). Namely, proceeding module 204 shown in FIGS. 7A and 7B proceeds with the application in accordance with an internal command or the like generated by input module 202 or the like.

When instructions for rendering processing to display 10 are to be executed (YES in step S4), CPU 100 performs processing in step S8 and subsequent steps. In contrast, when instructions of interest are other than the rendering processing to display 10 (NO in step S4), CPU 100 performs processing in accordance with the instructions to be executed (step S6). Thereafter, the process returns to step S2.

In step S8, CPU 100 causes a prescribed register to store a setting value (an arrangement position and a view volume) for the reference virtual camera (reference virtual camera 300 shown in FIG. 1) designated as the application proceeds and a setting value for a rendering range in a background image. It is noted that a camera matrix (a projection matrix and a view matrix) is employed as the setting value for the reference virtual camera. Namely, in step S8, (1) reference virtual camera information shown in FIG. 8 is designated.

In addition, a plurality of coordinates for specifying a range to be set as the background image in original background image BG are used as the setting value for the rendering range in the background image. Alternatively, a setting value (an arrangement position and a view volume) for reference virtual camera 400 for generating a background image as shown in FIG. 1 may be designated.

In successive step S10, CPU 100 determines which of the "application-priority mode" and the "real mode" has been designated. This mode is designated in accordance with intention of the creator of the application, the user's operation or the like.

When the "application-priority mode" has been designated (in the case of "application-priority" in step S10), CPU 100 sets an internal flag to the "application-priority mode" (step S12). Namely, (4) mode information shown in FIG. 8 is set. In succession, CPU 100 causes a prescribed register to store information for specifying respective positions of the reference virtual plane (corresponding to reference virtual plane region 360 shown in FIGS. 13A to 13C and 14A to 14D) and the parallax assessment plane (parallax assessment plane 361 shown in FIGS. 13A to 13C and 14A to 14D) in the three-dimensional virtual space displayed as the application proceeds (step S14). Namely, (2) reference virtual plane information and (3) parallax assessment plane information shown in FIG. 8 are designated. If library for stereoscopic display 218# (FIG. 21) is called in step S16 which will be described later, designation of (3) parallax assessment plane information may be omitted.

In addition, CPU 100 designates a value in the register set in steps S8 and S12 and calls library for stereoscopic display 218 (or library for stereoscopic display 218#) for setting the right virtual camera and the left virtual camera (step S16).

In contrast, when the "real mode" has been designated (in the case of the "real mode" in step S10), CPU 100 sets the internal flag to the "real mode" (step S18). Namely, (4) mode information shown in FIG. 8 is set. In succession, CPU 100 causes a prescribed register to store information for specifying the reference virtual plane where a display target to which attention is desirably paid is present (corresponding to reference virtual plane region 360 shown in FIGS. 13A to 13C and 14A to 14D) and a value of a reference degree of stereoscopic effect (step S20). Namely, (2) reference virtual plane information and (3') reference degree of stereoscopic effect shown in FIG. 8 are designated. In addition, CPU 100 designates a value in the register set in steps S8 and S18 and calls library for stereoscopic display 218 (or library for stereoscopic display 218#) for setting the right virtual camera and the left virtual camera (step S16).

Though processing in library for stereoscopic display 218 (or library for stereoscopic display 218#) in step S16 will be described in detail with reference to FIG. 29, by calling the library for stereoscopic display, CPU 100 calculates a camera matrix (a projection matrix and a view matrix) of the right virtual camera and a camera matrix (a projection matrix and a view matrix) of the left virtual camera as well as the return value (a ratio of a distance between right virtual camera 302 and left virtual camera 304 with the width of the reference virtual plane region (see FIG. 3) for reference virtual camera 300 serving as the reference).

In successive step S30, CPU 100 sets the right virtual camera (right virtual camera 302 shown in FIG. 2) in the three-dimensional virtual space in accordance with the camera matrix calculated by library for stereoscopic display 218 (or library for stereoscopic display 218#), and generates a right object image based on virtual photographing by the right virtual camera. In addition, in step S32, CPU 100 sets the left virtual camera (left virtual camera 304 shown in FIG. 2) in the three-dimensional virtual space based on the calculated camera matrix and generates a left object image based on virtual photographing by the left virtual camera.

Namely, in steps S30 and S32 described above, object image rendering module 206 shown in FIGS. 7A and 7B generates (renders) the right object image and the left object image with reference to object definition data 212, in accordance with a result of calculation by library for stereoscopic display 218 (or library for stereoscopic display 218#).

In step S34, CPU 100 sets the right rendering range (right rendering range 412 shown in FIGS. 22A to 22C) and the left rendering range (left rendering range 414 shown in FIGS. 22A to 22C) by displacing the rendering range in the background image designated in step S8 in a prescribed direction, based on the return value from library for stereoscopic display 218 (or library for stereoscopic display 218#). Namely, background image range setting module 208 shown in FIGS. 7A and 7B sets respective ranges in original background image BG, to be rendered as the right background image and the left background image.

In successive step S36, CPU 100 generates (renders) the right background image and the left background image in accordance with the set respective right rendering range and left rendering range. Namely, background image rendering module 210 shown in FIGS. 7A and 7B generates the right background image and the left background image with reference to background image data 214, in accordance with the right rendering range and the left rendering range set in step S34.

Thereafter, in step S38, CPU 100 combines the right object image generated in step S30 and the right background image generated in step S36 with each other to generate the right display image, and combines the left object image generated in step S32 and the left background image generated in step S36 with each other to generate the left display image. Namely, display data generation module 216 shown in FIGS. 7A and 7B generates the right display image and the left display image based on the right object image and the left object image as well as the right background image and the left background image.

Finally, in step S40, CPU 100 outputs the right display image and the left display image generated in step S38 to a corresponding pixel of display 10.

Thereafter, CPU 100 determines whether the user has operated the slider or the like as shown in FIGS. 16 to 18 so as to change the degree of stereoscopic effect or not (step S42). When the degree of stereoscopic effect has been changed (YES in step S42), the processing in step S16 is performed again.

When the degree of stereoscopic effect has not been changed (NO in step S42), CPU 100 determines whether end of the application has been indicated or not (step S44). When end of the application has not been indicated (NO in step S44), the processing in step S2 and subsequent steps is repeated. In contrast, when end of the application has been indicated (YES in step S44), the process ends.

(f2. Library for Stereoscopic Display)

Referring to FIG. 29, CPU 100 initially performs initialization processing (step S100). In this initialization processing, initial values for an actual size of the display surface of display 10, an actual interval between the user's eyes, an actual distance from the user to the display surface of display 10, a limit depth up to which the user can comfortably accept stereoscopic display, and the like are set to prescribed setting values, respectively. As a method of setting these setting values, a manner of designating an expected value registered in advance in hardware (or firmware) of display 10, a manner of designation by an application, a manner of setting by the user, and the like may be employed.

In successive step S102, CPU 100 obtains the view volume of the reference virtual camera by calculating respective ranges of the near clipping plane and the far clipping plane within the three-dimensional virtual space (values in the three-dimensional virtual space) based on the projection matrix of the reference virtual camera. In further successive step S104, CPU 100 obtains the range of the reference virtual plane region to be rendered (value in the three-dimensional virtual space) based on the projection matrix of the reference virtual camera and the positional information of the reference virtual plane. In further successive step S106, CPU 100 calculates a conversion coefficient between the real space and the three-dimensional virtual space based on a ratio between a length in a lateral direction (or a length in a vertical direction) of the reference virtual plane region in the three-dimensional virtual space and an actual screen width (or an actual screen height) of the display surface of display 10.

In successive step S108, CPU 100 determines which of the "application-priority mode" and the "real mode" has been designated. When the "application-priority mode" has been designated (in the case of the "application-priority mode" in step S108), processing in step S110 and subsequent steps is performed. Alternatively, when the "real mode" has been designated (in the case of the "real mode" in step S108), processing in step S120 and subsequent steps is performed.

In step S110, CPU 100 obtains a maximum amount of parallax (parallax limit amount) between the right object image and the left object image on the display surface up to which the user can comfortably accept stereoscopic display on display 10. Display is preferably provided such that the amount of parallax for the object to which the user's attention is desirably paid is equal to or smaller than this parallax limit amount. This parallax limit amount is determined by an actual screen width of the display surface of display 10, an actual interval between the user's eyes, an actual distance from the user to the display surface of display 10, and the like.

By way of example of a method of obtaining the parallax limit amount in step S110, the parallax limit amount may be calculated in advance from an expected actual screen width of the display surface of display 10, an actual interval between the user's eyes, an actual distance from the user to the display surface of display 10, and the like, and that value may be made use of. Alternatively, for example, such a method as calculating the parallax limit amount from a value obtained with other means, for example, a method of mounting an image pick-up device or the like on display 10 and measuring an actual interval between the user's eyes with the use of the image pick-up device, may be employed.

In successive step S112, CPU 100 calculates virtual space distance S in the three-dimensional virtual space (corresponding to an amount of displacement between right maximum parallax plane 362 and left maximum parallax plane 363 shown in FIGS. 13A to 13C) corresponding to the parallax limit amount, by using the conversion coefficient calculated in step S106. Namely, the parallax limit amount obtained in step S110 is a value in the real space, and in step S112, in order to perform assessment processing on the parallax assessment plane shown below, the value in the real space is converted to a value in the three-dimensional virtual space of interest.

In successive steps S114 and S116, CPU 100 determines respective arrangement positions of the right virtual camera and the left virtual camera. Namely, in step S114, CPU 100 sets the right maximum parallax plane (right maximum parallax plane 362 shown in FIGS. 13A to 13C) which is a range rendered by the right virtual camera and the left maximum parallax plane (left maximum parallax plane 363 shown in FIGS. 13A to 13C) which is a range rendered by the left virtual camera, so as to generate parallax of virtual space distance S on the parallax assessment plane in the three-dimensional virtual space.

When (3) parallax assessment plane information is input, the parallax assessment plane is set with the reference virtual plane region serving as the reference, and when (3) parallax assessment plane information is not input, it is set at a position of the far clipping plane.

In successive step S116, CPU 100 determines respective arrangement positions of the right virtual camera and the left virtual camera based on the reference virtual plane region obtained in step S104 as well as on the right maximum parallax plane and the left maximum parallax plane set in step S114. More specifically, CPU 100 sets the right virtual camera at a position where the view volume including the reference virtual plane region and the right maximum parallax plane can be defined and sets the left virtual camera at a position where the view volume including the reference virtual plane region and the left maximum parallax plane can be defined. It is noted that the right virtual camera and the left virtual camera are arranged on the reference line passing through the reference virtual camera and extending in parallel to the reference virtual plane. Namely, CPU 100 determines respective positions of the right virtual camera and the left virtual camera by moving the reference virtual camera along the reference line by a prescribed distance.

In successive step S118, CPU 100 calculates virtual space distance Df between the right virtual camera and the left virtual camera determined in step S116. Then, the process proceeds to step S140.

In step S120, CPU 100 calculates virtual space distance D' between the reference virtual camera and the reference virtual plane in the three-dimensional virtual space so as to correspond to real positional relation between display 10 and the user (see FIGS. 15A and 15C). More specifically, CPU 100 calculates new virtual space distance D' from the reference virtual camera to the reference virtual plane (see FIG. 15C) by multiplying a distance expected as an actual distance from the user to the display surface of display 10 (actual distance L1 shown in FIG. 15A) by the conversion coefficient calculated in step S106. In the real mode, the position of the virtual camera is set such that positional relation between the reference virtual plane region and the virtual camera matches with the positional relation between the display surface of display 10 and the user's eyes. Namely, CPU 100 sets virtual space distance D' such that the ratio between virtual space distance D' and the distance from the user to the display surface of display 10 matches with a ratio between width W of the reference virtual plane region (see FIG. 15B) and actual screen width L3 of display 10 (see FIG. 15A).

In successive step S122, CPU 100 changes the position of the reference virtual camera in the three-dimensional virtual space, based on new virtual space distance D' calculated in step S120 (see FIG. 15C). CPU 100 changes relative positional relation between the reference virtual camera and the near clipping plane, the far clipping plane as the position of this reference virtual camera is changed.

In step S124, CPU 100 determines whether positional relation between the new position of the reference virtual camera and the near clipping plane is appropriate or not. This is because the near clipping plane may be located on the side opposite to the camera direction of the reference virtual camera as a result of movement of the reference virtual camera toward the near clipping plane.

When the positional relation between the new position of the reference virtual camera and the near clipping plane is not appropriate (NO in step S124), CPU 100 changes the position of the near clipping plane (step S126). In further successive step S128, CPU 100 determines whether positional relation between the new position of the near clipping plane and the far clipping plane is appropriate or not (step S128). This is because the near clipping plane may be located beyond the far clipping plane as a result of change in the position of the near clipping plane.

When the positional relation between the new position of the near clipping plane and the far clipping plane is not appropriate (NO in step S128), CPU 100 changes the position of the far clipping plane (step S130).

Thereafter, in step S132, CPU 100 obtains a new range of the near clipping plane (value in the three-dimensional virtual space).

In successive step S134, CPU 100 calculates a maximum virtual space distance between the right virtual camera and the left virtual camera in a case where stereoscopic display close to real is provided. More specifically, the maximum virtual space distance in the three-dimensional virtual space is calculated by multiplying the actual interval between the user's eyes by the conversion coefficient calculated in step S106. In further successive step S136, CPU 100 calculates virtual space distance Df between right virtual camera 302 and left virtual camera 304 by multiplying the calculated maximum virtual space distance by (3') reference degree of stereoscopic effect designated when library for stereoscopic display 218 is called. Thus, respective positions of the right virtual camera and the left virtual camera are determined. Then, the process proceeds to step S140.

In step S140, CPU 100 obtains a setting value set with the slider as shown in FIGS. 16 to 18 (typically, a value in a range from 0 to 100%). In further successive step S142, CPU 100 changes the position(s) of the right virtual camera and/or the left virtual camera set in the previous processing, in accordance with the new virtual space distance obtained by multiplying virtual space distance Df by the setting value obtained in step S140.

In successive step S144, CPU 100 sets the view volume of the right virtual camera and the view volume of the left virtual camera, so as to maintain the range of the reference virtual plane region included in the view volume of the reference virtual camera. In further successive step S146, CPU 100 calculates a projection matrix of the right virtual camera and a projection matrix of the left virtual camera representing the respective view volumes of the set virtual cameras.

In successive step S148, CPU 100 obtains a position and an orientation of the reference virtual camera based on a view matrix of the reference virtual camera. In further successive step S150, CPU 100 calculates respective coordinate positions of the right virtual camera and the left virtual camera and respective focused points of the right virtual camera and the left virtual camera based on virtual space distance Df calculated in the previous processing. In further successive step S152, CPU 100 calculates respective view matrices of the right virtual camera and the left virtual camera based on the parameter calculated in step S150.

In successive step S154, CPU 100 calculates return value RV. Namely, CPU 100 calculates a ratio of the virtual space distance between the right virtual camera and the left virtual camera, with the virtual space distance corresponding to the width of the reference virtual plane region serving as the reference.

Thereafter, the process returns.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium encoded with a computer-readable display control program which is executable by a computer for controlling a display capable of providing stereoscopic display, the computer-readable display control program comprising:

object image generation instructions for generating, from an object image source, a right object image and a left object image used for providing stereoscopic display of an object within a first virtual space on the display by virtually photographing the object with a first right virtual camera and a first left virtual camera;

background image generation instructions for generating, from a background image source different from the object image source, a right background image and a left background image used for background display on the display; and display data generation instructions for combining the right object image and the right background image to provide a right display image, combining the left object image and the left background image to provide a left display image, and outputting the right and left display images for stereoscopic display, the background image generation instructions being adapted to generate the right background image and the left background image such that these background images have relative relation in accordance with positional relation between the first right virtual camera and the first left virtual camera.

2. The non-transitory storage medium according to claim 1, wherein each of the first reference virtual camera, the first right virtual camera and the first left virtual camera is defined as a projection matrix and a view matrix.

3. The non-transitory storage medium according to claim 1, wherein the object image generation instructions are adapted to determine positional relation between the first right virtual camera and the first left virtual camera in response to an indication indicating a degree of stereoscopic effect provided in the display.

4. The non-transitory storage medium according to claim 1, wherein the object image generation instructions are adapted to set the first right virtual camera and the first left virtual camera on a straight line passing through a first reference virtual camera and extending perpendicular to a camera direction of the first reference virtual camera, in accordance with the first reference virtual camera set within the first virtual space.

5. The non-transitory storage medium according to claim 1, wherein the background image source comprises a two-dimensional image.

6. The non-transitory storage medium according to claim 3, wherein
the display control program further comprises input instructions for accepting a request indicating the degree of stereoscopic effect provided in the display, and
the object image generation instructions are adapted to change positional relation between the first right virtual camera and the first left virtual camera in response to the indication when change in the degree of stereoscopic effect is accepted as a result of execution of the input instructions.

7. The non-transitory storage medium according to claim 4, wherein
the background image generation instructions are adapted to generate the right background image and the left background image based on a distance between the first right virtual camera and the first left virtual camera in the first virtual space.

8. The non-transitory storage medium according to claim 7, wherein
the right background image and the left background image are images generated based on a common image.

9. The non-transitory storage medium according to claim 7, wherein
the background image generation instructions are adapted to generate the right background image and the left background image in accordance with a ratio of the distance between the first right virtual camera and the first left virtual camera, with a width of a reference virtual plane region which is included in a view volume of the first reference virtual camera and is a virtual plane perpendicular to the camera direction of the first reference virtual camera serving as a reference.

10. The non-transitory storage medium according to claim 7, wherein
the background image generation instructions are adapted to set a second right virtual camera and a second left virtual camera for generating a right background image and a left background image, respectively, by virtually photographing a background object, with a second reference virtual camera set within a second virtual space including the background object serving as a reference, based on the distance between the first right virtual camera and the first left virtual camera.

11. The non-transitory storage medium according to claim 9, wherein
the background image generation instructions are adapted to set a right rendering range to be output as the right background image with respect to an original background image having a size larger than a size of display on the display and to set a left rendering range to be output as the left background image at a position set by displacing the right rendering range by a distance obtained by multiplying a width of the right rendering range by the ratio of the distance between the first right virtual camera and the first left virtual camera.

12. The non-transitory storage medium according to claim 10, wherein
each of the second reference virtual camera, the second right virtual camera and the second left virtual camera is defined as a projection matrix and a view matrix.

13. A non-transitory storage medium encoded with a computer-readable library program adapted to cooperate with an application program on a computer having a display capable of providing stereoscopic display, the computer-readable library program comprising:
setting value output instructions for outputting a setting value for a first right virtual camera for generating, from an object image source, a right object image and a setting value for a first left virtual camera for generating, from the object image source, a left object image used for providing stereoscopic display of an object within a first virtual space on the display by virtually photographing the object within the first virtual space in response to an input of a setting value for a first reference virtual camera within the first virtual space; and
positional relation output instructions for outputting a value indicating positional relation between the first right virtual camera and the first left virtual camera,
the setting value output instructions being adapted to set the first right virtual camera and the first left virtual camera, and adapted to generate, from a background image source different from the object image source, a right background image and a left background image used for background display on the display based on positional relation between the first right virtual camera and the first left virtual camera, and
the right object image and the right background image being combined to provide a right display image, the left object image and the left background image being combined to provide a left display image, and the right and left display images being output for stereoscopic display.

14. The non-transitory storage medium according to claim 13, wherein the setting output instructions are further adapted to set the first right virtual camera and the first left virtual camera on a straight line passing through the first reference virtual camera and extending perpendicular to a camera direction of the first reference virtual camera.

15. The non-transitory storage medium according to claim 13, wherein the background image source comprises a two-dimensional image.

16. An information processing system, comprising:
a display capable of providing stereoscopic display;
an object image generation module for generating, from an object image source, a right object image and a left object image used for providing stereoscopic display of an object within a first virtual space on the display by virtually photographing the object with a first right virtual camera and a first left virtual camera;
a background image generation module for generating, from a background image source different from the object image source, a right background image and a left background image used for background display on the display; and
a display data generation module for combining the right object image and the right background image to provide a right display image, combining the left object image and the left background image to provide a left display image, and outputting the right and left display images for stereoscopic display, the background image generation module generating the right background image and the left background image such that these background images have relative relation in accordance with positional relation between the first right virtual camera and the first left virtual camera.

17. The information processing system according to claim 16, wherein the object image generation module is adapted to set the first right virtual camera and the first left virtual camera on a straight line passing through a first reference virtual camera and extending perpendicular to a camera direction of the first reference virtual camera, in accordance with the first reference virtual camera set within the first virtual space.

18. The information processing system according to claim 16, wherein the background image source comprises a two-dimensional image.

19. An information processing system comprising:
a display capable of stereoscopic display; and
a computer comprising a processor, the computer being configured to at least:
generate, from an object image source, a right object image and a left object image used for providing stereoscopic display of an object within a first virtual space on the display by virtually photographing the object with a first right virtual camera and a first left virtual camera;
generate, from a background image source different from the object image source, a right background image and a left background image used for background display on the display; and
generate data used for image display on the display by combining the right object image and the right background image to provide a right display image, combining the left object image and the left background image to provide a left display image, and outputting the right and left display images for stereoscopic display,
wherein the right background image and the left background image are generated such that these background images have relative relation in accordance with a positional relation between the first right virtual camera and the first left virtual camera.

20. The information processing system according to claim 19, wherein the background image source comprises a two-dimensional image.

21. A non-transitory storage medium encoded with a computer-readable display control program which is executable by a computer for controlling a display capable of providing stereoscopic display, the computer-readable display control program comprising:
object image generation instructions for generating, from an object image source, a right object image and a left object image used for providing stereoscopic display of an object within a first virtual space on the display by virtually photographing the object with a first right virtual camera and a first left virtual camera;
background image generation instructions for generating, from a background image source different from the object image source, a right background image and a left background image used for background display on the display; and
display data generation instructions for generating data used for image display on the display using the right object image, the left object image, the right background image and the left background image,
wherein a rendered representation of the right background image has a prescribed offset from a rendered representation of the left background image, the prescribed offset depending on a distance between the first right virtual camera and the first left virtual camera within the first virtual space.

22. An information processing system comprising:
a display capable of stereoscopic display; and
a computer comprising a processor, the computer being configured to at least:
generate, from an object image source, a right object image and a left object image used for providing stereoscopic display of an object within a first virtual space on the display by virtually photographing the object with a first right virtual camera and a first left virtual camera;
generate, from a background image source different from the object image source, a right background image and a left background image used for background display on the display; and
generate data used for image display on the display using the right object image, the left object image, the right background image and the left background image,
wherein a rendered representation of the right background image has a prescribed offset from a rendered representation of the left background image, the prescribed offset depending on a distance between the first right virtual camera and the first left virtual camera within the first virtual space.

* * * * *